(12) United States Patent
Sobhani et al.

(10) Patent No.: US 8,833,092 B1
(45) Date of Patent: Sep. 16, 2014

(54) METHOD AND SYSTEM FOR WATER EXTRACTION FROM HIGH HUMIDITY SEA SHORES

(71) Applicants: Cyrus Sobhani, Potomac, MD (US);
Saied Tadayon, Potomac, MD (US);
Bijan Tadayon, Potomac, MD (US)

(72) Inventors: Cyrus Sobhani, Potomac, MD (US);
Saied Tadayon, Potomac, MD (US);
Bijan Tadayon, Potomac, MD (US)

(73) Assignee: Cyrus Sobhani, Potomac, MD (US)

( * ) Notice: Subject to any disclaimer, the term of this patent is extended or adjusted under 35 U.S.C. 154(b) by 0 days.

(21) Appl. No.: 14/251,580

(22) Filed: Apr. 12, 2014

(51) Int. Cl.
*F25D 21/00* (2006.01)
*B01D 53/26* (2006.01)

(52) U.S. Cl.
CPC ................................ *B01D 53/265* (2013.01)
USPC ................................. 62/93; 62/176.6; 62/282

(58) Field of Classification Search
USPC .................... 62/176.4, 93, 272, 282
See application file for complete search history.

(56) References Cited

U.S. PATENT DOCUMENTS

| | | | | |
|---|---|---|---|---|
| 4,351,651 A | * | 9/1982 | Courneya | 96/397 |
| 5,233,843 A | * | 8/1993 | Clarke | 62/271 |
| 2010/0037651 A1 | * | 2/2010 | Corl | 62/513 |

* cited by examiner

*Primary Examiner* — Cassey D Bauer
(74) *Attorney, Agent, or Firm* — Maxvalueip LLC

(57) ABSTRACT

In one example, we describe reliable, flexible, low-maintenance, low-overhead, low-cost installation, practical, and easy-to-install structures and components or techniques (methods and systems) for water capture from high humidity sources, e.g., sea or river, for use or consumption by humans, animals, or plants/agriculture/food production. In one example, it is modularized. Thus, it is easier for transportation and maintenance, with less cost and down-time. For example, it can be used in some regions in the Middle East or Africa, with dry land with no or small amount of rain. In one example, we describe the use of renewable energy sources. In one example, we describe the control system for operation of water collection and distribution systems, e.g., for optimization and efficiency or cost. We also describe the mechanisms, techniques, components, and systems to implement various tasks and goals related to these.

20 Claims, 57 Drawing Sheets

METHOD AND SYSTEM FOR WATER EXTRACTION FROM HIGH HUMIDITY SEA SHORES

RELATED APPLICATIONS

This application is related to 2 other copending applications filed on the same day, with the same inventors and assignee, and with the same teachings and spec, called Cyrus-1-Cont-1 and Cyrus-1-Cont-2. All the teachings of those applications are also incorporated here by reference.

BACKGROUND OF THE INVENTION

Nowadays, the water supply (and separation of salt and other chemicals) is extremely important for human consumption (drinking or general use, e.g., bathing), animal consumption, industrial use, agriculture, washing purposes, plants, trees, vegetation, and food supplies.

The drinking water is in short supply, especially for countries in the warm climate or near desert, with no or small amount of rain and snow. In addition, getting pure and drinking water from ocean or sea is very expensive and requires a lot of energy. Furthermore, the pollution for such an energy requirement is a big concern for the environment. In addition, the energy is also in short supply and expensive, e.g., for oil or coal. Furthermore, the hungry nations or people may go to war or cause riots, with suffering and disastrous results, to go after scarce resources, such as food and water. In addition, the population of the world is increasing drastically and very fast. Furthermore, the vegetation and agriculture/trees/forests are hard to maintain without the proper supply of the water. In addition, the food or water is getting more expensive and scarce for most of the world. Furthermore, the weather patterns are getting more extreme and disastrous for most of the world.

So, one needs solutions for collecting water, in an efficient and less expensive way, with less pollutions and less energy, with use of green/renewable energy, if possible, to support the plants, animals, agriculture, and human consumptions, in various applications and usages.

SUMMARY OF THE INVENTION

This solution (our solutions) has to be reliable, flexible, low-maintenance, low-overhead, low-cost installation, practical, and easy-to-install. Since it is modularized, it is easier for transportation and maintenance, with less cost and downtime. It should be easy to manufacture, and tough against the natural elements, e.g., high humidity and corrosion by sea water, with lots of salts and acidity. Since there is no solution in the market now, our solution is the first of its kind. That is, the inventions and embodiments described here, below, have not been addressed or presented, in any prior art.

For example, in some regions in the Middle East, we have conditions of dry land with no or small amount of rain, with little vegetation, in need of water, but having a sea with high humidity nearby, at high temperatures, especially during Summer time, to tap to, for our inventions here, to collect water, is a big advantage. According to www.Britannica.com, Encyclopedia Britannica, Inc., the relative humidity is high for those areas, near or on sea or sea shore, e.g. for Red Sea, between Africa and Middle East/Asia. So, the location has all the basic ingredients. For example, high wind near the sea, for windmill power generators, and hot direct Sun with not much cloud for Solar panels green power generation, nearby, can be supplement or main power sources for motors and fans and pumps and others used in our water collector system or installation or assembly, to reduce gas emissions and pollutants, e.g. CO and $CO_2$.

Since it is modularized, in one embodiment, it is cheaper to make or scale it for longer stretches of sea shores. One can copy the system for thousands of miles, with less cost per mile, due to economy of scale. If a portion is bad or defective or out-of-order, we can replace or repair, without stopping the operation of the other sectors or sections. The controls can be centralized or localized or semi-localized or distributed. The controller, through local sensors and weather forecast satellite and information from outside or remote locations, can optimize so that when the humidity is low or the conditions or efficiency for process is low/non-optimum, the process stops, e.g., the fans are stopped, so that it does not work inefficiently, wasting energy as a net result.

In one embodiment, we have a rules engine for the controller for this process, using a processor or more processors, to partially or fully close/turn off or turn-on sections of the seashore, according to the local condition for weather and pressure/temperature and humidity, and/or the differences between those parameters locally, based on those rules or history of the performances/results/efficiencies/rates/power generated/water/gallons collected, in the past, or patterns/corresponding outcomes, to optimize the results and efficiency of water generation/collection, with less energy, especially less of non-renewable energy forms/resources.

In one embodiment, we have various calculations and modules related to various tasks and goals for this project.

DETAILED DESCRIPTION OF THE PREFERRED EMBODIMENTS

Figure 1:
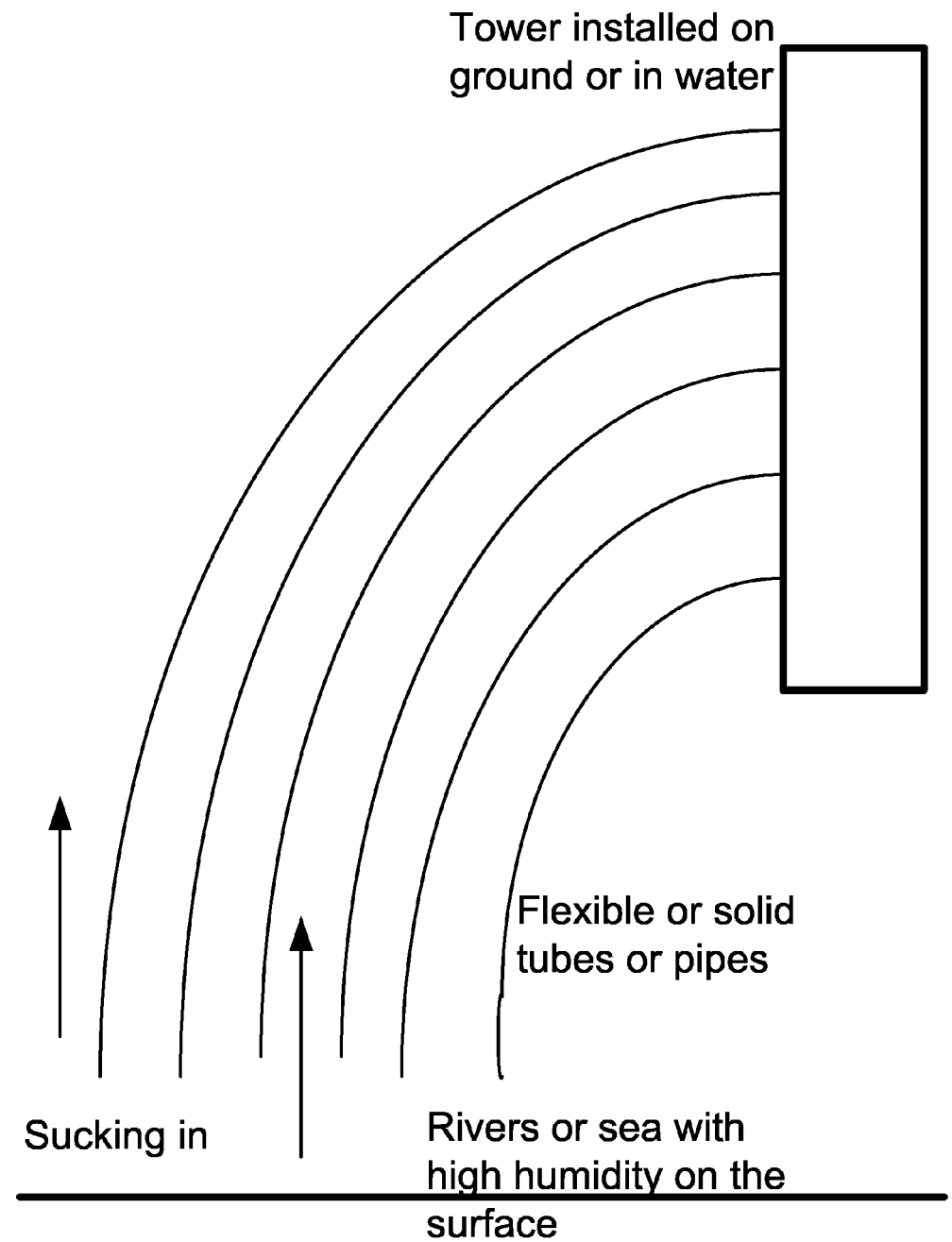
FIG. 1 shows an example/embodiment for the structure or facility for capturing the air with high humidity from surface of the sea or river.

FIG. 1 shows an example/embodiment for the structure or facility for capturing the air with high humidity from surface of the sea or river, e.g., usually in hot areas, e.g., in Africa or Middle East, with dry land, with multiple pipes or tubes, along the seashore or coast, e.g., in parallel with the coast line. The tubes or pipes can be flexible or rigid or semi-rigid or piecewise-rigid, with connectors or hinges or reducers or interconnects or junctions, in between the pieces or connecting them. The distance to shore may be, e.g., 5 m to 500 m, but it can be longer or shorter, as well. For longer connections, one needs extra motors or fans to suck the air or pull or push the air for longer distances, e.g., in different stages or different locations or intermediate spaces or locations. The tower or structure for capturing water or collection storage can be set of ground or shore, or based on a floating boat or structure, or anchored on the sea, or with columns or long legs in concrete or metal or floaters (e.g. light tubes or wood), e.g., in or near shore, e.g., in or near water.

Figure 2:
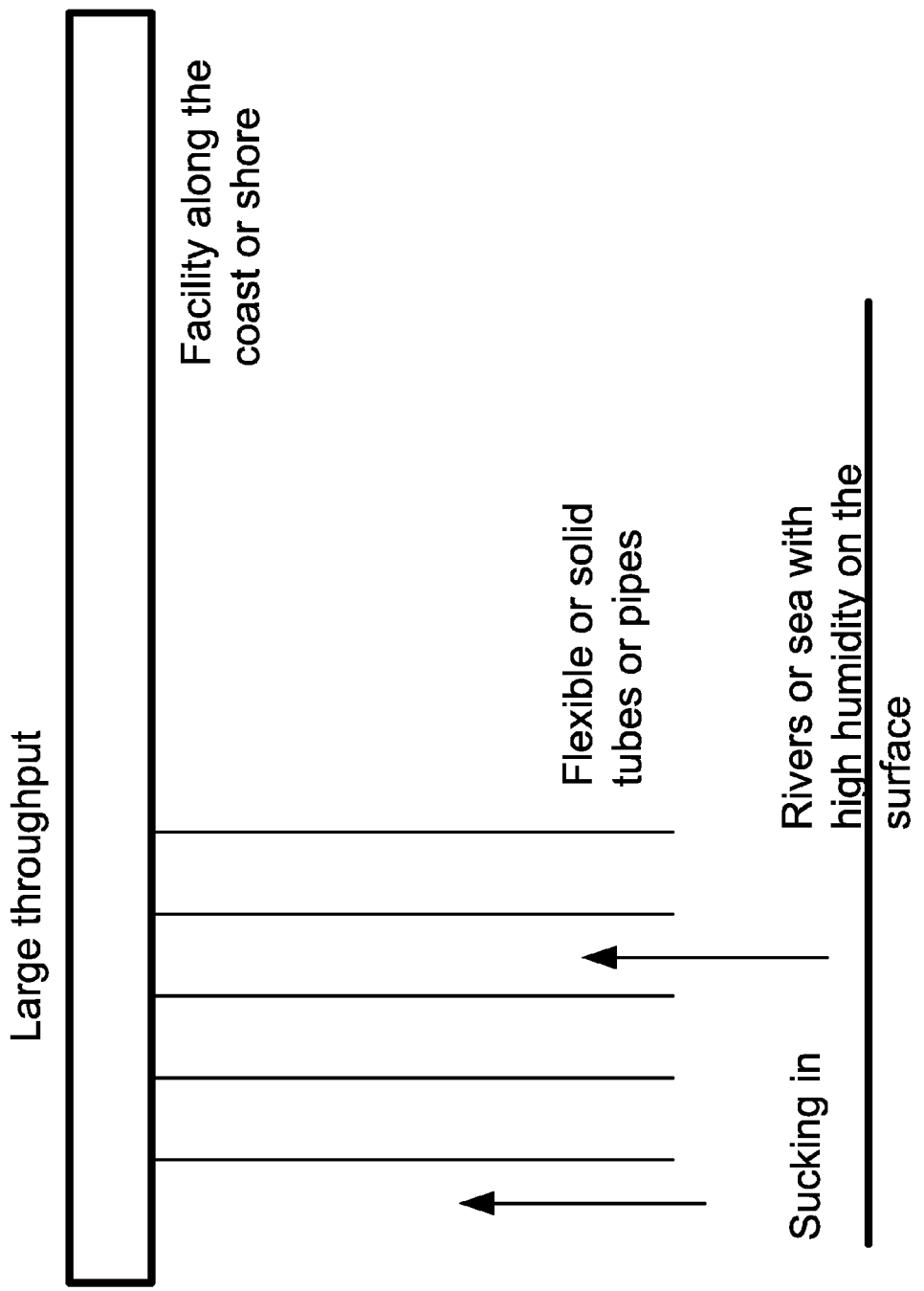
FIG. 2 shows an example/embodiment for the structure or facility for capturing the air with high humidity from surface of the sea or river.

FIG. 2 shows an example/embodiment for the structure or facility for capturing the air with high humidity from surface of the sea or river, e.g., with miles along the shore with high throughput.

Figure 3:
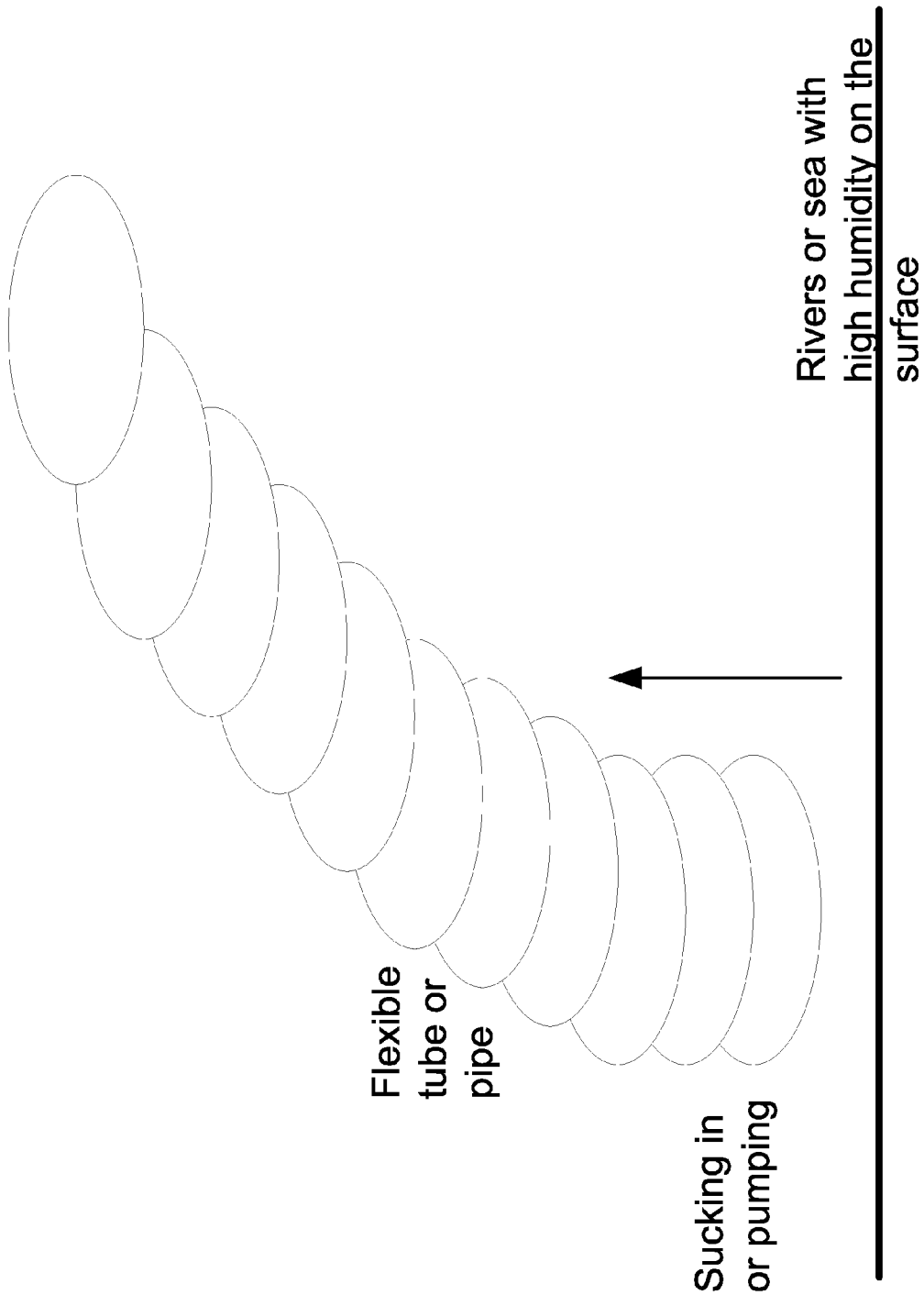
FIG. 3 shows an example/embodiment for the flexible pipes, e.g., plastic or elastic or accordion-shaped or variable-volume or extendable or compressible.

FIG. 3 shows an example/embodiment for the flexible pipes, e.g., plastic or elastic or accordion-shaped or variable-volume or extendable or compressible, to be flexible for tide during the days or during variations for seasons or during storm or rough sea or the like, or for adjusting of the height or extension or length or stretch on sea, because of various parameters in the weather and others measured by our sensors on the pipes or near shore or on tower or by satellite or central HQ or controller module or main processor module or analyzer module or device or system, or for optimization or efficiency, by controller device, e.g. to reduce cost or for environmental footprint or emission gases or more or faster rate of water collection or less energy or less non-renewable energy or the like, based on a cost function to optimize or penalize, based on all parameters mentioned in this spec.

Figure 4:
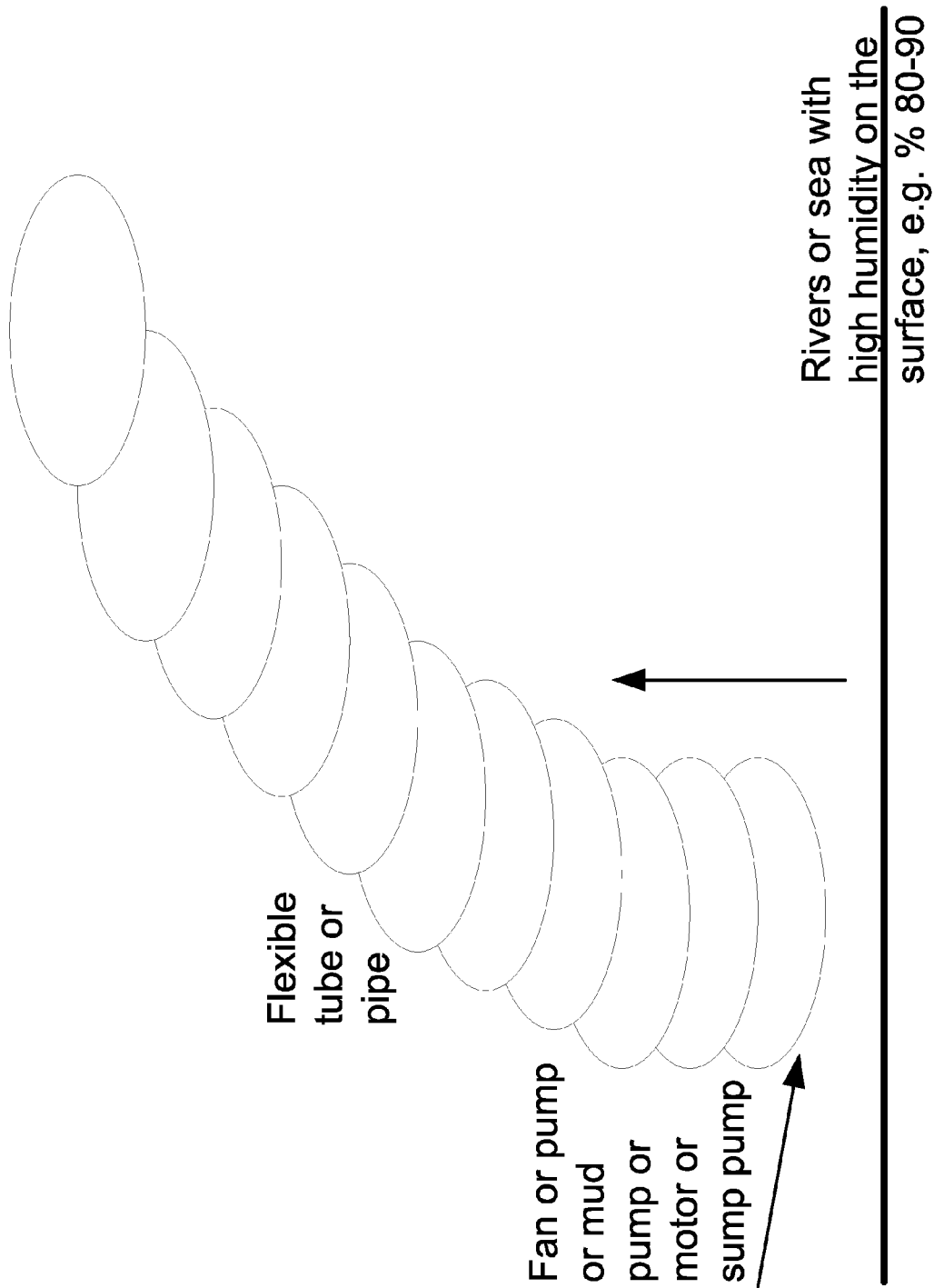
FIG. 4 shows an example/embodiment for the flexible pipes or non-flexible pipes or rigid or pieces.

FIG. 4 shows an example/embodiment for the flexible pipes or non-flexible pipes or rigid or pieces, e.g., with the pump or fan near the end near or at the water source or humidity source near or on water surface, e.g. sea or river or pond or lake or ocean or pool or stream or underground lake or cave. This method, the 1 atmosphere pressure difference limit, as the maximum possible, is removed as a constraint.

Figure 5:
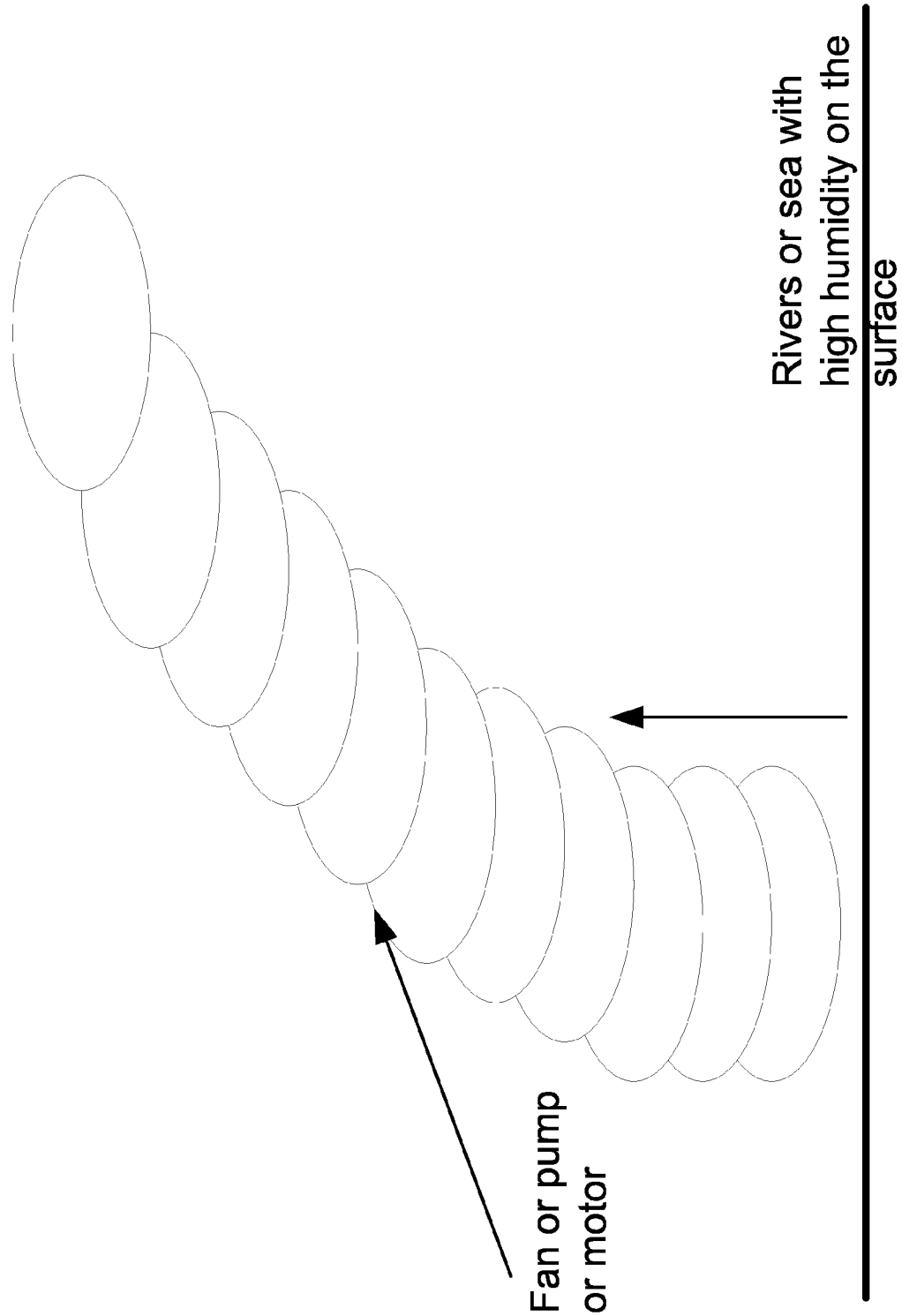
FIG. 5 shows an example/embodiment for the flexible pipes or non-flexible pipes or rigid or pieces.

FIG. 5 shows an example/embodiment for the flexible pipes or non-flexible pipes or rigid or pieces, e.g., with the pump or fan in the middle or somewhere between the 2 ends.

Figure 6:
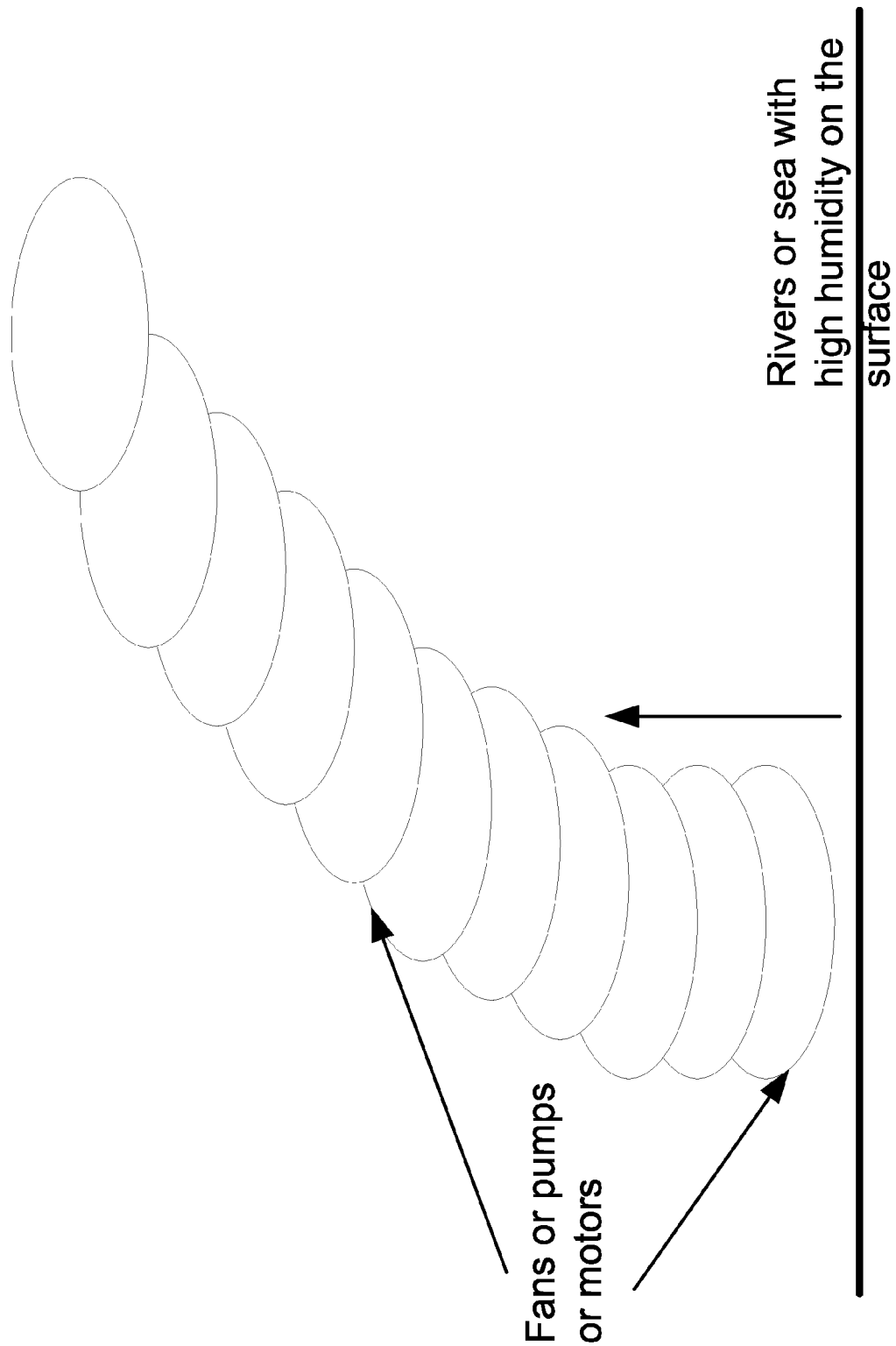
FIG. 6 shows an example/embodiment for the flexible pipes or non-flexible pipes or rigid or pieces.

FIG. 6 shows an example/embodiment for the flexible pipes or non-flexible pipes or rigid or pieces, e.g., with the pumps or fans or motors at multiple locations, e.g., in the middle and near the water source.

Figure 7:
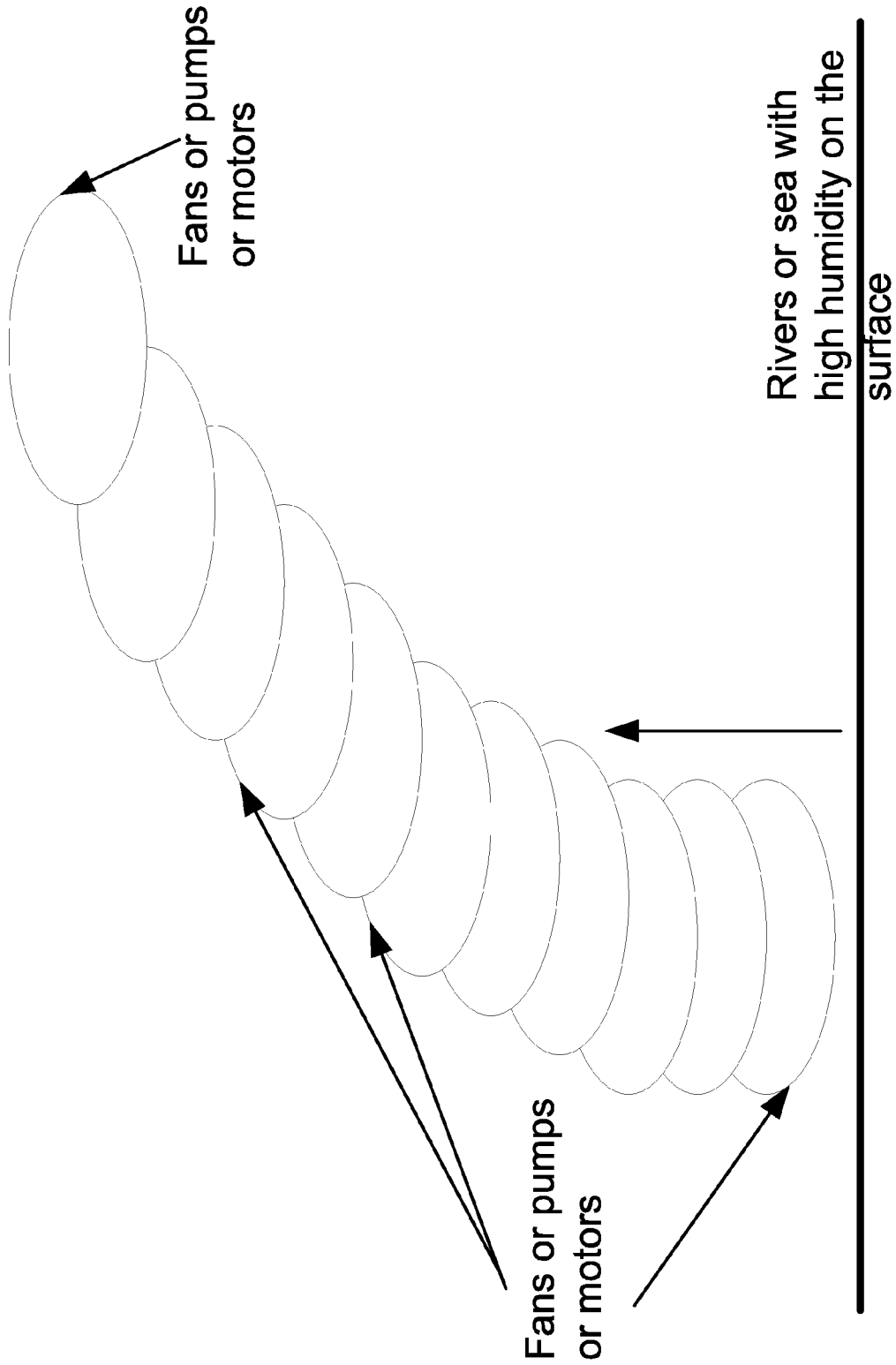
FIG. 7 shows an example/embodiment for the flexible pipes or non-flexible pipes or rigid or pieces.

FIG. 7 shows an example/embodiment for the flexible pipes or non-flexible pipes or rigid or pieces, e.g., with the pumps or fans or motors at multiple locations, e.g., in the middle and near the water source and near the tower, e.g. on land for collection structure.

Figure 8:
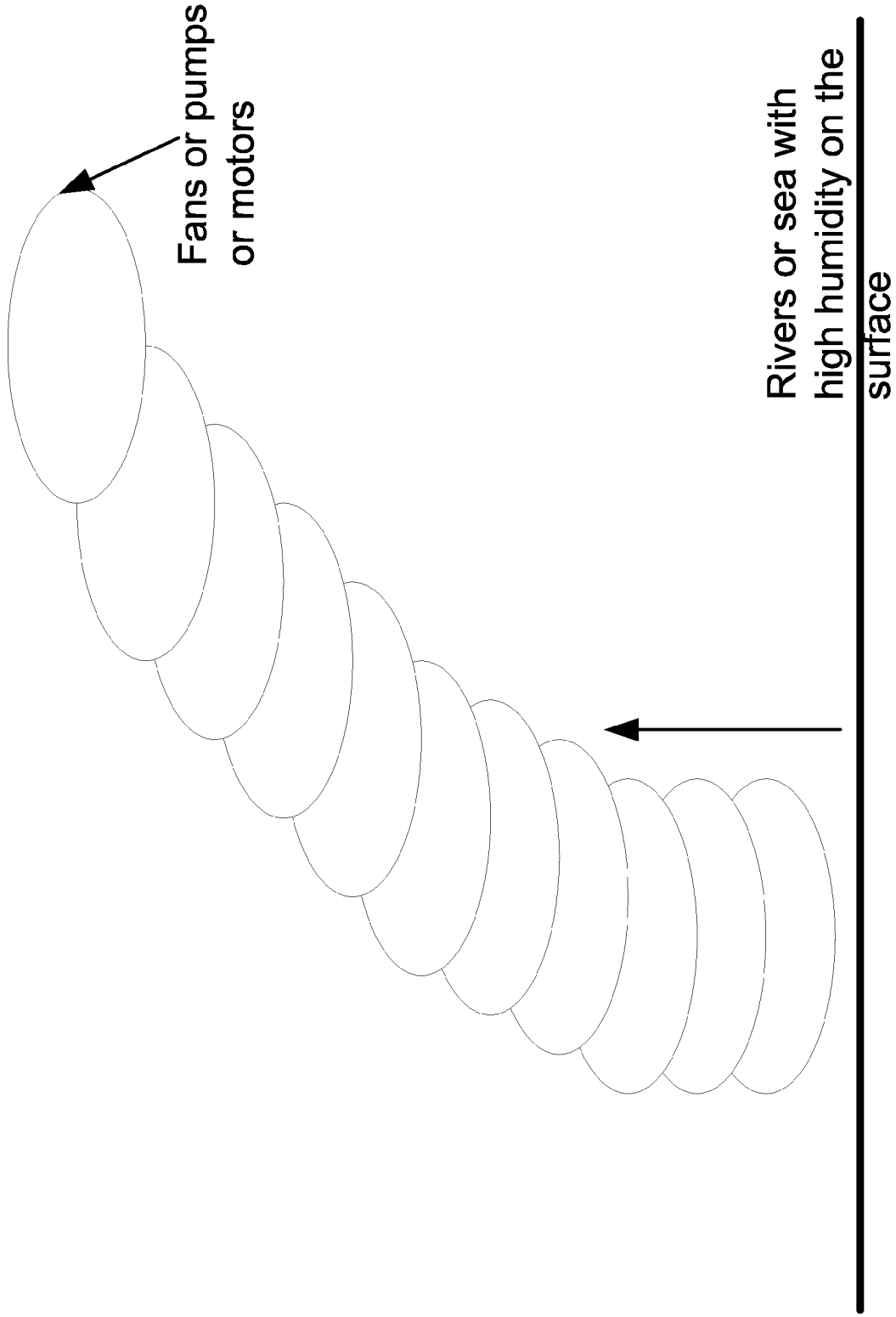
FIG. 8 shows an example/embodiment for the flexible pipes or non-flexible pipes or rigid or pieces.

FIG. 8 shows an example/embodiment for the flexible pipes or non-flexible pipes or rigid or pieces, e.g., with one or more pumps or fans or motors all at one location near or at the tower, e.g. on land for collection structure. This configuration has a limit of max 1 atm pressure gradient or difference, which is a constraint. However, this configuration is closer to the tower and thus, easier to repair or maintain, and less susceptible or at risk with respect to rough sea or natural elements near the surface of the sea, thus, safer and less risky and more life expectancy and less repairs, in general, and thus, less costly for operation and maintenance/to own. So, it is a trade-off. So, in one embodiment, for some applications, the configuration on FIG. 5 might be a good compromise for the 2 cases or extremes for FIG. 8 and FIG. 4, or e.g. use multiple fans or pumps or motors in the whole stretch or pipes, in series, or staggered for different sections or distances, or at periodic locations.

Figure 9:
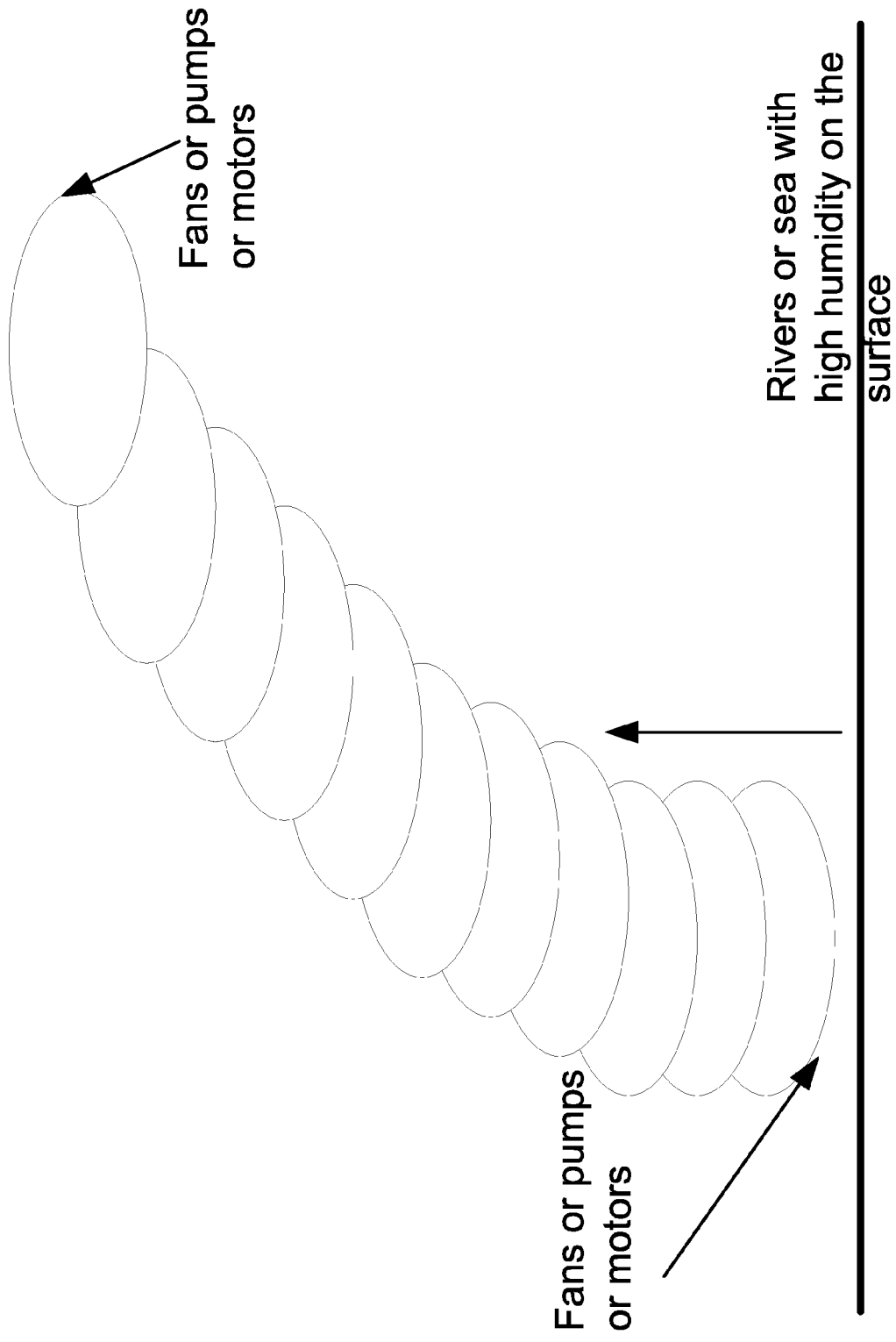
FIG. 9 shows an example/embodiment for the flexible pipes or non-flexible pipes or rigid or pieces, e.g., with the pumps or fans or motors at multiple locations.

FIG. 9 shows an example/embodiment for the flexible pipes or non-flexible pipes or rigid or pieces, e.g., with the pumps or fans or motors at multiple locations, e.g., near the water source and near the tower, e.g. on land for collection structure.

Figure 10:
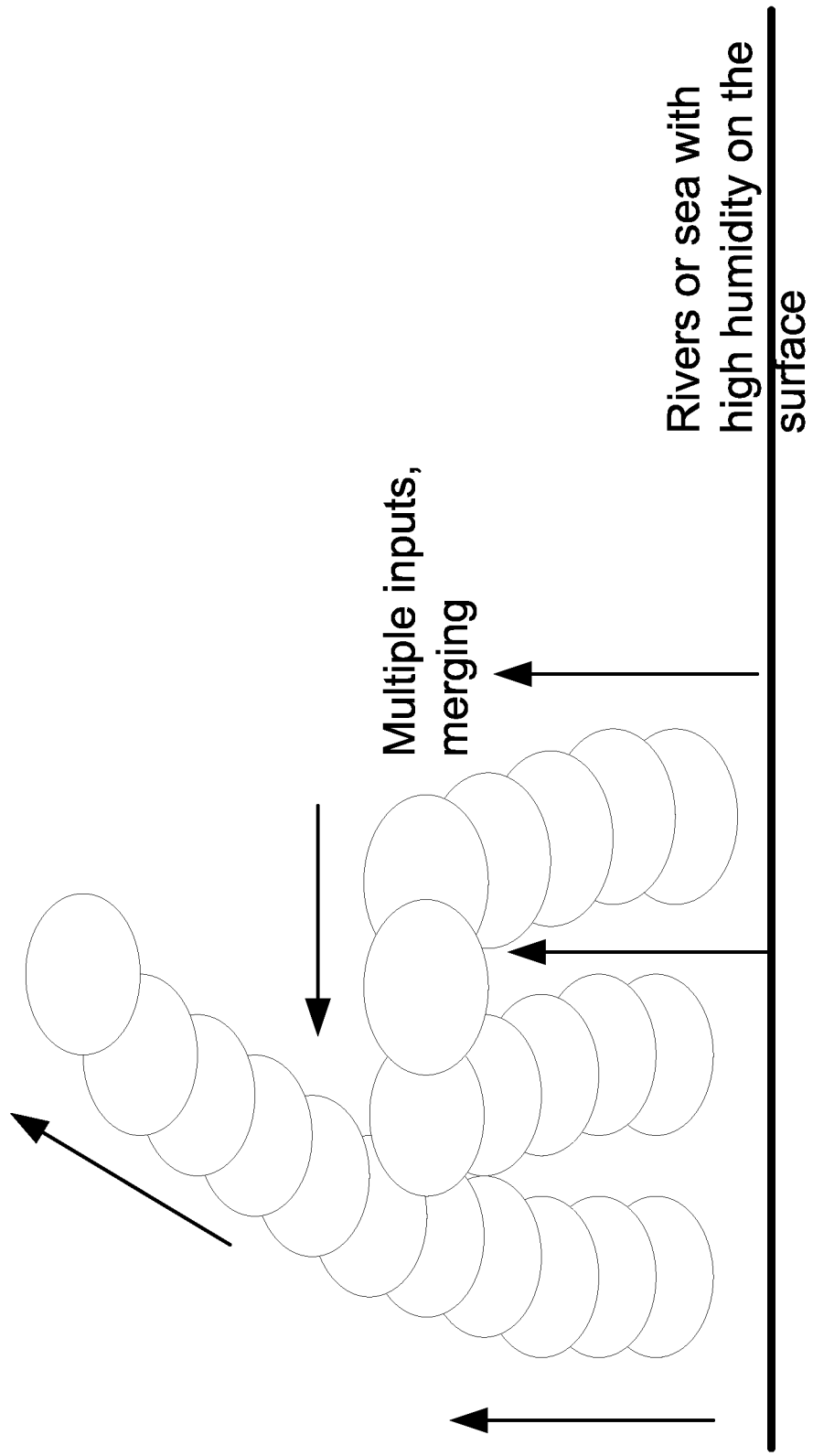
FIG. 10 shows an example/embodiment for the flexible pipes or non-flexible pipes or rigid or pieces, connected together in the middle or fanned out or distributed or T-shaped or aggregated for more throughput, as parallel inputs, accumulated, with one branch or line going to the tower or shore.

FIG. 10 shows an example/embodiment for the flexible pipes or non-flexible pipes or rigid or pieces, connected together in the middle or fanned out or distributed or T-shaped or aggregated for more throughput, as parallel inputs, accumulated, with one branch or line going to the tower or shore.

Figure 11:
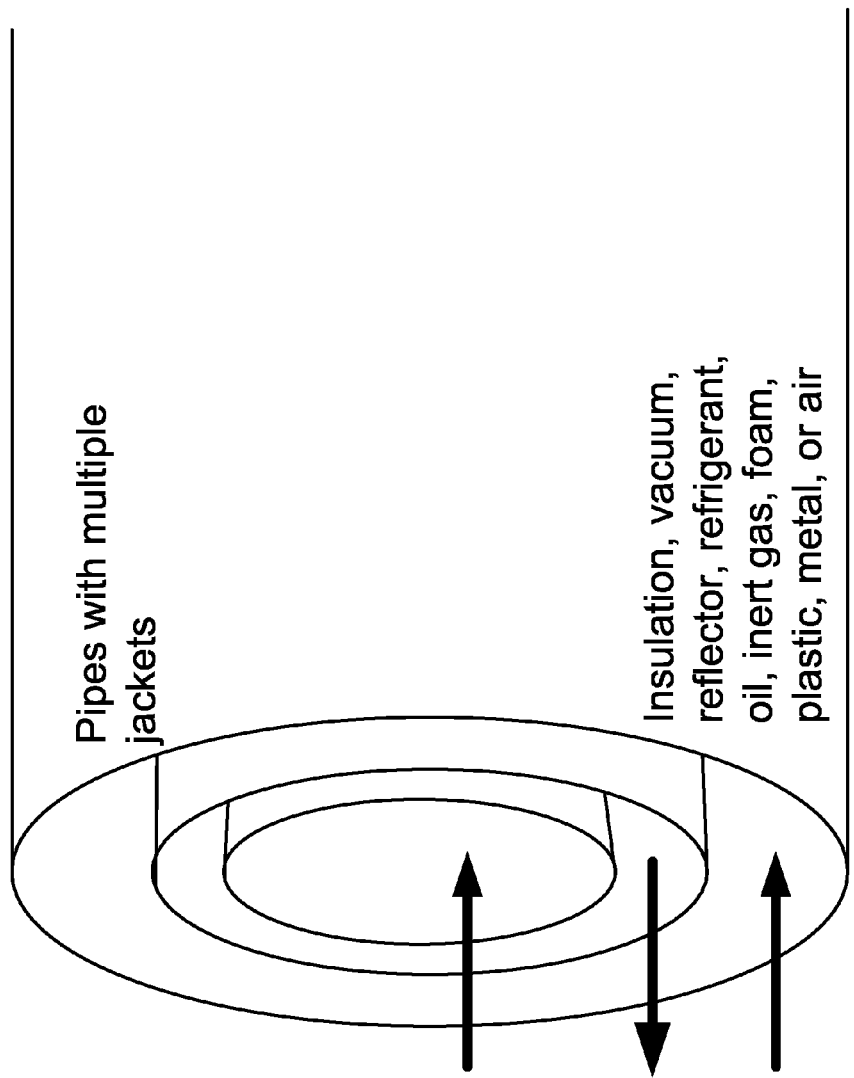
FIG. 11 shows an example/embodiment for the flexible pipes or non-flexible pipes or rigid or pieces, with multiple jackets inside each other.

FIG. 11 shows an example/embodiment for the flexible pipes or non-flexible pipes or rigid or pieces, with multiple jackets inside each other, e.g. circular or elliptical or square shaped cross sections, e.g. concentric tubes, e.g. with insulation, vacuum, light reflector (such as metal, like mirror, coatings or materials), refrigerants, oil, inert gas, foam, plastic, metal, or air, or the like or combinations, in between or on or in the jackets, or filled up or partially, or coated, to e.g. control heat exchanged or lost, or keep humidity, or reduce heat exchange, or reduce cost, or reflect more light or less light depending on the situation and other parameters, to e.g. control for humidity and temperature or pressure inside the tubes or in between, e.g. to optimize or for more efficiency, based on the control system and rules/rules engine.

For example, in one embodiment, in a 3-layered system of concentric tubes (see FIG. 11), the outermost tube is coated with a reflective coating such as metal, or made of a reflective material (e.g., for most wave lengths, e.g. for invisible and visible spectrums), or made of metal material or metal alloy, e.g., aluminum, to reflect the Sun light, and not absorb too much radiation energy, to reduce the temperature inside the tube, for faster condensation of water vapor/humidity at a cooler temperature, to be more efficient. In one embodiment, the next layer, going inside the tube, is an insulation layer, e.g. fiberglass or plastic, for better insulation than air, so that less Sun light gets absorbed, to reduce (or keep lower) the temperature inside the inner-most tube. In one embodiment, the next layer, going inside the tube, is another/second insulation layer, e.g. fiberglass or plastic, or a different insulator material, for even better heat insulation, e.g. for conduction, to reduce (or keep lower) the temperature inside the inner-most tube, which carries the humid air or water vapor, e.g. to the tower at shore, at a cooler temperature, to be more efficient for water collection/condensation.

FIG. 11 also shows an example/embodiment for the circulation of air or other liquid or fluid back and forth in different/multiple M jackets or layers (1, 2, 3, . . . , n layers) between the pipes, for cooling/heating or transportation purposes. For example, the cold air generated or dry air generated, in the processes shown here, can be fed back to another place. For example, the dry air or cool air can be used/redirected/fed for forced air supply for cooling a house for humans, saving energy for the house consumption.

Figure 12:
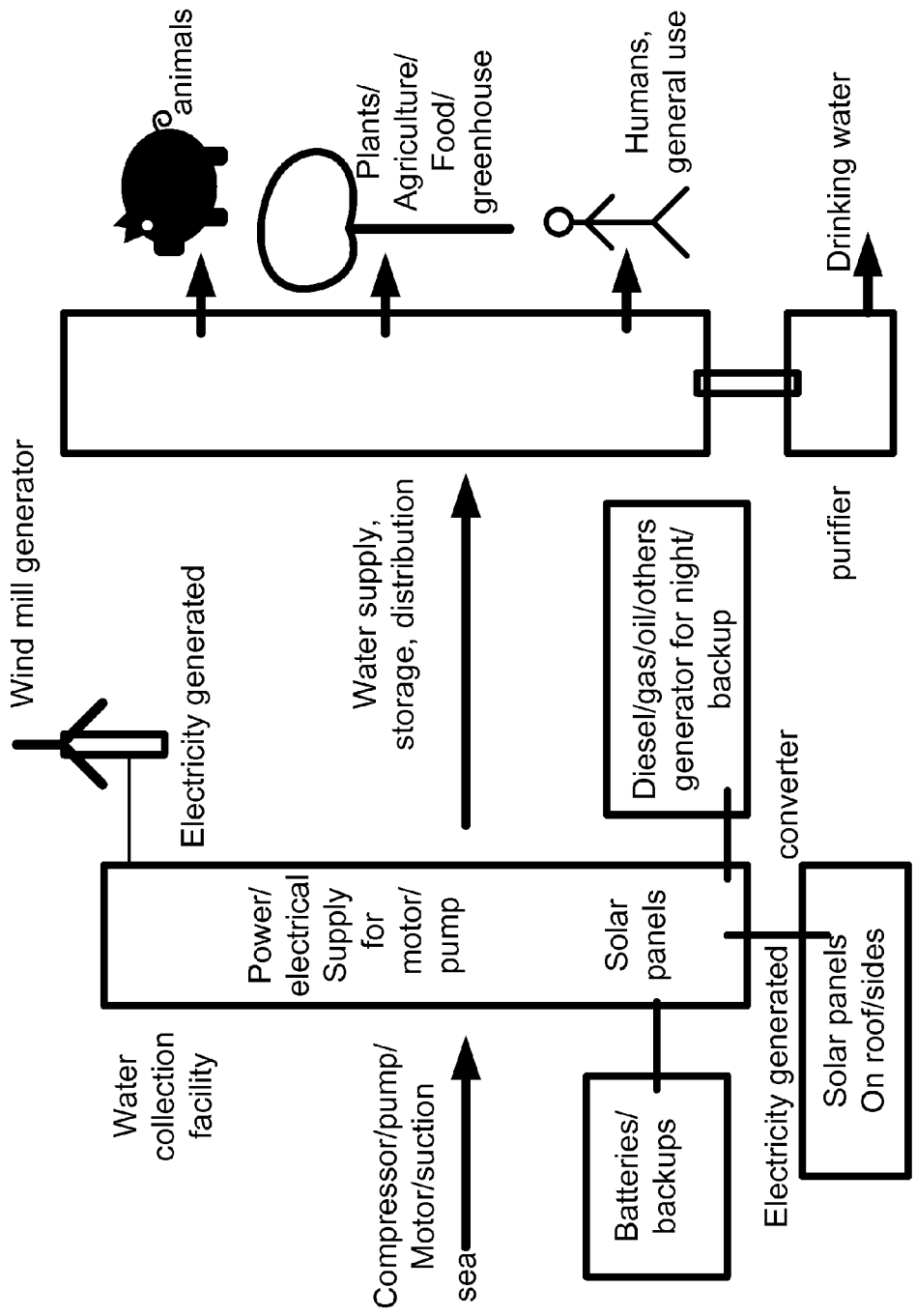
FIG. 12 shows an example/embodiment for the system with water coming or collected from humidity from sea, and the motors or fans are energized or powered by the solar or wind or ocean wave energy generators.

FIG. 12 shows an example/embodiment for the system with water coming or collected from humidity from sea, and the motors or fans are energized or powered by the solar or wind or ocean wave energy generators, as well as coal or gas generators, as a backup, and not as main source, which can also be stored on batteries, e.g. for nights, as backups, and the solar panels being e.g. on the roofs and sides of the structure or tower or buildings. Then, the water is collected and distributed to humans, animals, or plants, with some purifications for drinking purposes, or e.g. for green houses or land for agriculture.

Figure 13:
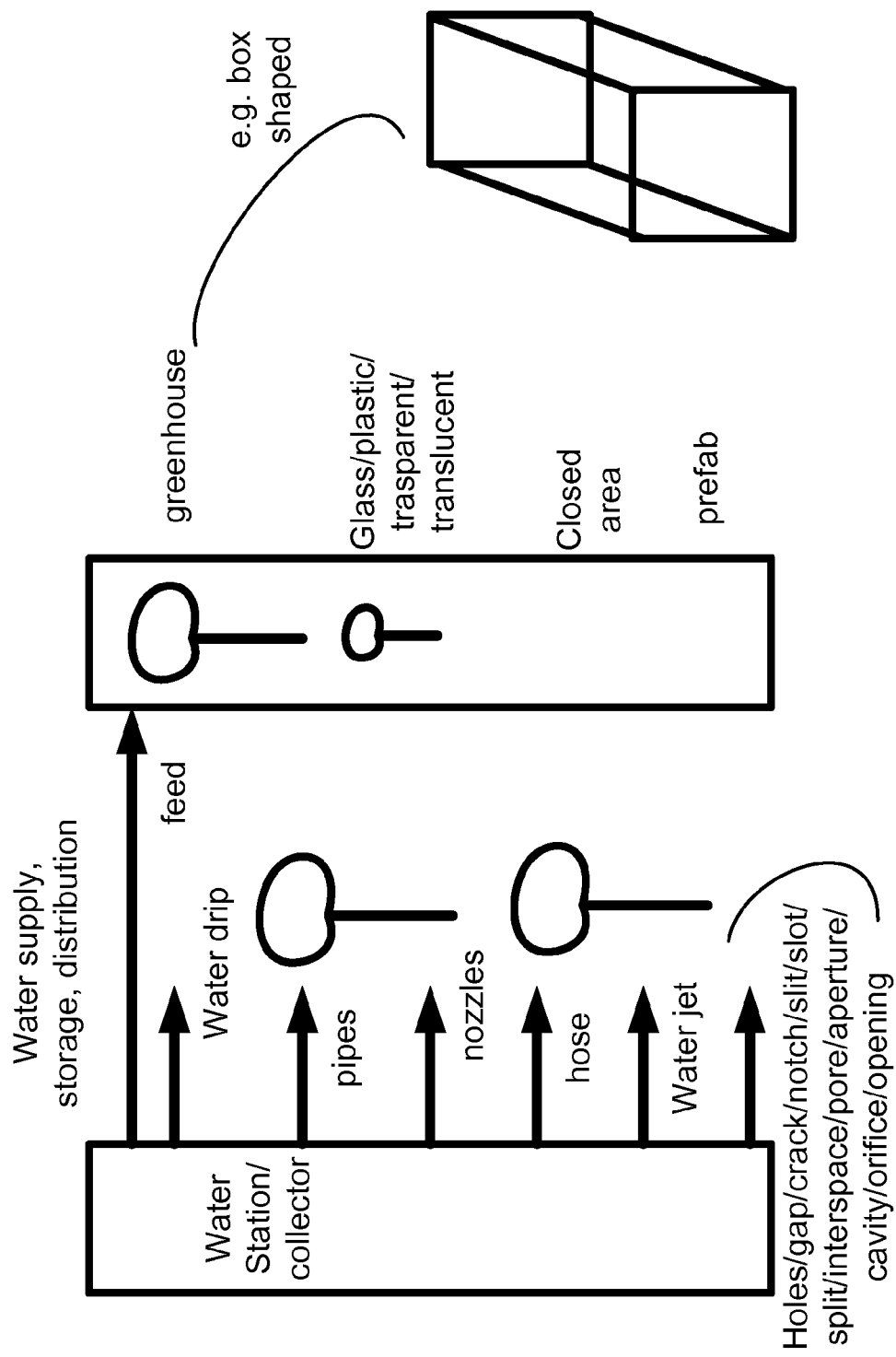
FIG. 13 shows an example/embodiment for the system with water coming or collected from humidity from sea, with various distribution means, e.g., nozzles, or pipes to the green houses or closed enclosures, such as rectangular box housing.

FIG. 13 shows an example/embodiment for the system with water coming or collected from humidity from sea, with various distribution means, e.g., nozzles, or pipes to the green houses or closed enclosures, such as rectangular box housing, e.g. with glass or transparent wall(s) and/or roof, or non-transparent wall or roof, or translucent wall or roof, or reflective/mirror wall or roof, or solar panels on wall or roof, or insulating material wall or roof, e.g. with fiber glass material in between shingles/roof and ceiling surface, e.g. to keep the temperature lower at the enclosed housing, for more availability of liquid water for the plants inside the box or housing or enclosed garden.

Figure 14:
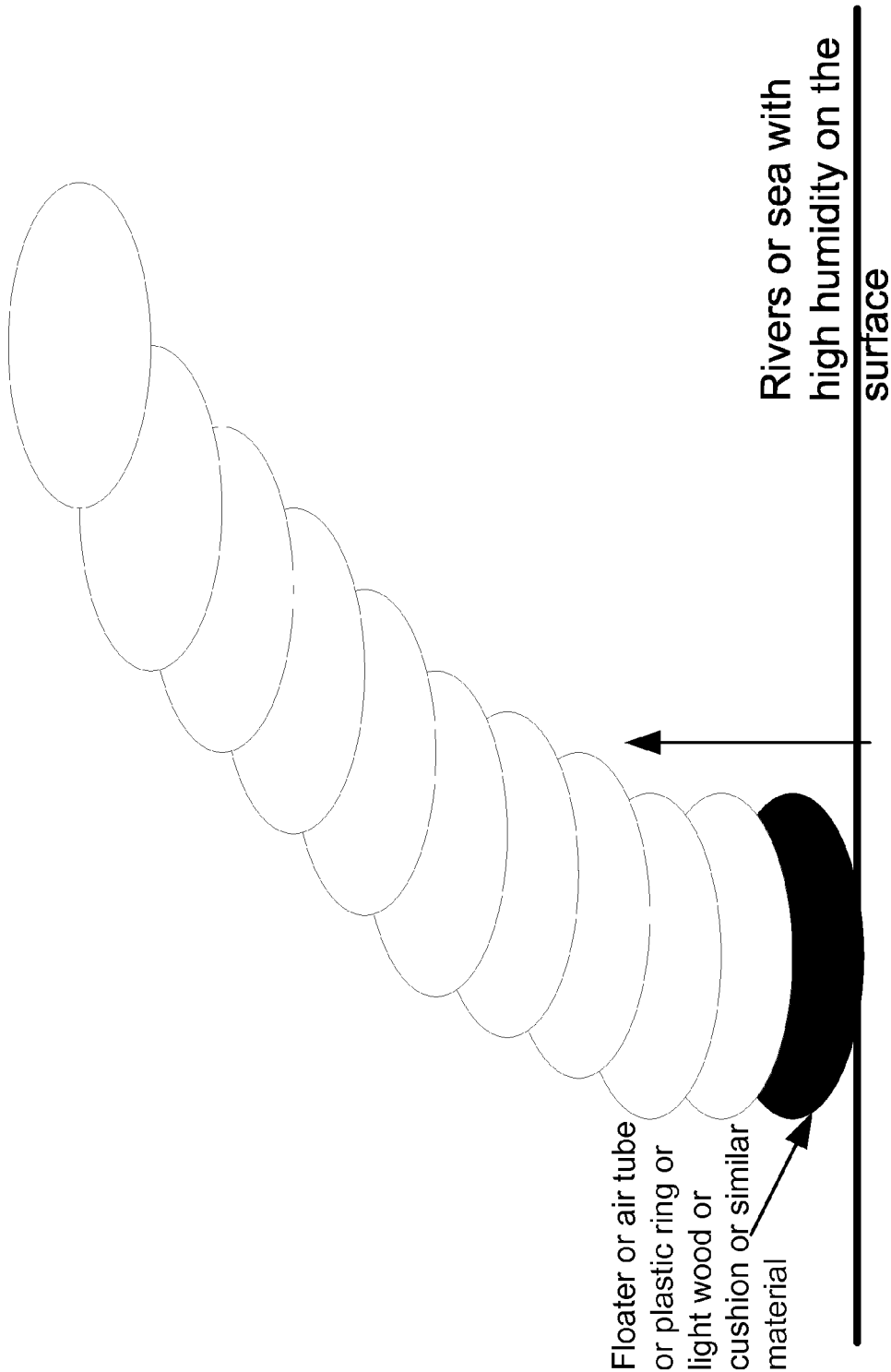
FIG. 14 shows an example/embodiment for the system with e.g. the tube staying on sea surface, using a light weight floater, such as a tire tube with air in it, or wooden material, or hollow plastic floater.

FIG. 14 shows an example/embodiment for the system with e.g. the tube staying on sea surface, using a light weight floater, such as a tire tube with air in it, or wooden material, or hollow plastic floater, with overall average density of all assembly to be smaller density than the density of the water, at about 1 gm/cm$^3$.

Figure 15:
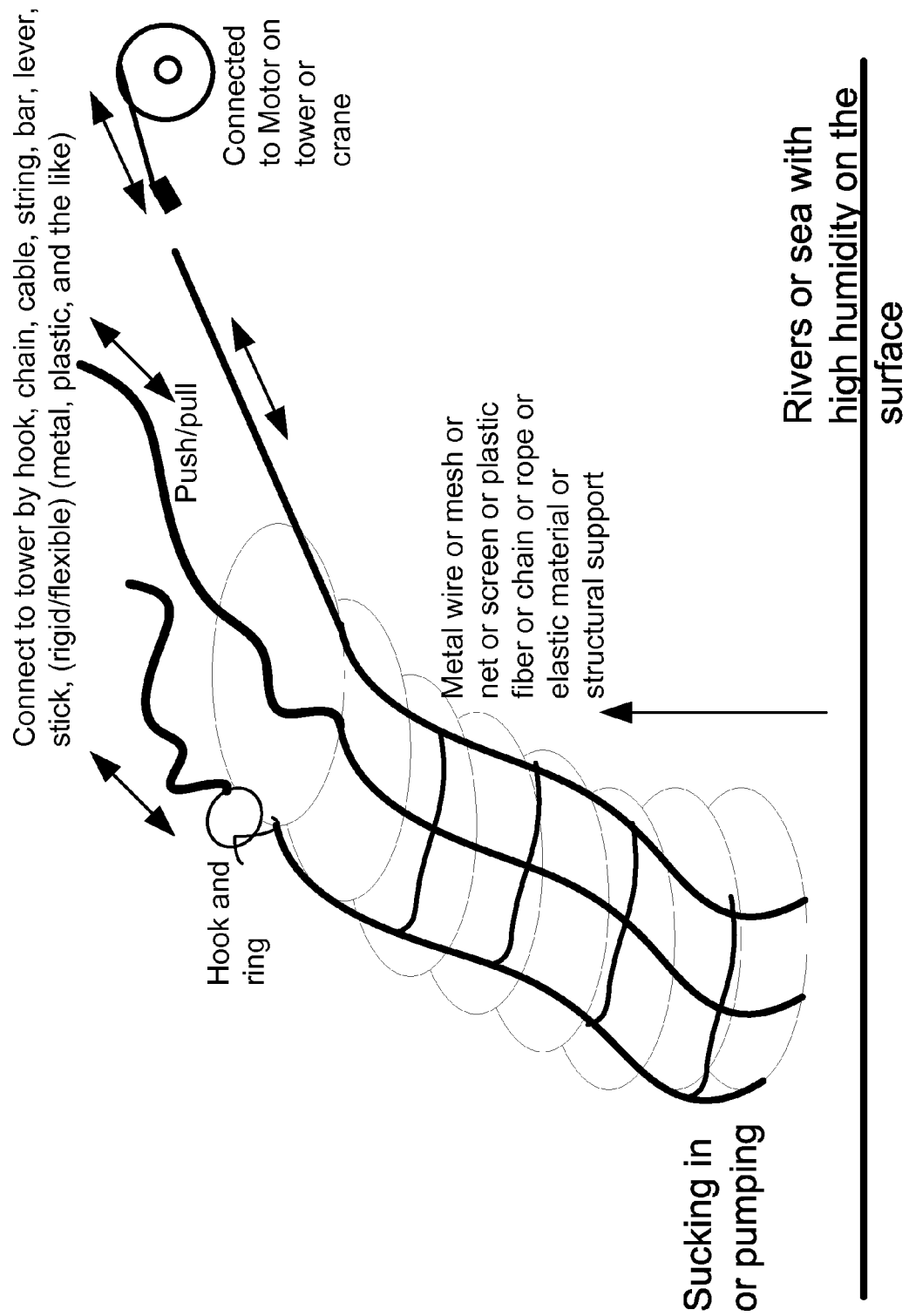
FIG. 15 shows an example/embodiment for the system with wire mesh or net or chains or cables or fabrics, holding the assembly together.
Figure 18:
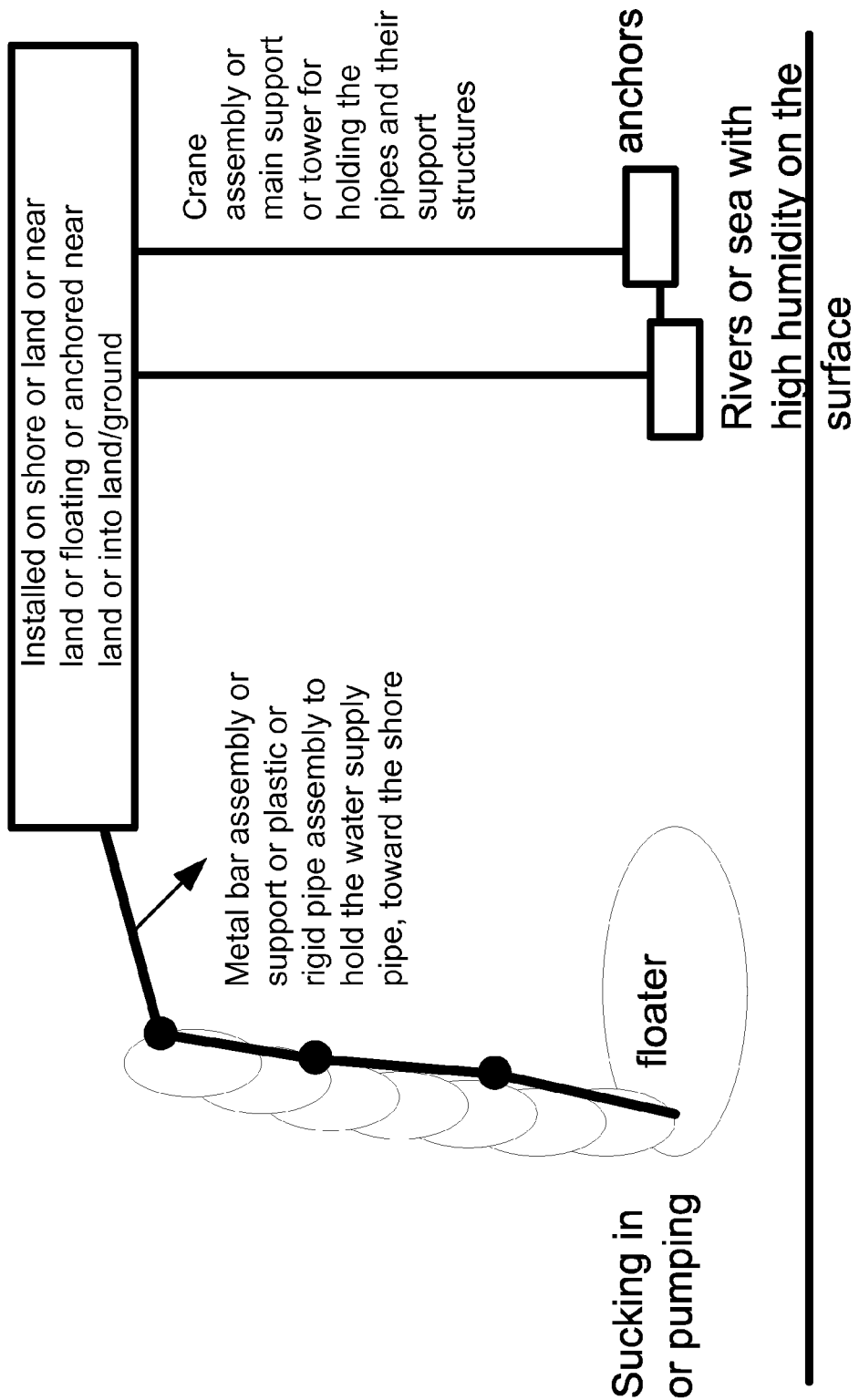
FIG. 18 shows an example/embodiment for the system with metal bars for flexible pipes (or rigid pipes), to hold them intact.

FIG. 15 shows an example/embodiment for the system with wire mesh or net or chains or cables or fabrics, holding the assembly together, from right side of the FIG. 15, connected or attached to the tower, at the shore, hanging on the air, on top of the sea surface, which is controllable from the tower, in terms of reach or extension or length of the assembly, using the net or mesh to pull the assembly toward the tower or shore, when needed, or release it more, away from the shore, by loosening the grip on the net, which is flexible for the assembly and net, to get away from tower, and increases the length of the assembly and its reach. The same thing can be done with solid bars that hold the assembly, instead of net, with the control from the tower at the shore, to bend the bars at the hinges or elbows, to reduce the reach of the assembly/its effective length, as shown in FIG. 18.

FIG. 15 also shows some embodiments related to connection to the tower or crane, for connecting to a motor, for push/pull operation on the arm or assembly, with options such as cable, chain, hook/ring, or bar, with flexible, solid, or elastic material, e.g., metal, alloys, or twisted metal strings/rope, e.g. rust-proof, stainless steel, coated, or painted. The motor can be installed on the tower or crane, working in both directions, rotating, for push/pull operations.

Figure 16:
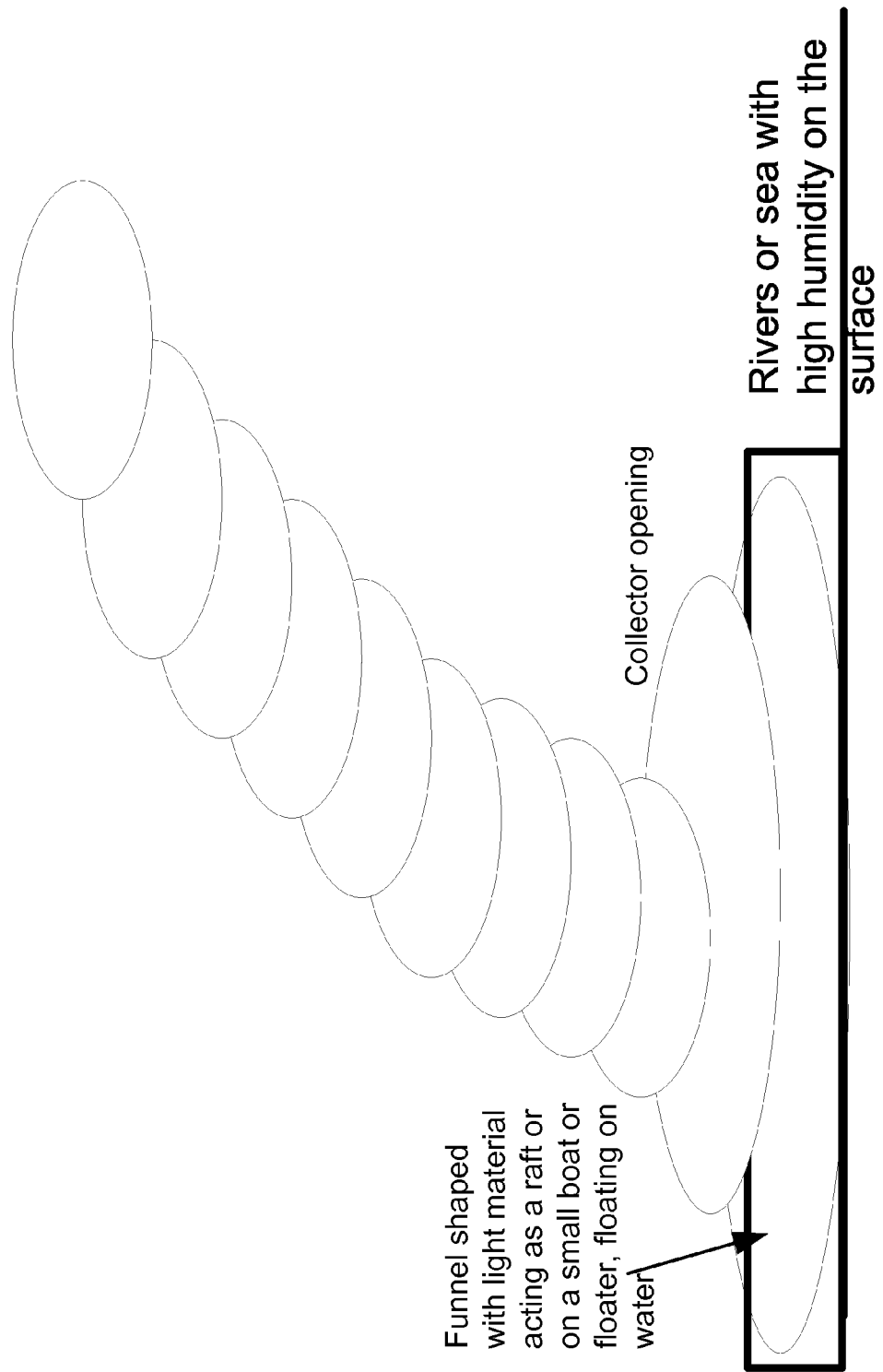
FIG. 16 shows an example/embodiment for the system with funnel collector with wide entrance or opening, for wider reach on sea surface.

FIG. 16 shows an example/embodiment for the system with funnel collector with wide entrance or opening, for wider reach on sea surface. This can be hanging on air, like FIG. 15, or floating, like FIG. 16.

Figure 17:
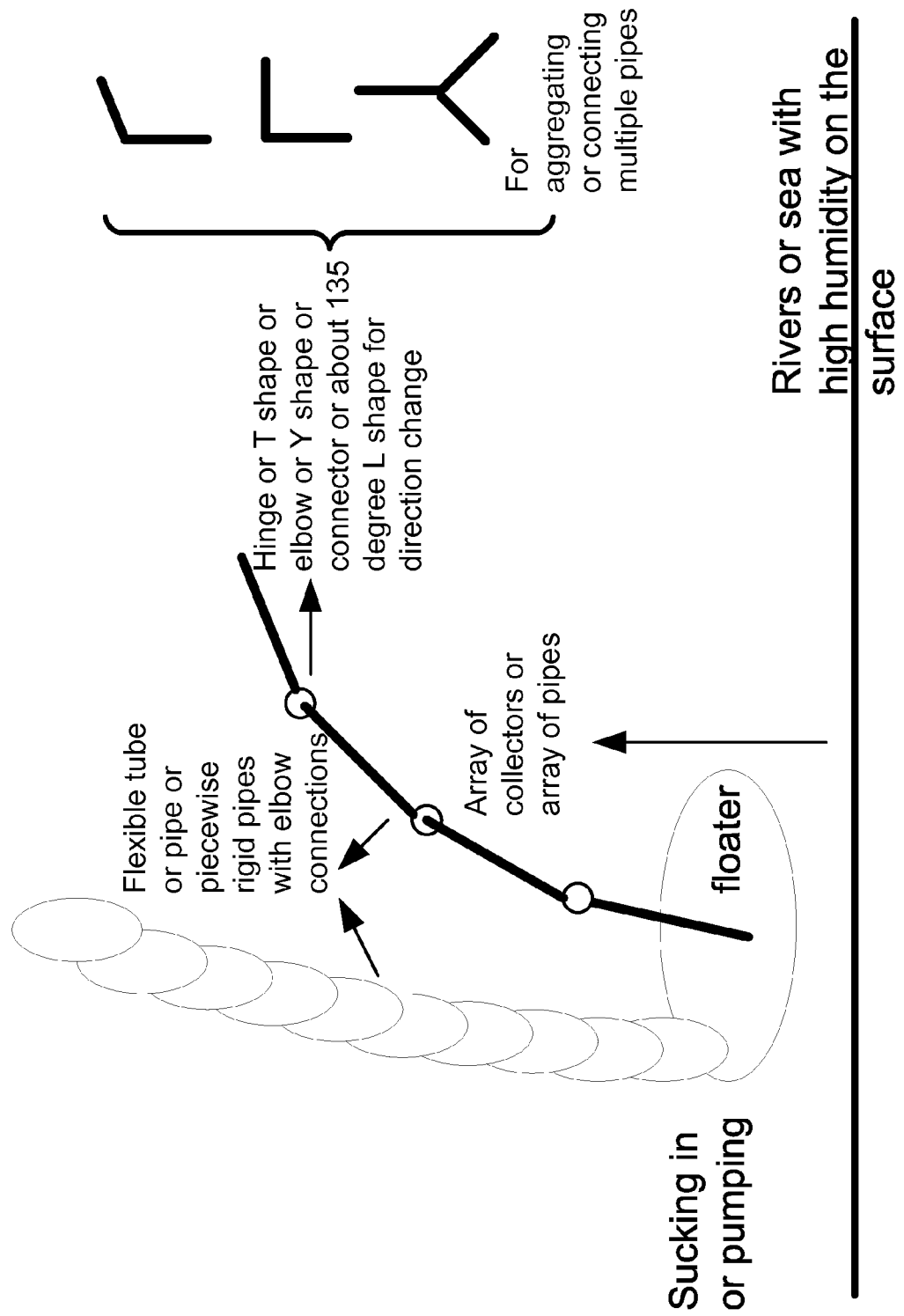
FIG. 17 shows an example/embodiment for the system with multiple or arrays of collectors on each floater, with multiple floaters (or hanging on the air, similar to FIG. 15).

FIG. 17 shows an example/embodiment for the system with multiple or arrays of collectors on each floater, with multiple floaters (or hanging on the air, similar to FIG. 15), using both or any of the flexible piping or rigid piping (with elbows or hinges, shown in Fig.), to get the water/humidity to the tower, using e.g. various connectors or reduces or hinges in between.

FIG. 18 shows an example/embodiment for the system with metal bars for flexible pipes (or rigid pipes), to hold them intact, for strength/stability of assembly shown, holding on air or floating, similar to FIGS. 15-16, attached to the tower, by metal or other types of bars or chains or cables, e.g. using a crane and a hook on the crane, which is on or attached to the tower, which is anchored to the ground or sea shore.

Figure 19:
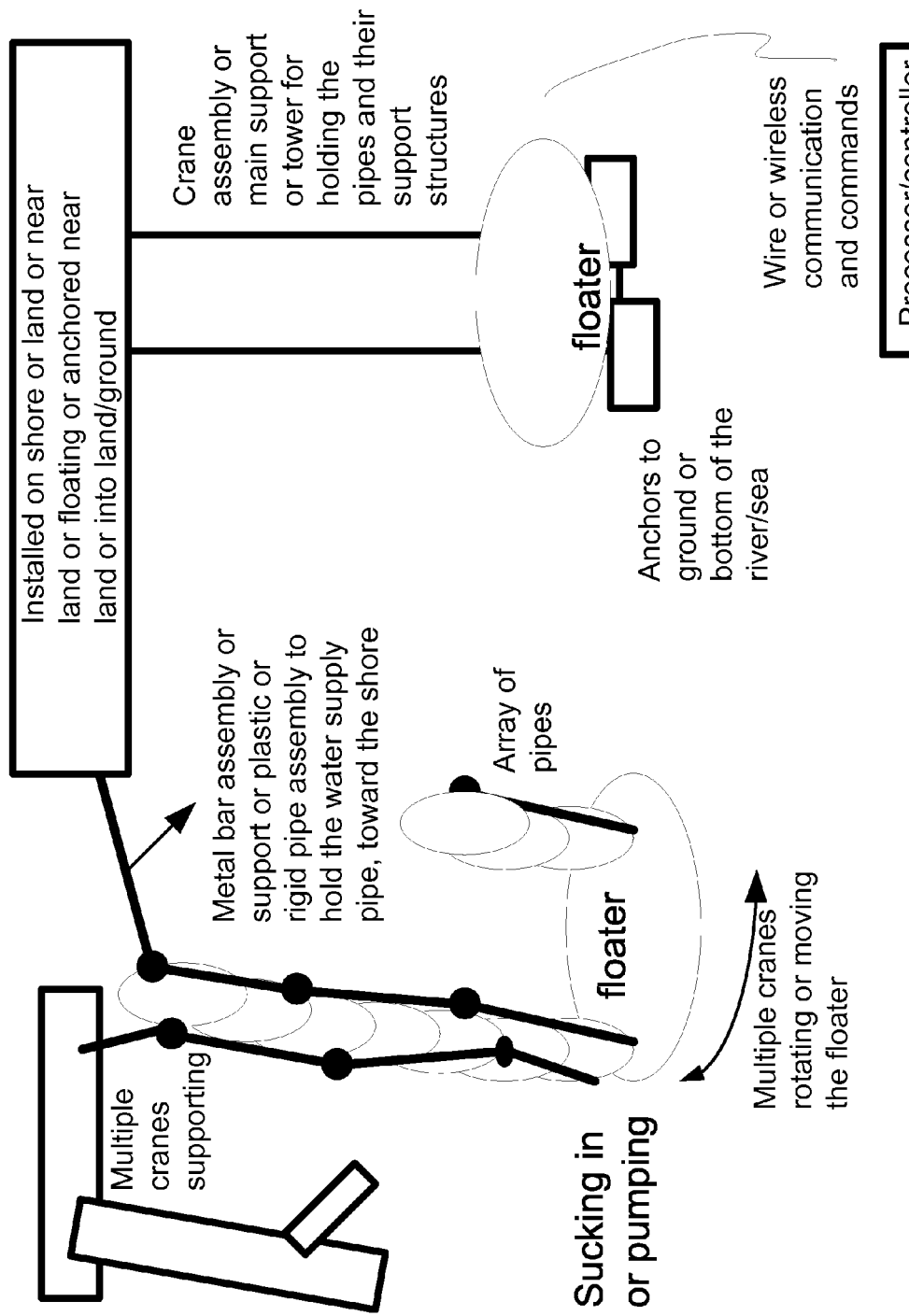
FIG. 19 shows an example/embodiment for the system with multiple metal bar systems or assemblies, attached to multiple cranes or towers (two or more), for better control on length or position or rotation of the collector tip near the water.

FIG. 19 shows an example/embodiment for the system with multiple metal bar systems or assemblies, attached to multiple cranes or towers (two or more), for better control on length or position or rotation of the collector tip near the water, for one or more of piping assemblies or collectors, or array of them, to control from tower by human or by computer, based on image of the assembly/analysis, and based on control system analyzing those images to position the collector tip's coordinate, e.g. height, from sea surface, length, or reach, away from tower or shore.

The camera(s) or sensors are on the floater, or pipes, or cranes, or towers, or at sea shore. They all can be connected by wire for power, or using battery, or solar panel powered, or wind mill powered, or other renewable methods, and they are also connected by cable for communications, or wirelessly, by antennas or satellite or dishes, or laser/optical communications, or other means of communications.

So, in one embodiment, each collector tip can be navigated or positioned or controlled separately by one or more cranes. In one embodiment, each floater with one or more collector tips can be navigated or positioned or controlled separately by one or more cranes, in all 3D coordinates, e.g. height, rotation, tilt, diagonal plane, or XY horizontal 2D coordinates, with respect to sea surface, assuming flat horizontal 2D plane.

For example, for transitional coordinate on 2D, or XY coordinate, or horizontal plane, if we have 2 cranes on left and right side of a single collector tip, and both connected to the same collector tip, then we have, from FIG. 19, as an example:

If we pull from left crane, then the collector tip goes to the left side.

If we pull from right crane, then the collector tip goes to the right side.

If we pull from left crane, and push from right crane, then the collector tip rotates clockwise, with asymmetric positioning as shown e.g. in FIG. 19.

If we pull from right crane, and push from left crane, then the collector tip rotates counter-clockwise, with asymmetric positioning as shown e.g. in FIG. 19.

In one embodiment, the crane can be connected to the assembly or arm/net for supporting the pipes, using cable, strings, chain, cable(s), and the like, and it can be pulled or pushed using e.g. a motor, rotating in 2 different directions, forward/reverse, attached to such cable or chain, as an example, as shown in FIG. 15. Everything is controlled by server/computer/processor at central HQ, e.g. using wireless communications, for control/analysis/decisions/navigations.

In one embodiment, the crane or tower is land-based or sea-based or on sea-shore or anchored at sea or seashore or on land, with concrete blocks or metal anchors or the like, or floating near the shore.

In one embodiment, the high wind from sea, e.g. Red Sea, brings a lot of moisture from sea to the shore, which is seasonal or during some periods, without use of a fan or motor, which saves a lot of energy, as long as the weather forecast tells the controller to turn off the fans and get the collector tips vertical, and aligned in the direction of the wind at the seashore or land, to collect moisture, with min cost and effort. The local sensor and wind direction detector, locally, can do the same for controlling the collector tip's direction and orientation and location, attached to the controller device locally, or at HQ centrally, or distributed computation power. The tip of the collector is positioned by cranes, by cables or chains or strings or levers or bars, or by motors directly, e.g. using gear or gear box, to position in many different directions or angles in 3D coordinates. Some dedicated collector tips can also be stationed only for land based collection, permanently based there, as an example.

Figure 20:
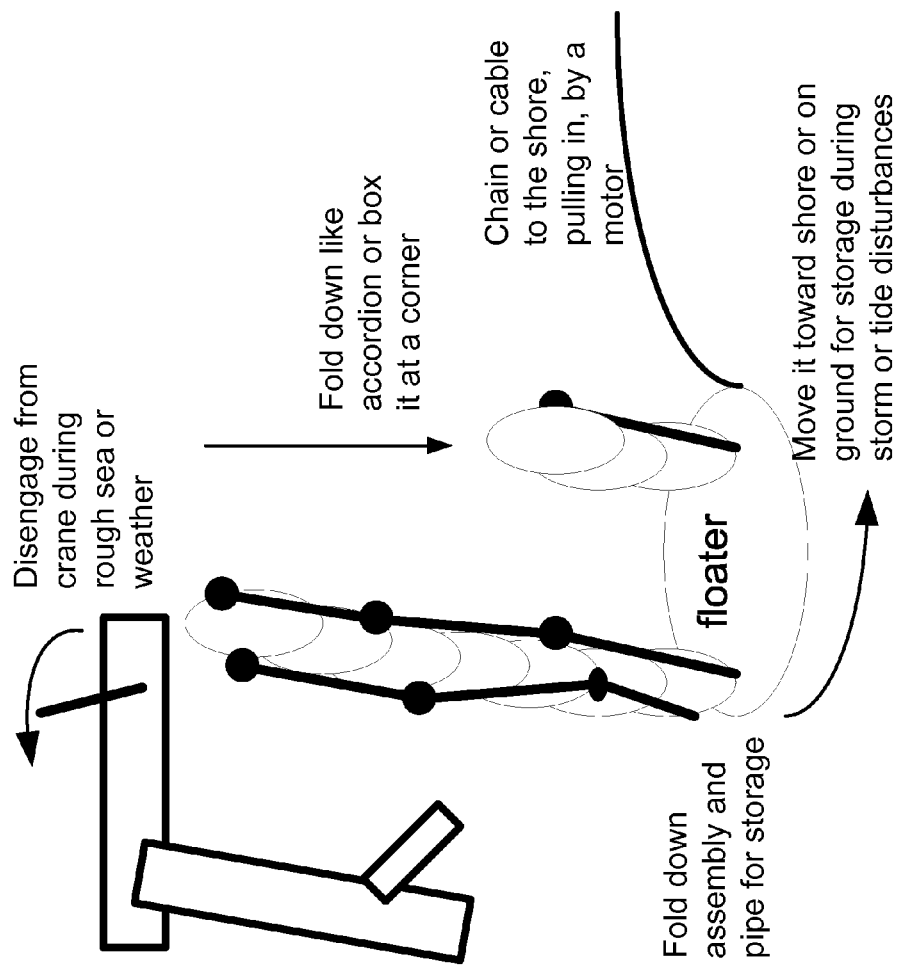
FIG. 20 shows an example/embodiment for the system with disengaging rod or chain, to fold down the assembly or arm, and pull back the floater by an extra cable or crane toward the shore.

FIG. 20 shows an example/embodiment for the system with disengaging rod or chain, to fold down the assembly or arm, and pull back the floater by an extra cable or crane toward the shore, e.g., using a motor, for safety and storage, or e.g. push down by crane or its own weight to store the accordion shaped arm or assembly on floater or on shore/land, during rough sea or storm or high wind.

Figure 21:
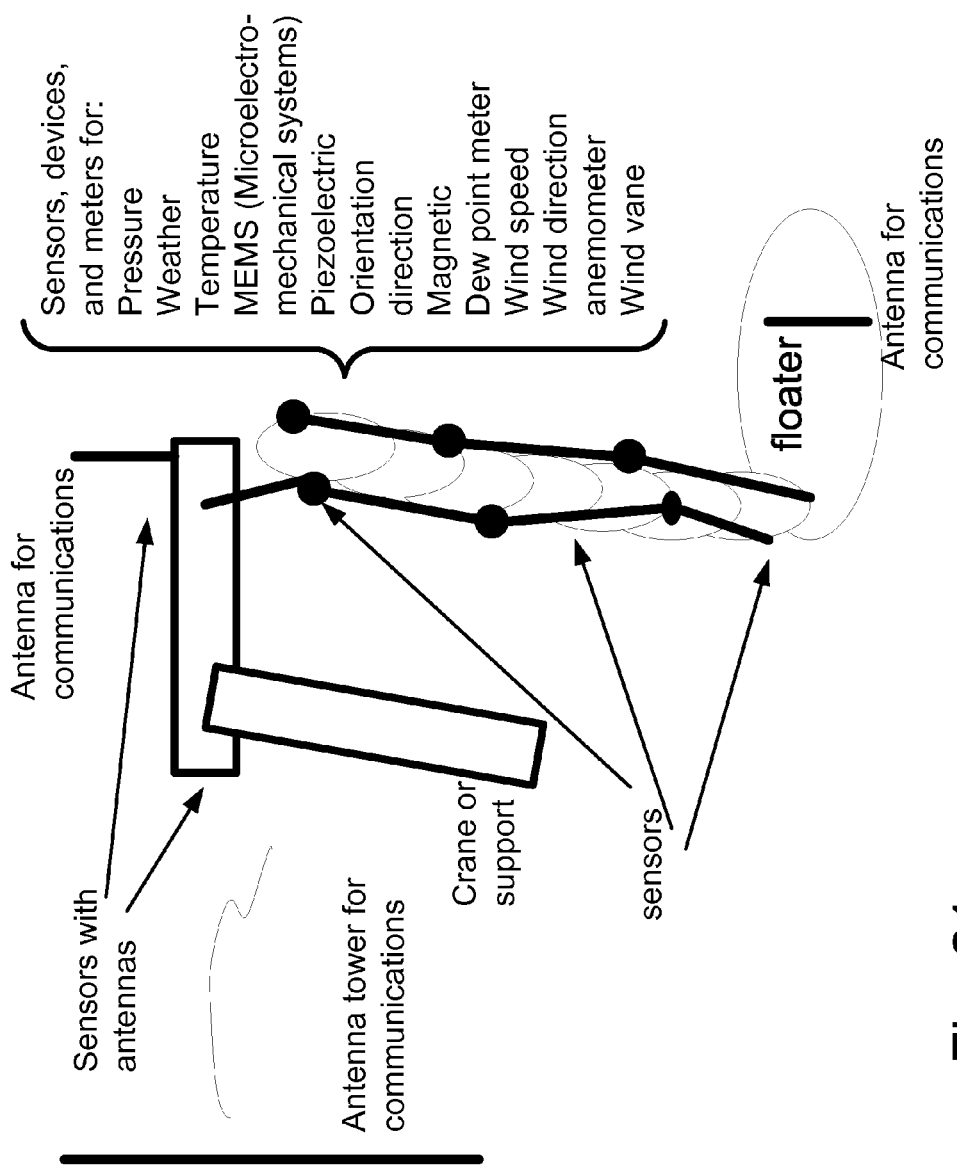
FIG. 21 shows an example/embodiment for the system with various sensors and their possible locations, so that we can get feedback to the controller and HQ or processor, so that it adjusts the cranes and collector tips.

FIG. 21 shows an example/embodiment for the system with various sensors and their possible locations, so that we can get feedback to the controller and HQ or processor, so that it adjusts the cranes and collector tips. It uses various communication tools, such as antenna in different locations.

Figure 22:
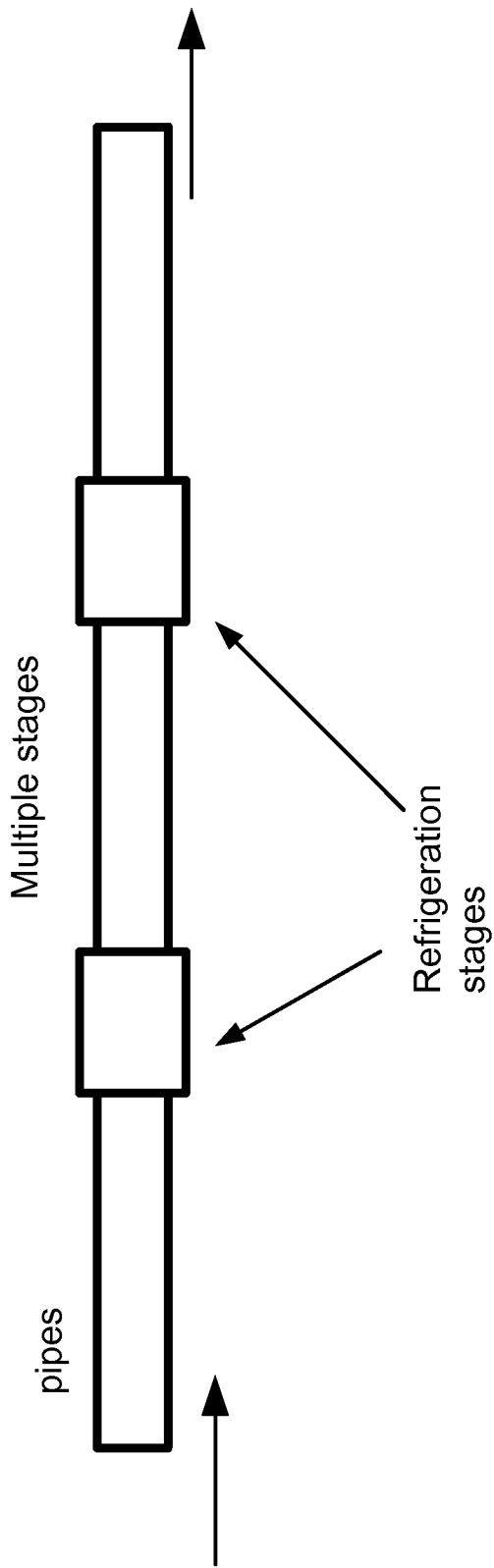
FIG. 22 shows an example/embodiment for the system with various/multiple stages for refrigeration, along the pipes.
Figure 23:
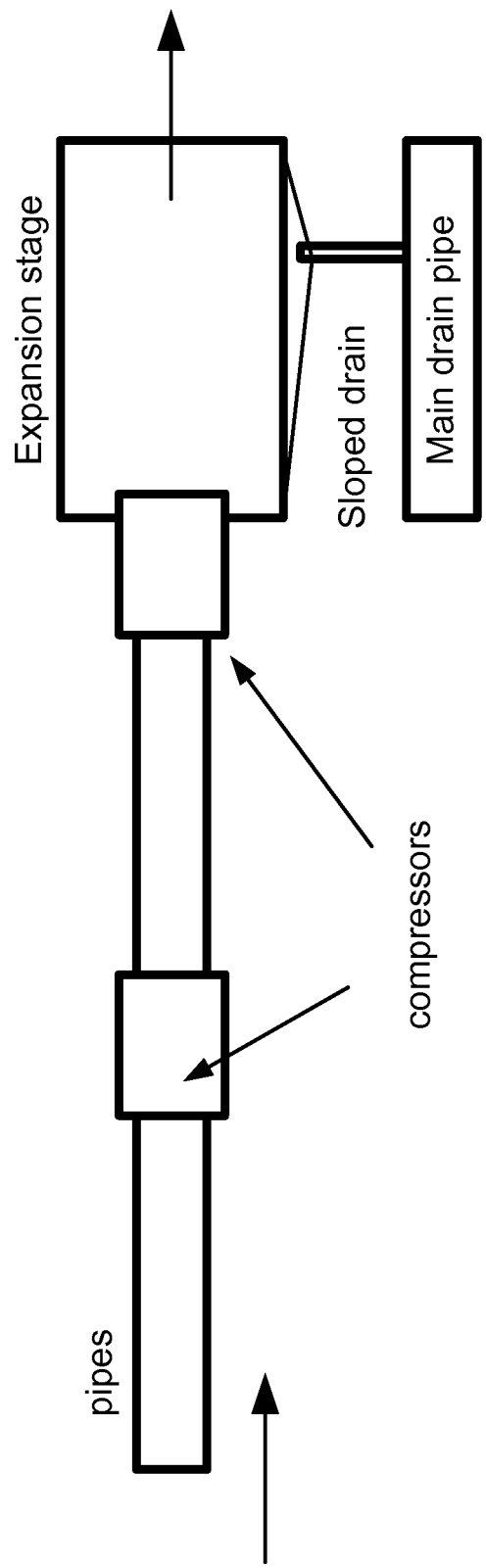
FIG. 23 shows an example/embodiment for the system with various/multiple stages for compressors, along the pipes, with an expansion chamber at the end.

FIG. 22 shows an example/embodiment for the system with various/multiple stages for refrigeration, along the pipes. FIG. 23 shows an example/embodiment for the system with various/multiple stages for compressors, along the pipes, with an expansion chamber at the end, for rapidly cooling down the gas, to get the water from the humidity in air, with drain holes in the bottom of chamber, to collect and send the water into a main drain pipe, underneath the chamber, for distribution, e.g. by gravity/slope of the pipe, only, e.g. in one embodiment, without any pump or extra energy.

Figure 24:
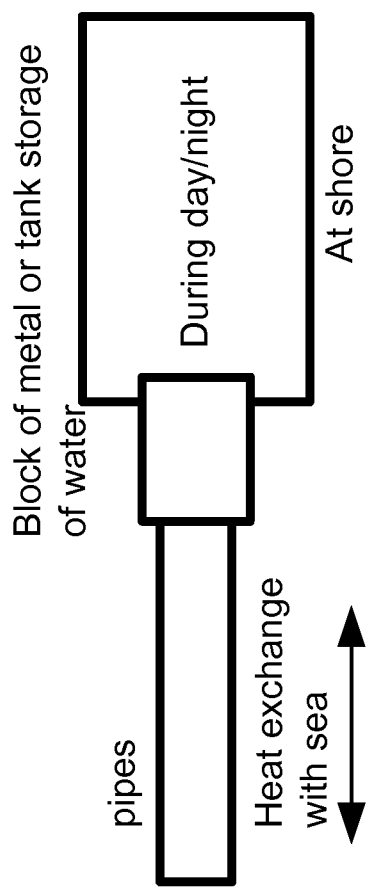
FIG. 24 shows an example/embodiment for the system with pipes exchanging heat with sea, or land, during different seasons, and day/night, at different temperatures.

FIG. 24 shows an example/embodiment for the system with pipes exchanging heat with sea, or land, during different seasons, and day/night, at different temperatures, e.g. as body of water stored by pump, or water come by tide/gravity at a storage, or e.g. exchanging heat by block of metal, or underground land based reservoir, to adjust the temperature of the pipe, to cool down, to condense water from vapor/gas form/humidity.

Figure 25:
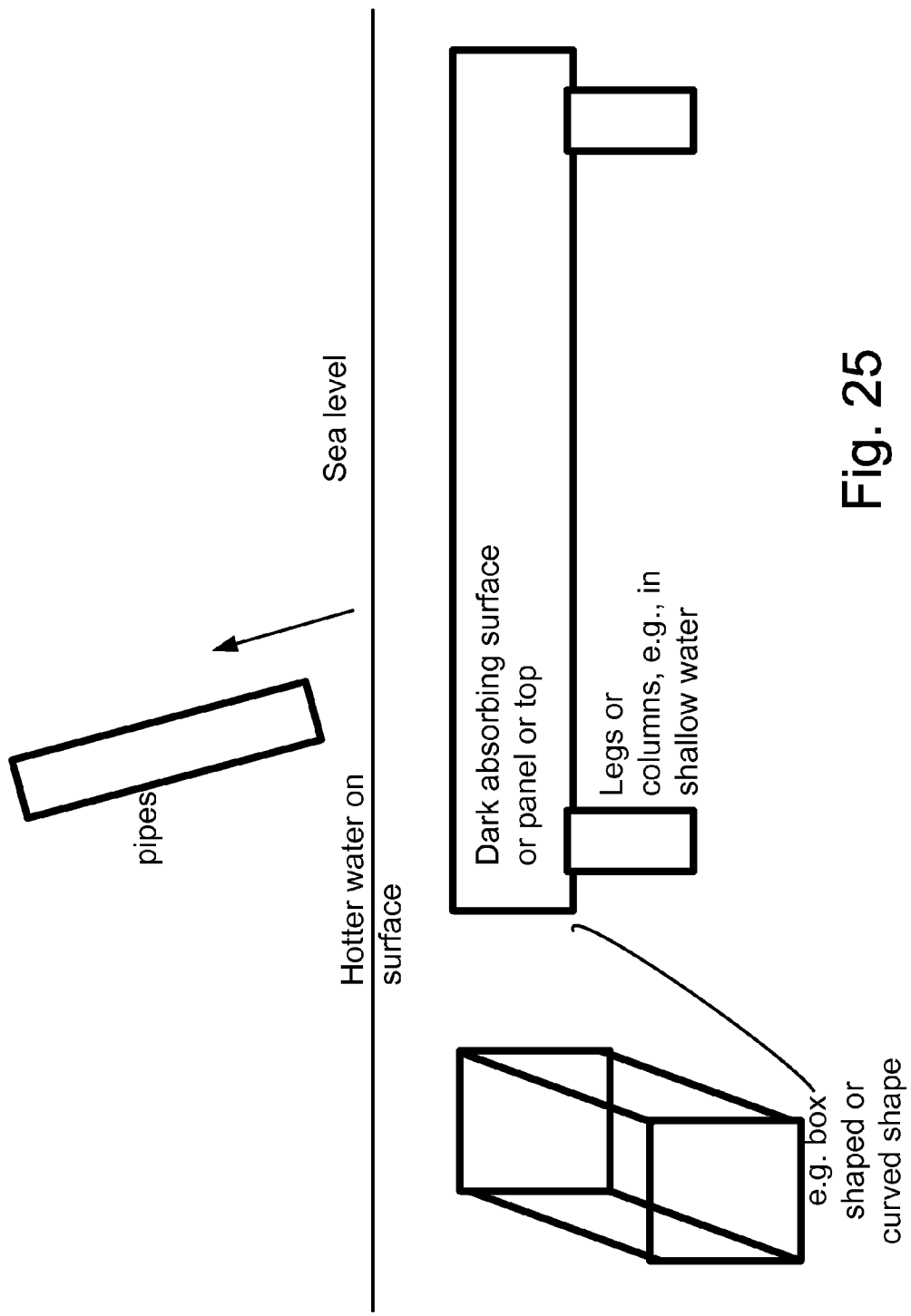
FIG. 25 shows an example/embodiment for the system with floating or structure near the surface of the sea near the shore, with dark absorbing top surface, with grains to absorb more Sun light and energy.

FIG. 25 shows an example/embodiment for the system with floating or structure near the surface of the sea near the shore, with dark absorbing top surface, with grains to absorb more Sun light and energy, to cause the water near surface gets hotter than normal, and gets more humidity to the collector tip near the surface, for water. The structure under the water or floating can be permanent or temporary or moveable.

Figure 26:
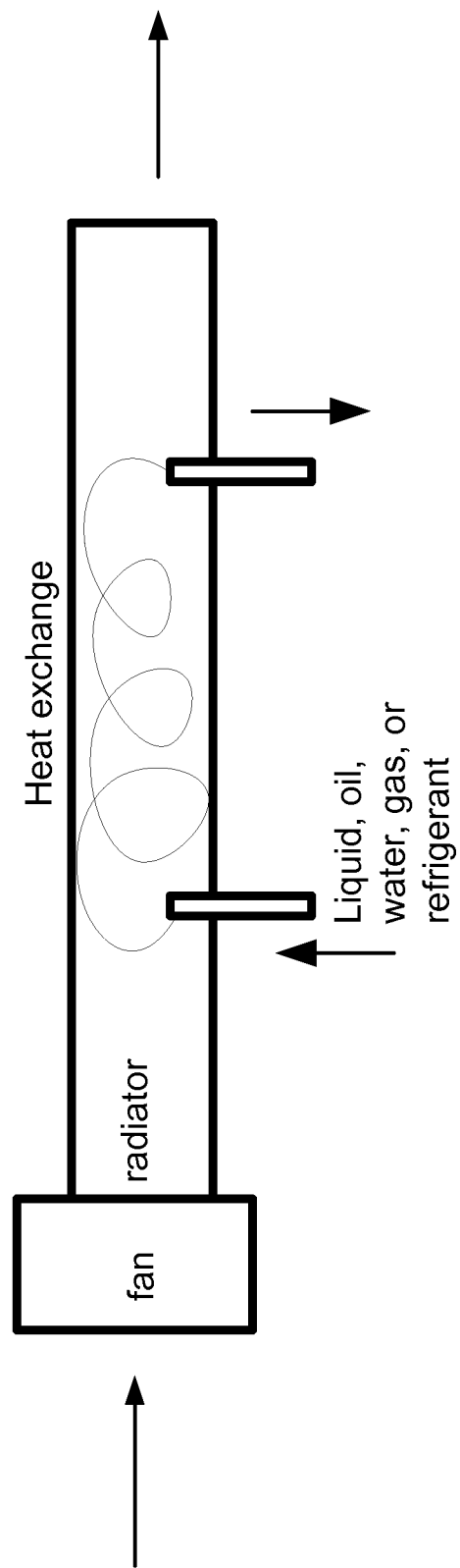
FIG. 26 shows an example/embodiment for the system with fan and radiator or heat exchanger.

FIG. 26 shows an example/embodiment for the system with fan and radiator or heat exchanger, e.g. with coils carrying oil or liquid or the like, in which humid air passes through these coils, to cool down and get humidity condensed as water, with drain funneled at the bottom of chamber, to accumulate those for main pipe, for distribution of the water.

Figure 27:
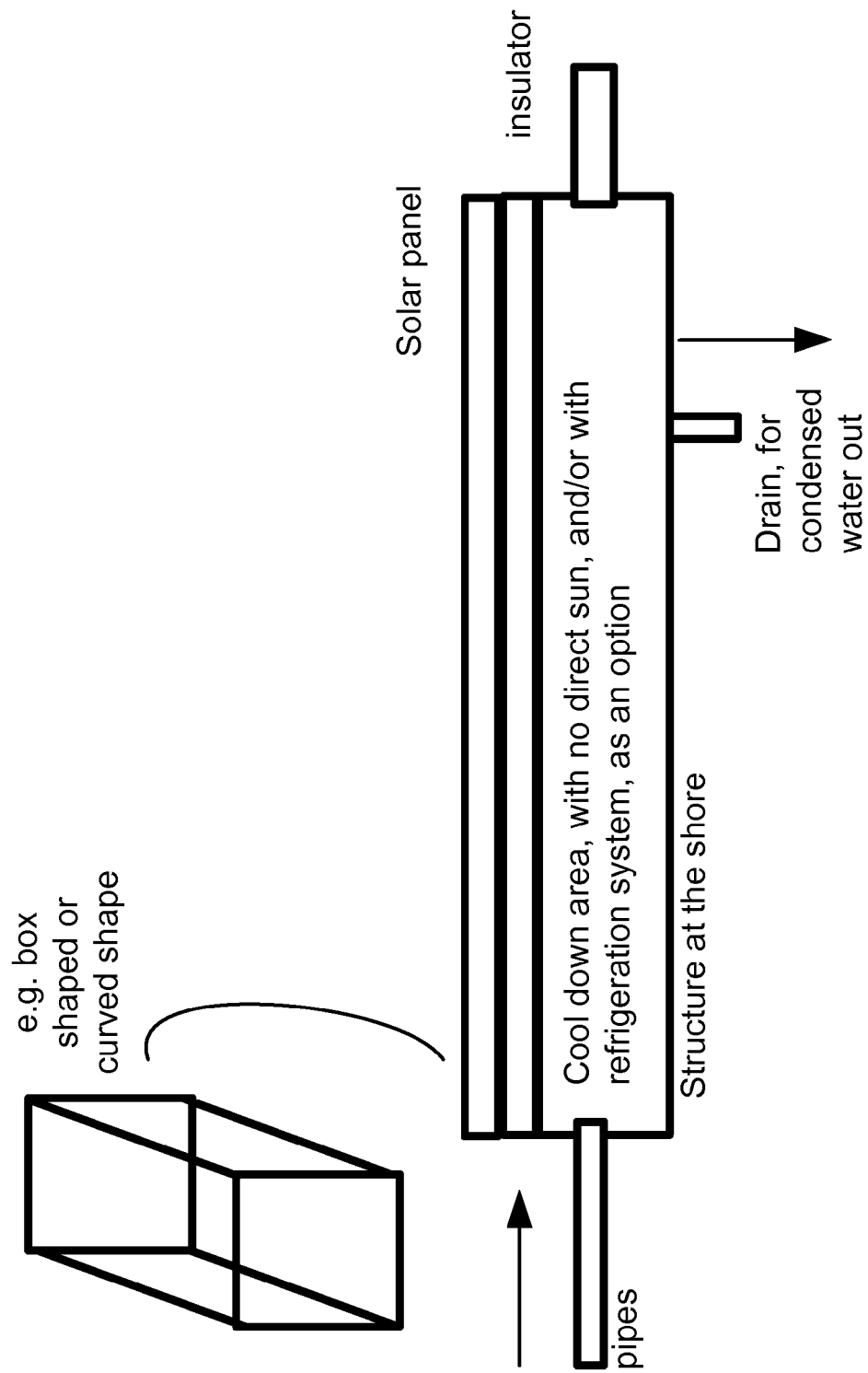
FIG. 27 shows an example/embodiment for the system with a structure with roof covered with solar panels or light reflectors.

FIG. 27 shows an example/embodiment for the system with a structure with roof covered with solar panels or light reflectors, e.g. mirror material, and insulator for heat underneath the solar panels or light reflectors, to keep the shaded area and enclosure located below at a cooler temperature, away from heat or direct Sun, to get cooler temperature underneath the shade provided, to condense water, from air passing by, through the pipe, with drain sloped to collect and direct the water by gravity/slope to the main pipe for distribution or storage or filtering or cleaning or purifying. The building structure can have any shape.

Figure 28:
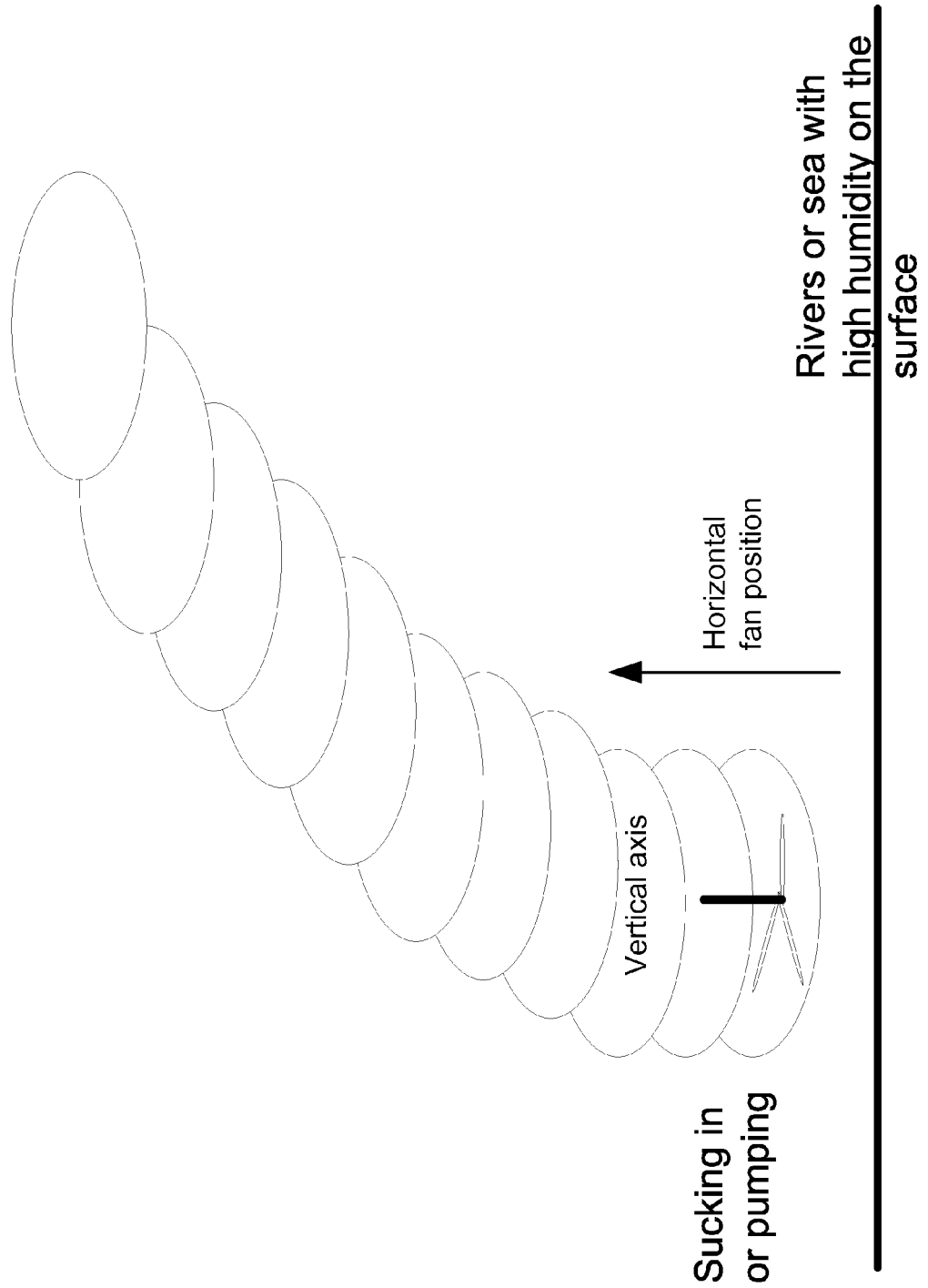
FIG. 28 shows an example/embodiment for the system with a horizontal fan or vertical fan axis, with collector tip opening located horizontally, parallel to the water or sea surface.
Figure 29:
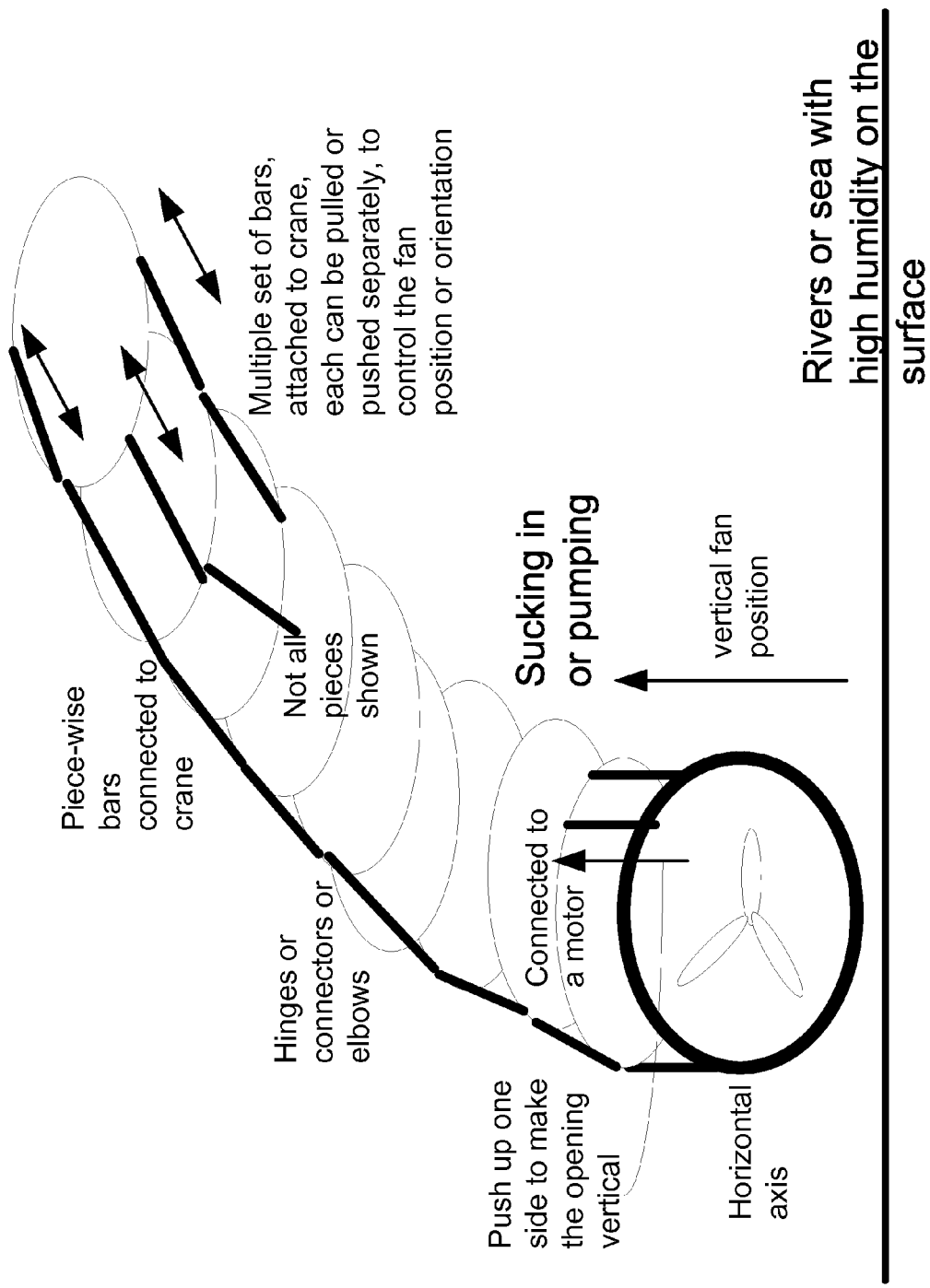
FIG. 29 shows an example/embodiment for the system with a vertical fan, connected to a motor for rotation of the fan, with cable for electricity from tower, or from solar panels on the floater or boat.
Figure 30:
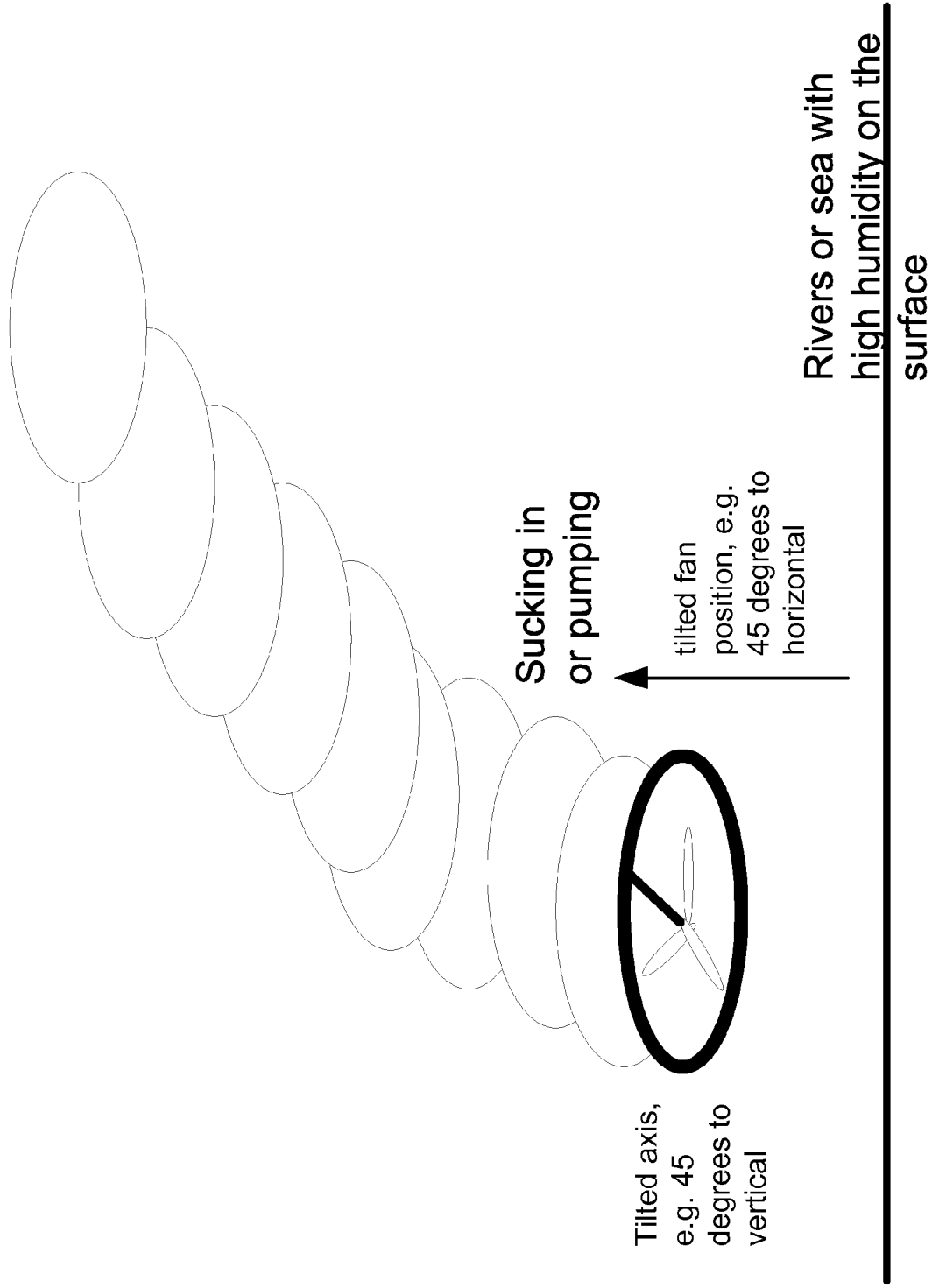
FIG. 30 shows an example/embodiment for the system with a angled fan, with plane between vertical and horizontal, 0 to 90 degrees, e.g. 45 or 60 degrees.

FIG. 28 shows an example/embodiment for the system with a horizontal fan or vertical fan axis, with collector tip opening located horizontally, parallel to the water or sea surface. FIG. 29 shows an example/embodiment for the system with a vertical fan, connected to a motor for rotation of the fan, with cable for electricity from tower, or from solar panels on the floater or boat. FIG. 30 shows an example/embodiment for the system with a angled fan, with plane between vertical and horizontal, 0 to 90 degrees, e.g. 45 or 60 degrees. The tip of the collector and its angle can be adjusted using cables or cranes or levers or rods or nets, as shown in previous Figs., with controller adjusting, centrally or locally.

Figure 31:
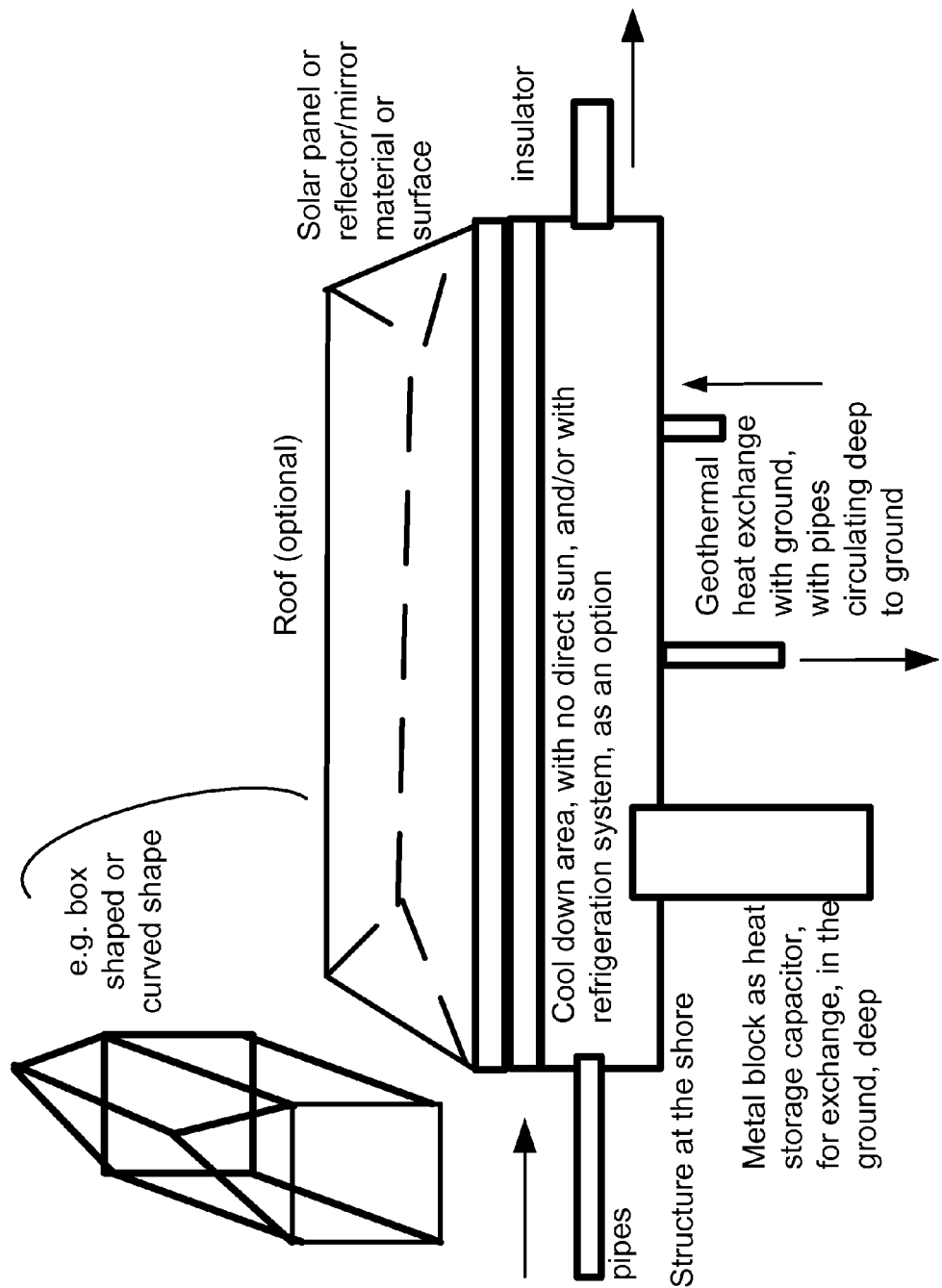
FIG. 31 shows an example/embodiment for the system with roof and heat exchanger with ground, plus insulation coverage, to cool down and extract water.
Figure 32:
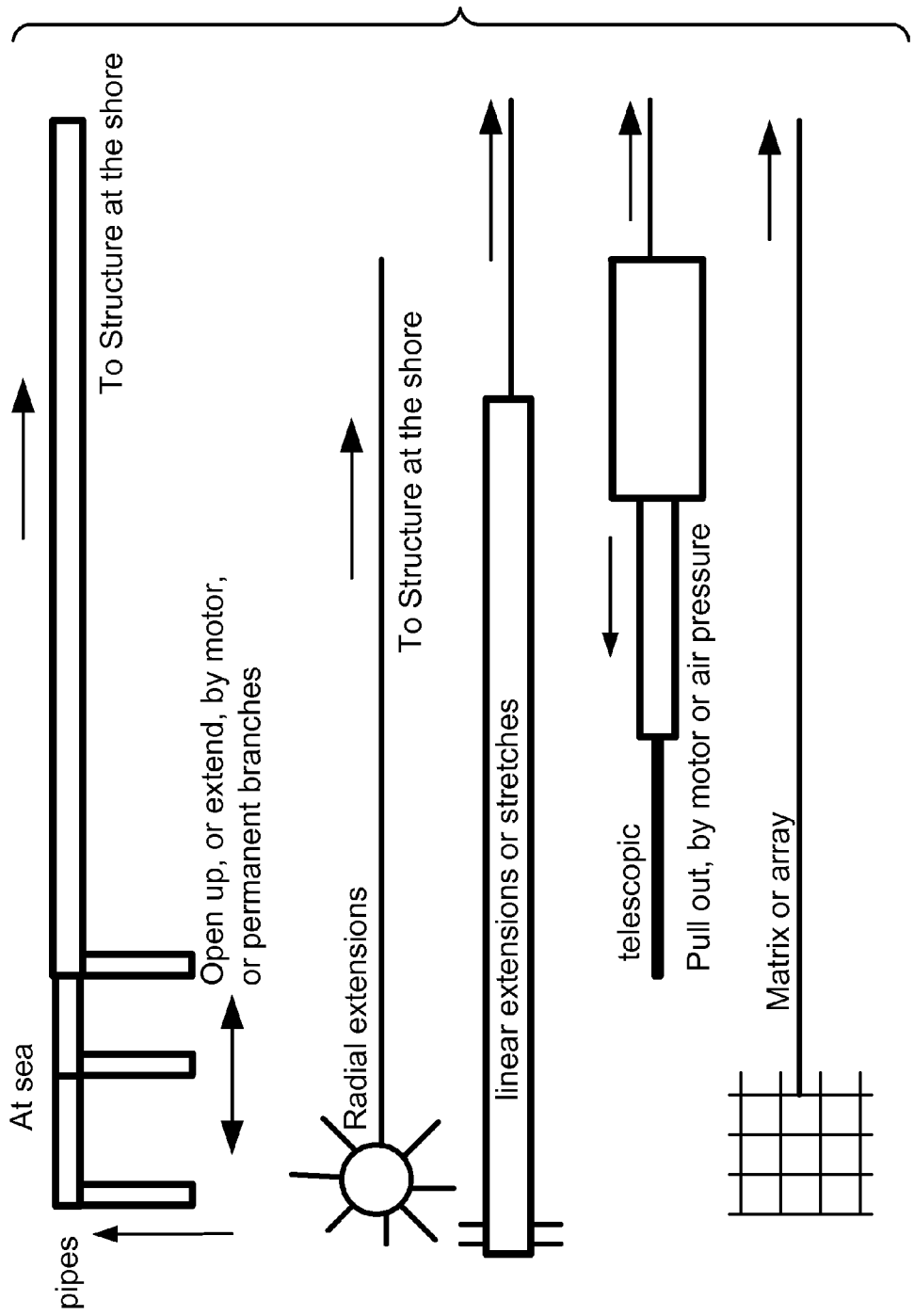
FIG. 32 shows an example/embodiment for the system with various extensions or arms for different configurations for collector section, to collect water on the sea.

FIG. 31 shows an example/embodiment for the system with roof and heat exchanger with ground, plus insulation coverage, to cool down and extract water. FIG. 32 shows an example/embodiment for the system with various extensions or arms for different configurations for collector section, to collect water on the sea.

Figure 33:
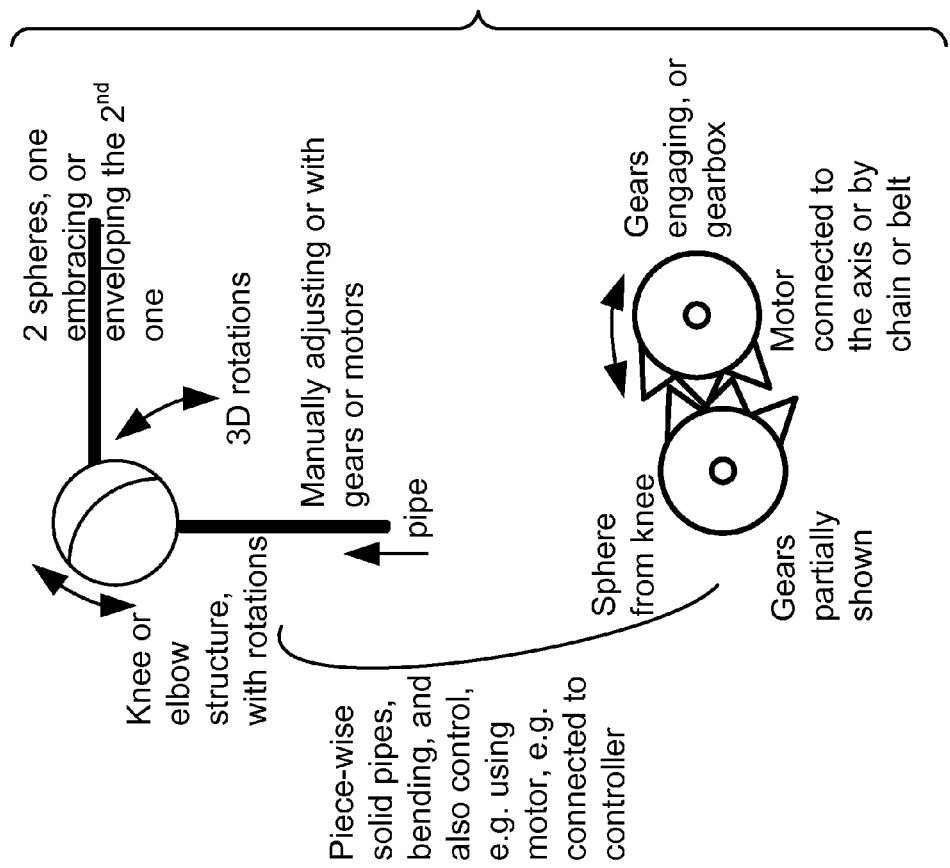
FIG. 33 shows an example/embodiment for the system with pipes connected by hinges, which are bent, or can be adjusted manually or by motor/gears/gear box, with flexible or solid pipes.

FIG. 33 shows an example/embodiment for the system with pipes connected by hinges, which are bent, or can be adjusted manually or by motor/gears/gear box, with flexible or solid pipes, which can be controlled by controller or HQ or processor device, with knee or elbow connected to the gear. The elbow is made of 2 spheres with near radius sizes one enveloping the other one, which can be moved with respect to each other in all 3 directions or angles for 3D space. The pipes can carry water or humid air or coolant or the like. The pipes can be used in various parts of our system, e.g. in arm assembly.

Figure 34:
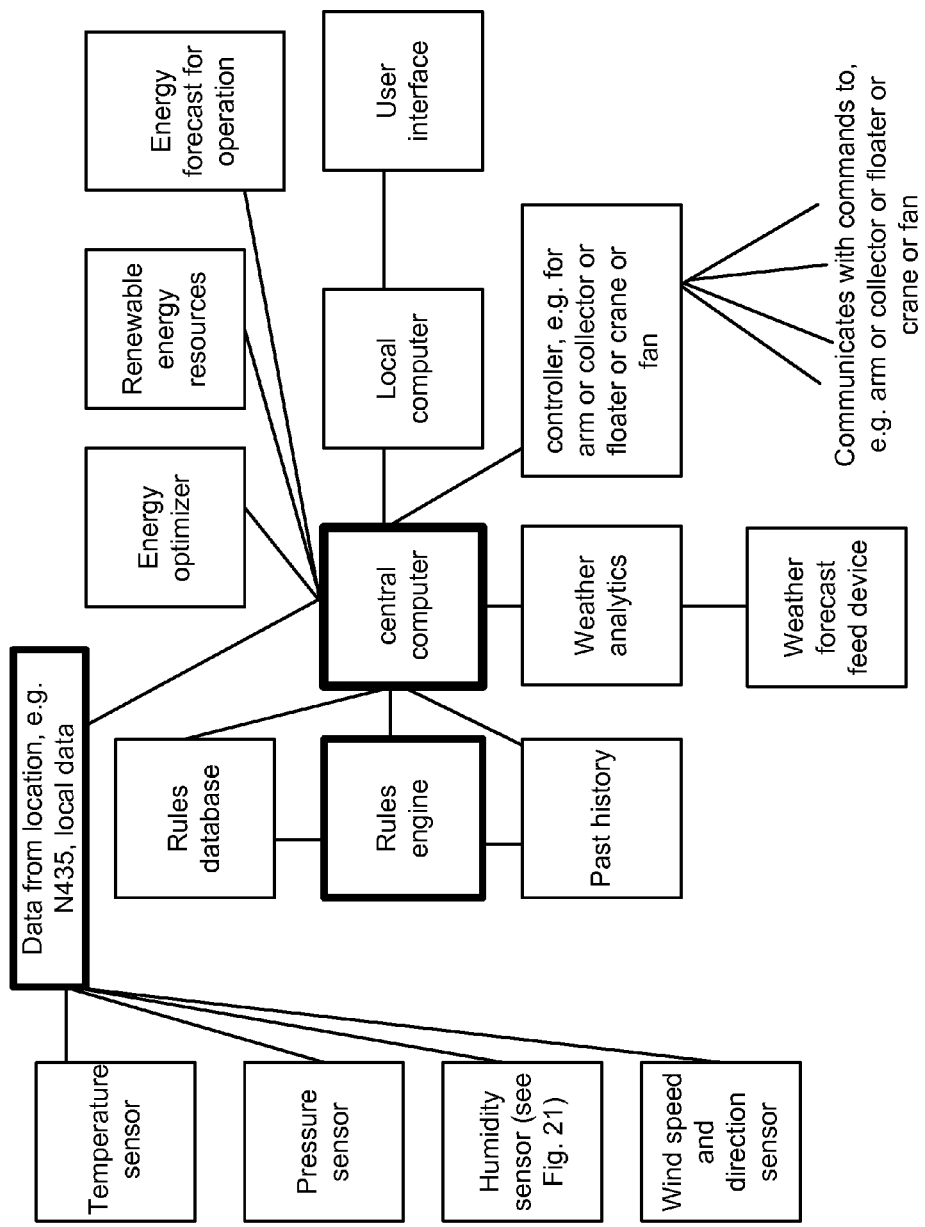
FIG. 34 shows an example/embodiment for the system which controls the operation for water extraction with various devices and components.

FIG. 34 shows an example/embodiment for the system which controls the operation for water extraction with various devices and components, for each section of the shore or water collection facility, as a separate module or division, controlled by the same processor or server or controller or HQ or microprocessor or central office or collection of servers or server farms or distributed computing devices or cloud-based devices or collection of local computers or network of computers or Internet-based processors or remote devices or device.

FIG. 34 is an example/embodiment for the system where the humidity sensor on or near the collector measures the humidity, and sends the information using the wireless communication/antenna to local unit/antenna or main unit/tower, directly, or via another leg, to HQ or main processor. Then, the controller at main unit or processor decides when the fan and collector should be on, and when it is inefficient, in terms of energy consumption per gallon or liter of the water collected, or based on available green energy at that time, e.g. no solar power during the night, forcing to use non-green energy sources, e.g. natural gas, to power the fan and assembly, which is less favorable for operation stand point. Or, it decides when it is damaging to use the fan or collector, to turn off the system or retrieve the whole arm and system, to avoid high wind or rough sea, as an example. All are based on database, and rules engine, with rules embedded there, plus the weather forecast/feed, in addition to the real weather data at any given time, as supplemental data. These are, in some embodiment, parts of the main HQ or central unit. The wind direction and temperature are also measured locally and transmitted to HQ, via sensors on collector unit or floater or crane or arm, as well as anemometer for speed of wind, and wind vane for direction of wind, plus barometer for pressure, e.g. as shown on FIG. 21, in various locations, installed or attached. (see FIG. 34.)

An example of rules engine is given here: (stored in rules database, and connected to the controller unit, as well as processor) (see FIG. 34.)

Rule 1: If the relative humidity $H_r$ is below $H_{r0}$, then turn off the fan, crane, arm, and assembly system. (e.g., $H_{r0}$ is 50 percent, or it is somewhere between 40 to 70 percent.)

Rule 2: If the temperature T below T0, then turn off the fan, crane, arm, and assembly system. (e.g., T0 is 20 C, or it is somewhere between 15 to 30 C.)

Next rule, Rule 3, R3: If the temperature T below T1, and the relative humidity $H_r$ is below $H_{r1}$, then turn off the fan, only. (standby situation) (e.g., T1 is 25 C, or it is somewhere between 20 to 35 C.) (e.g., $H_{r1}$ is 40 percent, or it is somewhere between 30 to 60 percent.)

Next rule: If the speed of wind is more than V0, then turn off the fan, crane, arm, and assembly system, and fold the pipes, and pull back the arm toward the tower or shore, as shown in a previous figure. (e.g., V0 is 80 miles/hr, or it is somewhere between 50 to 100 miles/hr.)

Next rule: If the speed of wind is more than V1, but below V0, then for the direction of the wind in the direction of the 3D (dimensional) vector $V_w$, lift the collector tip in vertical position, and align the collector tip axis in the direction of vector $V_w$. That is, the wind or vector $V_w$, will be perpendicular to the plane/circular cross section of the collector tip (see FIG. 29 for orientation, and FIG. 19 for mechanism to do so). This is one of the most efficient ways of collecting air/humidity, with the largest cross section available for that wind direction, in some embodiments. (e.g., V0 is 80 miles/hr, or it is somewhere between 50 to 100 miles/hr.) (e.g., V1 is 30 miles/hr, or it is somewhere between 20 to 60 miles/hr.) (See FIG. 35)

Next rule: If more than N percent of the energy for operation comes from non-green or renewable kinds (e.g. N=90 percent, or it is between 50 to 95 percent), then turn off the fan, only.

Next rule: If more than N1 percent of the energy for operation comes from battery (e.g. N1=80 percent, or it is between 40 to 85 percent), then turn off the fan, only.

Next rule (Rule Q, for efficiency): If less than G gallons e.g. per minute/unit time of water is extracted from/by the local unit (e.g. G=10 gallons, or it is between 5 to 100 gallons), then turn off the fan, only, for that local unit.

Next rule (Rule Q1, for efficiency): If less than G1 gallons of water is extracted from/by the local unit, per Z (J energy) used, or per Z1 (e.g. in J, Joule) non-renewable energy used (e.g. G1=1 gallon, or it is between 0.5 to 10 gallons), then turn off the fan, only, for that local unit. (e.g. Z=1 J, or it is between 0.001 J to 1000 kJ) (e.g. Z1=0.75 J, or it is between 0.00001 J to 500 kJ). This rule can also be expressed in terms of power, in Watt, for rate of energy used, per unit time.

The combinations of the rules above in any order are also used here. Any single rule is also used here. Any logical combination of the rules can be used here, in one embodiment, e.g., using OR, AND, XOR, and the like, for operation between rules, e.g. with parenthesis between operands, with multiple operands or rules, as an example. For example:

Final rule=(R1 OR R2) AND R3

Wherein Ri is rule number i, and i is an integer, positive, bigger than zero.

Figure 35:
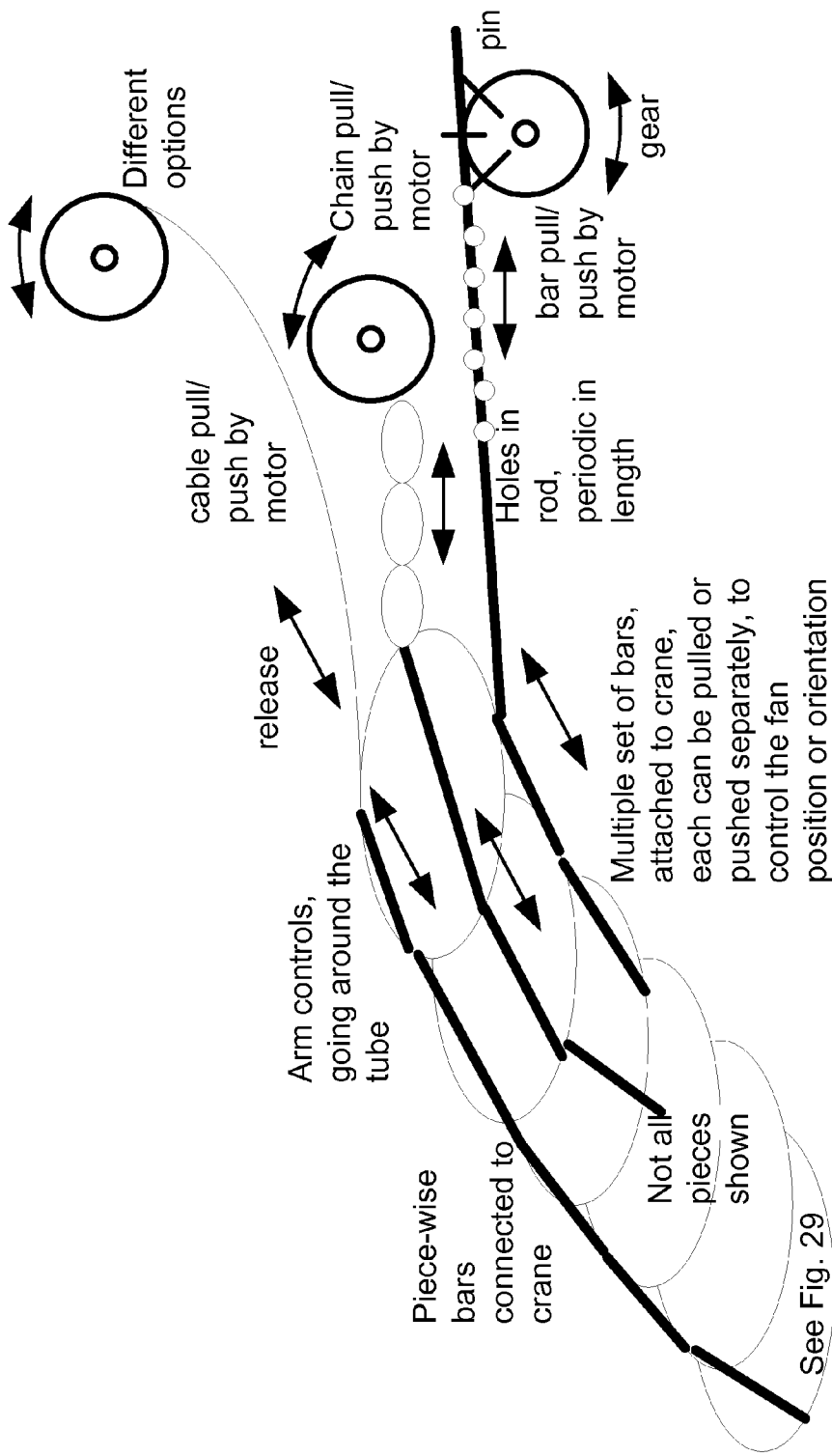
FIG. 35 is an example/embodiment for the system to control the bars on arm from tower or crane or shore.
Figure 36:
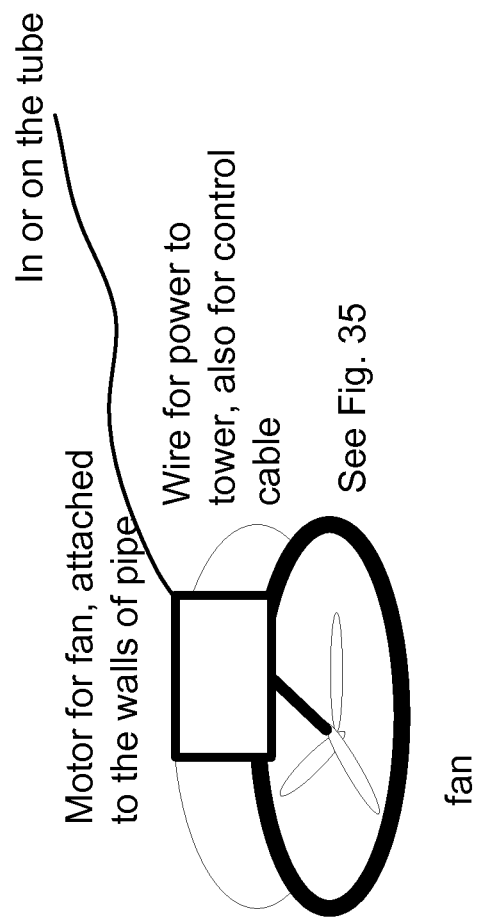
FIG. 36 is an example/embodiment for the system for the fan power and control wires and cables.

FIG. 36 is an example/embodiment for the system for the fan power and control wires and cables, which is related to other figures, e.g., FIG. 35.

Other Embodiments

The enthalpy of water evaporation is about 44 kJ/mol at about 25° C. This enthalpy decreases by increasing temperature (e.g., about 41 kJ/mole at 100° C.) and it vanishes rapidly as the temperature is reaches its critical point (at about 647 K and 218 atm pressure). In the range of about 25-50° C. the enthalpy of evaporation is about 43 kJ/mole. The equilibrium water vapor partial pressure is approximated, e.g., by August-Roche-Magnus approximation, as follows:

$$P_{ws} = 610.94 e^{\left(\frac{17.625 \cdot T_D}{243.04 + T_D}\right)}$$

$$T_D = 243.04 \times \frac{1}{\frac{17.625}{\ln\left(\frac{P_{ws}}{610.94}\right)} - 1}$$

where $T_D$ is the Dew point temperature (in ° C.) and $P_{ws}$ is the equilibrium (saturated) water partial pressure in Pascal. This approximation is plotted in FIG. 37. The partial pressure may be approximated as proportional to the negative exponential of enthalpy:

$$P_{ws} \propto e^{\left(\frac{-\Delta H}{K_B T}\right)}$$

where $K_B$ is Boltzmann constant, $\Delta H$ is enthalpy of evaporation, and T is absolute temperature of the vapor. This implies (assuming small variation in $\Delta H$ within the temperature range):

$$\frac{d \ln(P_{ws})}{dT} = \frac{\Delta H}{K_B T^2} \cong 0.05 K^{-1} (\text{at} \sim 50° \text{ C.})$$

Figure 37:
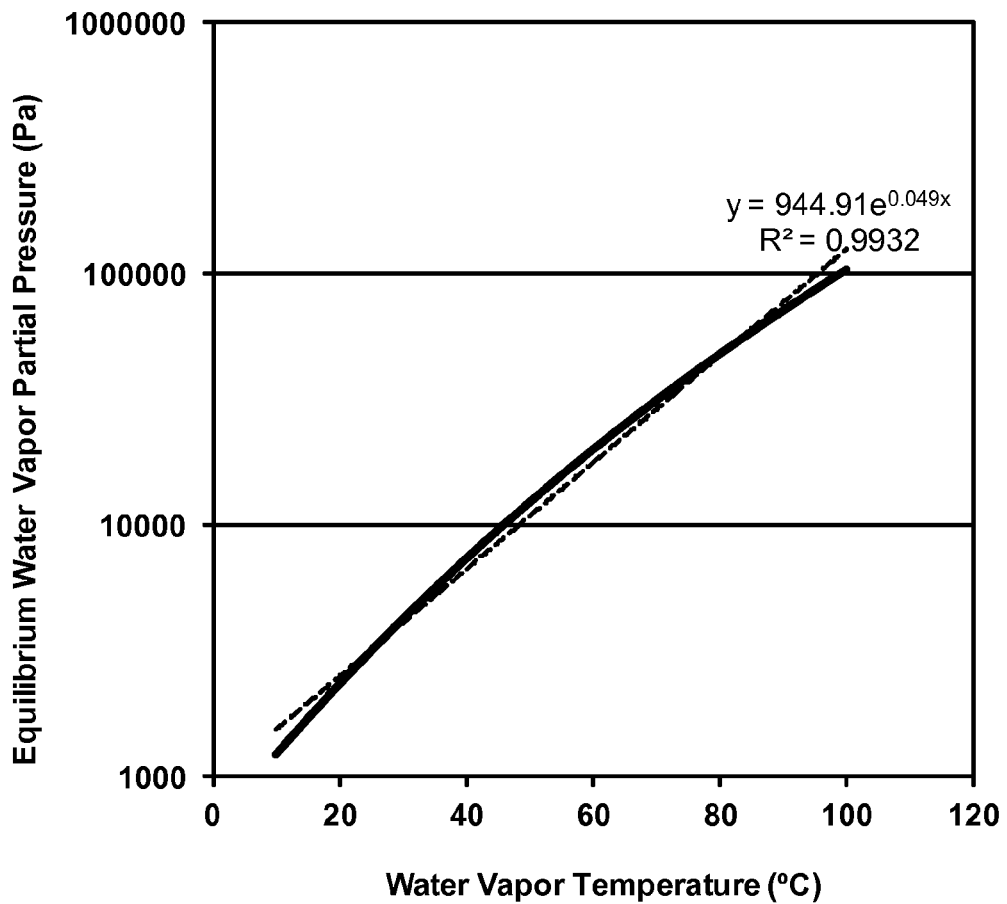
FIG. 37 depicts the equilibrium (saturated) water vapor partial pressure for a range of water vapor temperature. The dotted line depicts an exponential fit with the fit parameters.

This is in agreement with the exponential fit to the August-Roche-Magnus approximation for the equilibrium water vapor partial pressure depicted in FIG. 37 (depicted as dotted line with fitting exponent of 0.049 $K^{-1}$.

Saturation water partial pressure may also be approximated (in range of 0° C. and 373° C.) based on the critical point (see W. Wagner and A. Pruβ, "The IAPWS Formulation 1995 for the Thermodynamic Properties of Ordinary Water Substance for General and Scientific Use", Journal of Physical and Chemical Reference Data, June 2002, Volume 31, Issue 2, pp. 387535):

$$\vartheta = 1 - \frac{T}{T_C}$$

$$\ln\left(\frac{P_{ws}}{P_C}\right) = \frac{T}{T_C} \cdot (C_1 \vartheta + C_2 \vartheta^{1.5} + C_3 \vartheta^3 + C_4 \vartheta^{3.5} + C_5 \vartheta^4 + C_6 \vartheta^{7.5})$$

where T and $T_C$ (647 K=373° C.) are the vapor temperature and the critical temperature in Kelvin, respectively, and $P_{ws}$ (in hPa) and $P_C$ (220640 hPa) are the saturated water pressure at T and $T_C$, respectively, and $C_1$=−7.85951783, $C_2$=1.84408259, $C_3$=−11.7866497, $C_4$=22.6807411, $C_5$=−15.9618719, $C_6$=1.80122502.

Figure 38:
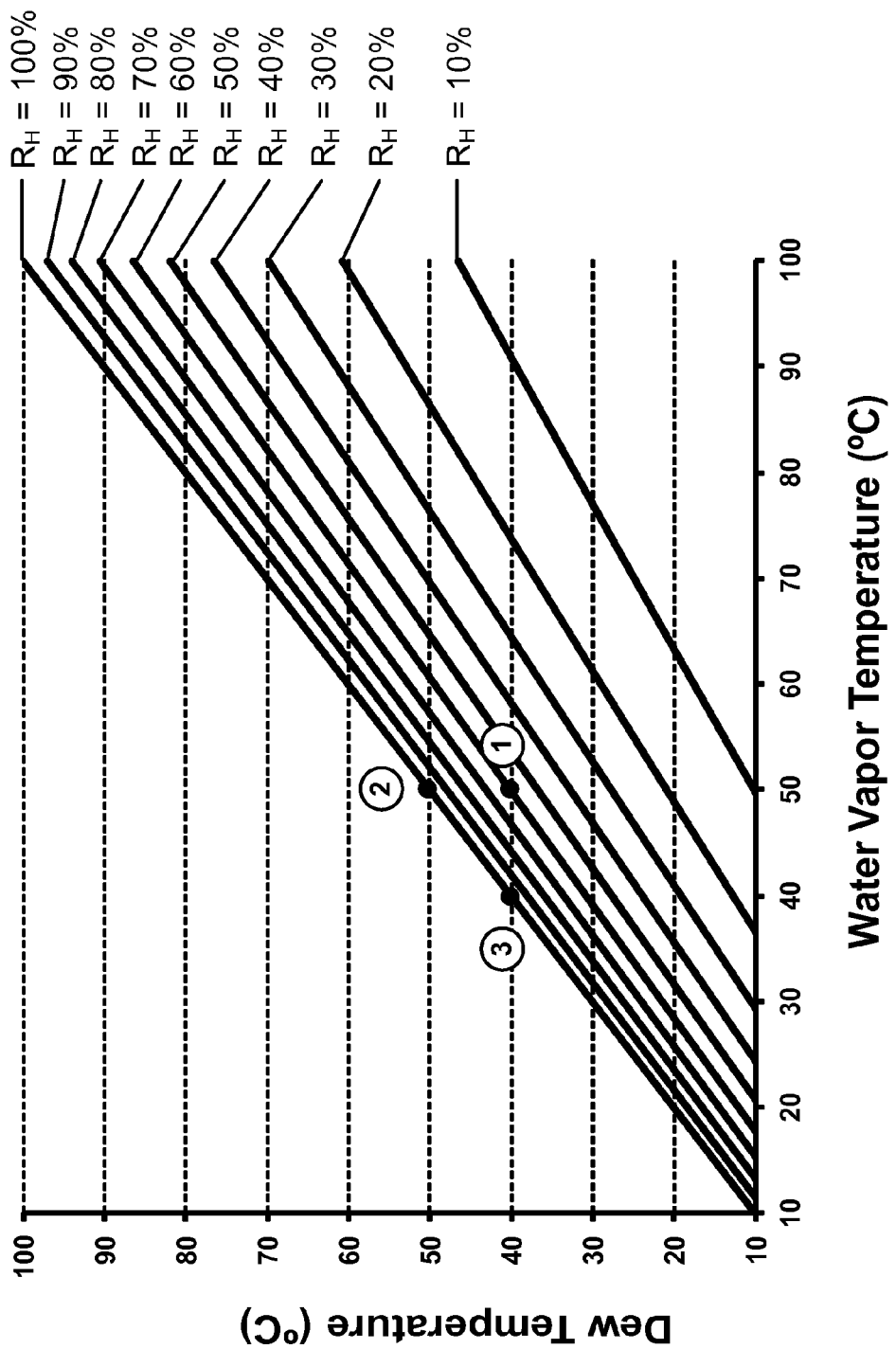
FIG. 38 depicts the water dew point temperature associated with various water vapor temperatures and relative humidity.

The relative humidity, $R_H$, is the ratio of the partial pressure of water vapor in an air-water mixture to the saturated vapor pressure of water at a given temperature. $R_H$ contours are plotted in Dew Point-Vapor Temperature plot in FIG. 38, based on the August-Roche-Magnus approximation. For example, point 1 is at $R_H$ of 60% at 50° C. Both Points 2 and 3 indicate saturated water-air mixture at different temperatures (50° C. and 40° C., respectively). Going from point 1 to 2, water is added to the mixture to reach saturation at the same temperature. This is accompanied with increase in volume if the total pressure is kept the same. Going from point 2 to 3, the temperature is (e.g., slowly) reduced and the saturated mixture would lose water as liquid. At point 3, the same amount of water added (from point 1 to 2) is reclaimed, because the absolute moisture between points 1 and 3 are the same, as reducing the temperature from point 1 to point 3 would not lose any moisture to liquid form until point 3 (a saturation point) is reached. Therefore, the horizontal lines indicate the equal absolute humidity, as the volume and temperature increase from point 3 to point 1 (assuming the same total pressure), given that the molar fractions and therefore the water partial pressure remain the same. Given that the water partial pressure of point 2 and 3 are the same, the relative humidity of point 1 (with respect to point 3, at the same vapor temperature) may be expressed based on partial pressure of saturated water-air mixture (i.e., points 2 and 3), as follows:

$$R_{H1} = \frac{P_{w1}}{P_{w2}} = \frac{P_{w3}}{P_{w2}} = \frac{e^{\left(\frac{17.625 \cdot T_D}{243.04+T_D}\right)}}{e^{\left(\frac{17.625 \cdot T_A}{243.04+T_A}\right)}}$$

where $T_D$ is the Dew point temperature of the mixture (at point 1, e.g., 40° C.), $T_A$ is the temperature of the mixture in ° C. (at point 1, e.g., 50° C.), and $T_D$ is the Dew point temperature of the mixture in ° C. (at point 3, e.g., 40° C.). Similarly, $T_A$ or $T_D$ may be derived based on $R_H$ and the other:

$$T_D = 243.04 \times \frac{\ln(R_H) + \left(\frac{17.625 \cdot T_A}{243.04+T_A}\right)}{17.625 - \ln(R_H) - \left(\frac{17.625 \cdot T_A}{243.04+T_A}\right)}$$

$$T_A = 243.04 \times \frac{\left(\frac{17.625 \cdot T_D}{243.04+T_D}\right) - \ln(R_H)}{17.625 + \ln(R_H) - \left(\frac{17.625 \cdot T_D}{243.04+T_D}\right)}$$

Assuming near ideal gas, the ratio of the molar density of the water vapor for points 2 and 1, is the same as the ratio of the water vapor partial pressure for points 2 and 1, given that the temperatures of points 2 and 1 are the same:

$$R_{H1} = \frac{\left(\frac{n_{w1}}{V_1}\right)}{\left(\frac{n_{w2}}{V_2}\right)} = \frac{\left(\frac{P_{w1}}{T_1}\right)}{\left(\frac{P_{w2}}{T_2}\right)} = \frac{P_{w1}}{P_{w2}} \cdot \frac{T_2}{T_1} = \frac{P_{w1}}{P_{w2}}$$

Figure 39:
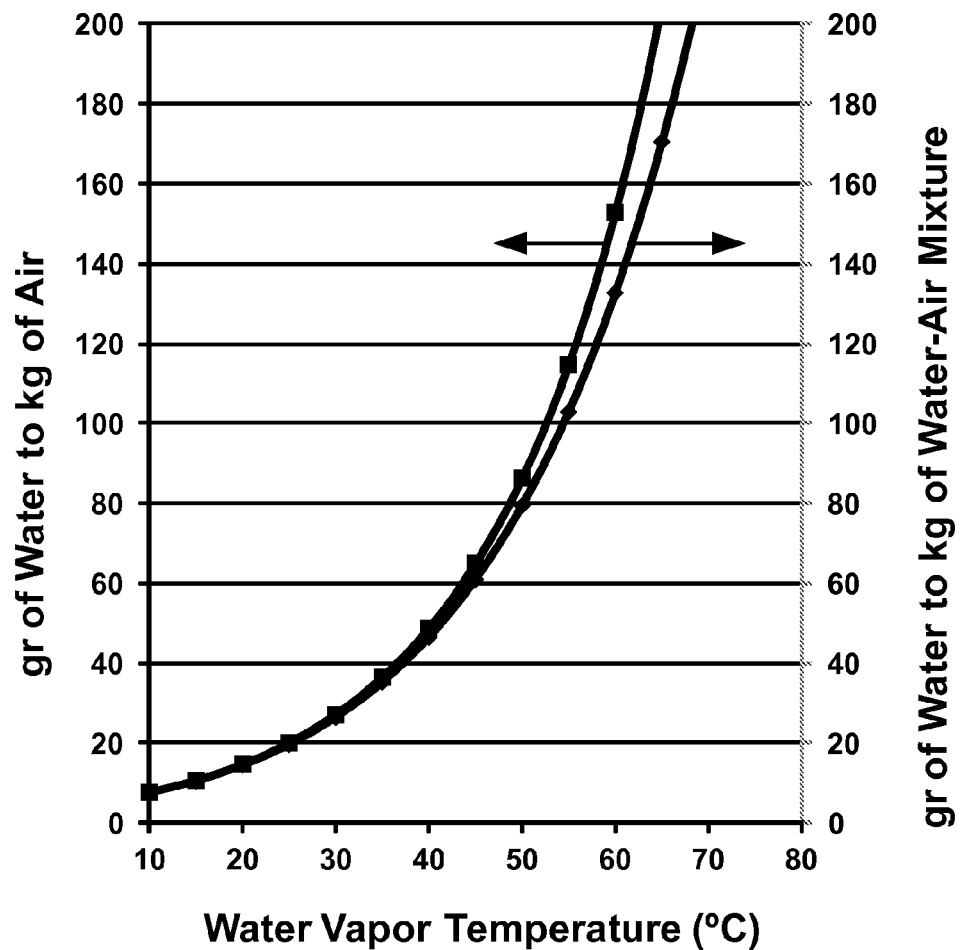
FIG. 39 depicts the water content in saturated vapor-air mixture per mixture as well as dry content.

The absolute water content (per volume) is a mixture is obtained from an ideal gas approximation as follows:

$$A = C \cdot \frac{P_w}{T}$$

where $$C = \frac{18 \text{ g/mol}}{R} = 2.166 \text{ gK/J},$$

and T is absolute temperature of the mixture in Kelvin, $P_w$ is partial pressure of water vapor in Pascal, and A is in g/m³. The water content per air content or mixture content is depicted in FIG. 39 for saturate mixture (at 1 atm total pressure), based on near ideal gas assumption:

Water Content to Mixture Ratio =

$$\frac{n_w \cdot M_w}{n_w \cdot M_w + n_a \cdot M_a} = \frac{P_w \cdot M_w}{P_w \cdot M_w + (P_t - P_w) \cdot M_a} = \frac{1}{1 + \left(\frac{P_t}{P_w} - 1\right) \cdot \left(\frac{M_a}{M_w}\right)}$$

Water Content to Air Ratio =

$$\frac{n_w \cdot M_w}{n_a \cdot M_a} = \frac{P_w \cdot M_w}{(P_t - P_w) \cdot M_a} = \frac{1}{\left(\frac{P_t}{P_w} - 1\right) \cdot \left(\frac{M_a}{M_w}\right)}$$

where $M_w$ (18 gr/mole) and $M_a$ (29 gr/mole) are molar mass of water and air (with ¼ ratio of $O_2$ and $N_2$), respectively, and $P_t$ is total pressure (e.g., 1 atm).

Figure 40:
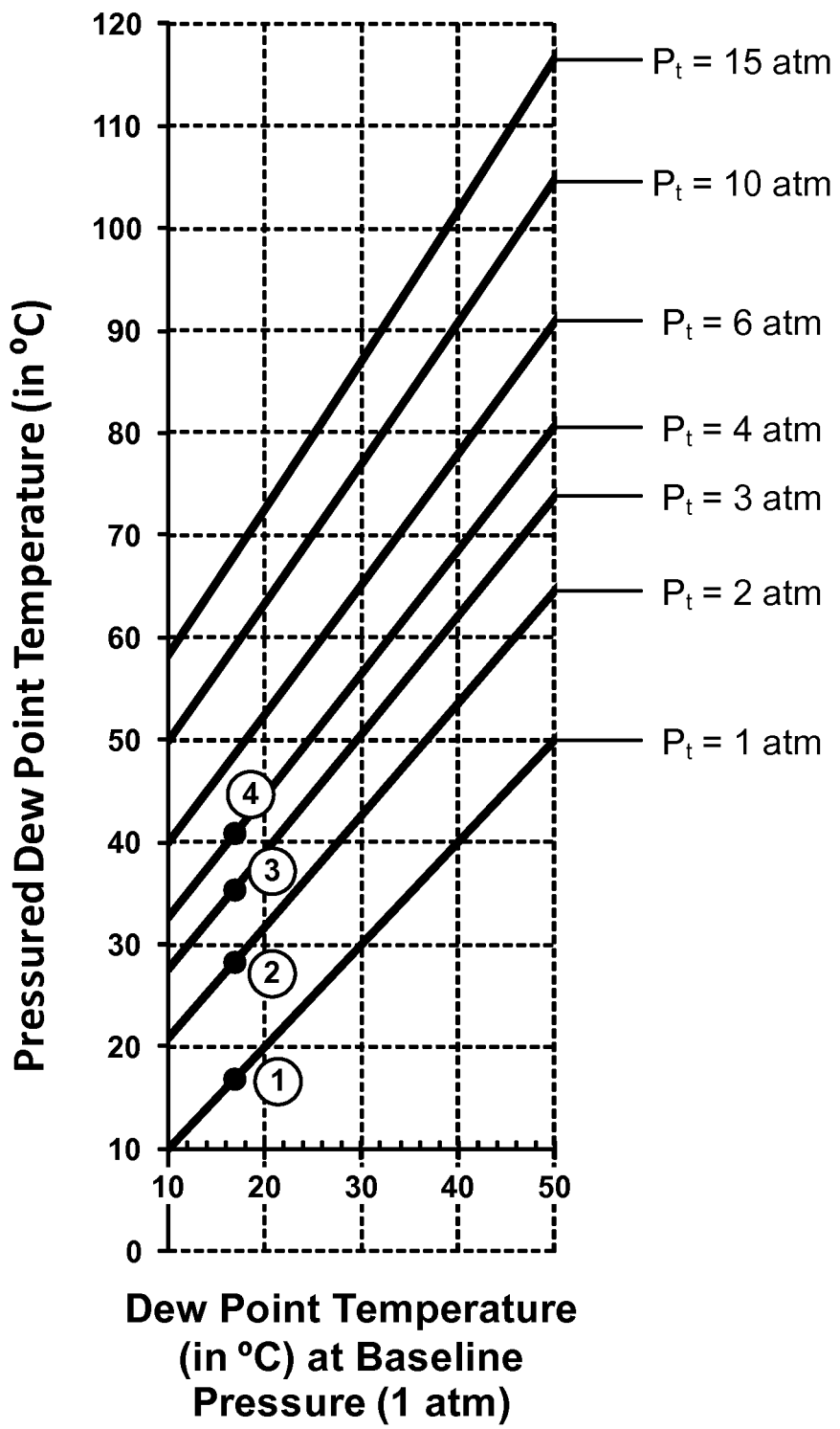
FIG. 40 depicts dew point temperature at various total mixture pressure with respect to the dew point temperature at a baseline total pressure (1 atm).

This also shows that increasing pressure causes the Dew point to occur at higher temperatures as the vapor is pushed into liquid phase. As depicted in FIG. 40, the Dew point temperature ($T_{D0}$) is used to determine the saturated water vapor partial pressure ($P_{ws0}$) e.g., for a baseline total pressure ($P_{t0}$, e.g., 1 atm). For example, when the total pressure ($P_t$) is increased the Dew point temperature ($T_D$) should be increased to prevent the water vapor from condensing, so that the molar fraction of water vapor remains the same in the mixture. Therefore, the partial pressure of the saturated water vapor ($P_{ws}$) is proportionally increased (assuming ideal gas approximation), which results in higher Dew point temperature according to:

$$P_{ws0} = 610.94 e^{\left(\frac{17.625 \cdot T_{D0}}{243.04+T_{D0}}\right)}$$

$$P_{ws} = P_{ws0} \cdot \frac{P_t}{P_{t0}}$$

$$T_D = \frac{243.04}{\left(\frac{17.625}{\frac{17.625 \cdot T_{D0}}{243.04 + T_{D0}} + \ln\left(\frac{P_t}{P_{t0}}\right)} - 1\right)}$$

where $T_{D0}$ and $T_D$ are in °C.

For example, the Dew point for a vapor-air mixture at 25° C. at 1 atm with 60% relative humidity, is about 16.7° C. However, pressurizing the mixture at 2 atm, 3 atm, and 4 atm, increases the Dew point from 16.7° C. to 28° C., 35° C., and 41° C., respectively. In one embodiment, the captured mixture is pressurized to increase the Dew point of the mixture.

For a non-saturated water vapor at temperature T and relative humidity $R_H$ (and vapor partial pressure $P_w$), the total pressure in increased (by factor of r) to make the mixture saturated at temperature $T_D$ as follows:

$$P_w = P_{ws}(T) \cdot R_H$$

$$T_D = T_D(P_w) = T_D(P_w \cdot r) = T_D(P_{ws}(T) \cdot R_H \cdot r)$$

where in the above $T_D(\ldots)$ and $P_{ws}(\ldots)$ are used in functional form, as for example shown above via approximation.

Figure 41:
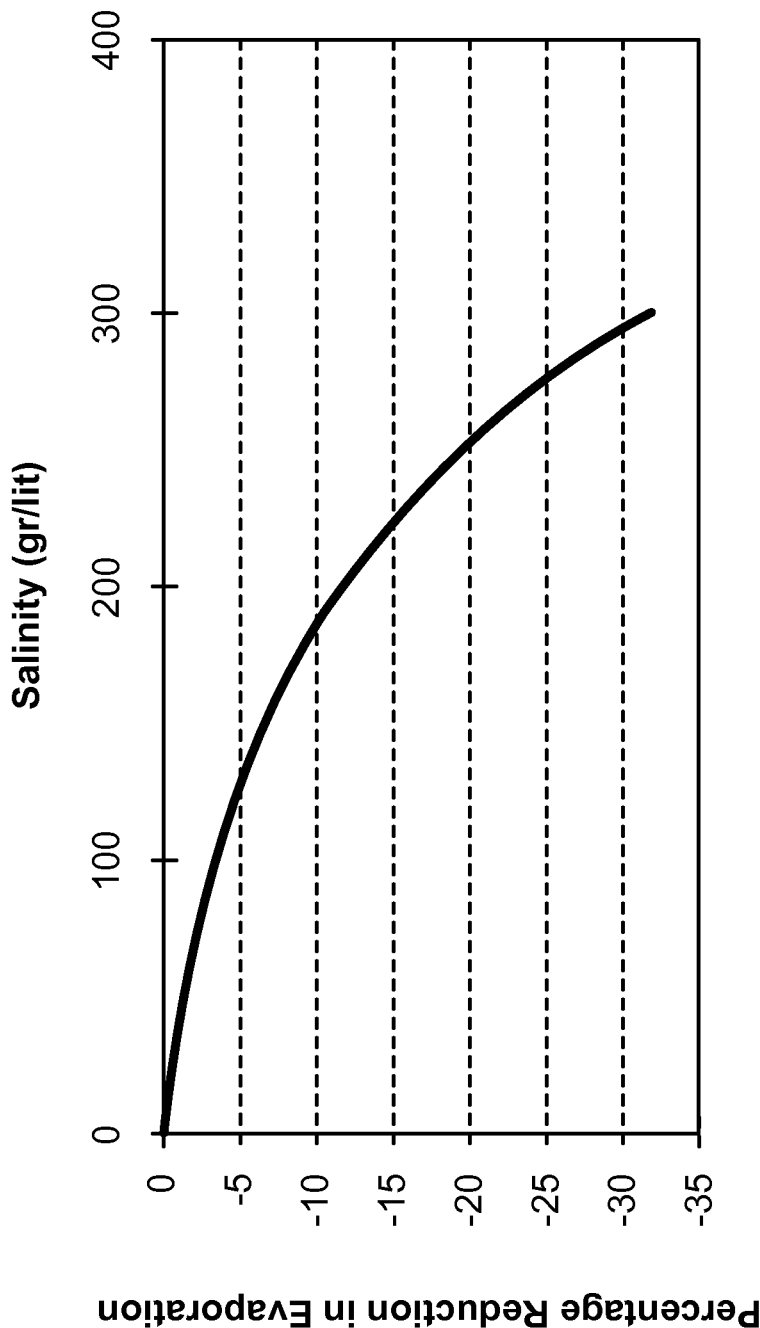
FIG. 41 depicts the percentage reduction in evaporation as the salinity of water increases.

The partial pressure of water vapor (from pure water source) may be corrected to the salinity of the water source, as the enthalpy of the evaporation increases with the salinity and less equilibrium water vapor pressure results from the liquid source. Salinity is generally expressed in mass fraction, i.e., the mass of dissolved material (e.g., salt) in unit mass of solution. Sea water has typically a salinity of around 35 g/Kg (or part per thousand (ppt or ‰)). The salinity factor (see Turk, L. J. (1970), Evaporation of Brine: A Field Study on the Bonneville Salt Flats, Utah, Water Resour. Res., 6(4), 1209-1215, doi:10.1029/WR006i004p01209) has inverse logarithmic relationship with the evaporation reduction, as depicted in FIG. 41. The correction is about 1-2% for typical high salinity bodies of water.

At high ambient pressures, an enhancement factor may be used to adjust $P_{ws}$ in presence of other gases, e.g., as proposed by Greenspan: J. of Research of the NBS vol 80A, No. 1 p 41-44.

In one example, the average surface water temperature of Red Sea is about 26° C. in the North and 30° C. in the South during the summer, with the annual evaporation in excess of 205 cm (81 in). In one embodiment, per 1 m² capture area, with 10% efficiency in vapor capture, and 50% condensation extraction, the annual water extraction is about 100 lit or 26 gal.

In one embodiment, the water evaporation rate is enhanced by one or combination of the followings: reducing the boundary layer over water by blowing air over the surface (by fan or wind), increasing the temperature of the water (and air) at the surface of water (e.g., by radiation absorption from sun, heat exchange, electrical energy (e.g., from grid or solar mirrors or panels), or fuel consumption), and pumping away the evaporated vapor to increase net evaporation from the surface. In one embodiment, the condensation of water is enhanced by one or combination of one of the followings: increasing the Dew point, increasing the vapor to air ratio (e.g., by creating partial vacuum over the surface of water), and exchanging heat with environment at various time of day (e.g., cooling during night time when the air temperature over land drops).

In one embodiment, the evaporation from the water surface is enhanced by blowing air over the surface (e.g., by reducing the boundary layer and/or replacing high humidity air mixture very close to the water surface. The forced convection and/or diffusion increase the rate of evaporation significantly. For example, for unoccupied pools of water, the evaporation rate due to natural convection is estimates by $$\text{Evap. Rate} = 290 D_w \cdot (D_r - D_w)^{1/3} \cdot (W_w - W_r) \text{ in } \frac{\text{pounds}}{\text{hour} \cdot \text{ft}^2}$$

where $D_w$ is the density of air saturated at water temperature (in pounds per cubic foot of dry air), $D_r$ is the density of air (in pounds per cubic foot of dry air), $W_w$ is humidity ratio of air saturated at water temperature (in pounds per pound), and $W_r$ is humidity ratio of air (in pounds per pound). (See Shah, M. M. (2008). "Analytical formulas for calculating water evaporation from pools", ASHRAE Transactions, 114). Also the evaporation rate due to forced convection by air current is estimated as:

$$\text{Evap. Rate} = 0.0346 (p_w - p_r) \text{ in } \frac{\text{pounds}}{\text{hour} \cdot \text{ft}^2}$$

where $p_w$ is water-vapor pressure in air saturated at water temperature (in inches of mercury), and $p_r$ is water-vapor pressure in air (in inches of mercury). The evaporation rate may be estimated as the larger of the two estimates. For the above evaporate rate formulas the range of area is few to 4500 square feet, range of water temperature is 45 to 201 degree Fahrenheit, the range of air temperature is 43 to 95 degree Fahrenheit, the range of air relative humidity is from 28% to 98%, the range of $(p_w - p_r)$ is 0.062 to 23.7 millimeter of mercury, the range of $(D_r - D_w)$ is 0.00025 to 0.062 pounds per cubic foot.

Another formulism for estimating the evaporation rate uses the velocity of air above the water surface. The rate of the evaporated water is estimated as:

$$\text{Evap. Rate} = (25 + 19v) \cdot A \cdot (W_s - W_a) \text{ in } \frac{\text{kg}}{\text{hour}}$$

where v is velocity of air above the water surface (in m/s), A is water surface area (in m²), $W_s$ is the humidity ratio in saturated air at the same temperature as the water surface (in kg of H2O in kg of Dry Air), and $W_a$ is the humidity ratio in the air (in kg of H2O in kg of Dry Air). See for example, http://www.engineeringtoolbox.com/evaporation-water-surface-d_690.html. The required heat of evaporation per hour is about $$\left(2270 \frac{\text{kJ}}{\text{kg}}\right) \times \text{Evap. Rate.}$$

For example, at low air speed, the evaporation rate from a 500 m² water surface with 20 g H₂O saturated in kg of dry air (e.g., at 25° C. Dew point per FIG. 39), at 60% relative humidity (i.e., about 12 gr H₂O in kg of dry air), is about 100 kg/hour, requiring about 64 kWhr. However, at about 1 mile/hr air speed (0.5 m/sec), the evaporation rate increases by 38% to 138 kg/hr, and at about 13 mile/hr, the evaporation rate is more than fivefold (i.e., about 556 kg/hr). At 10 msec (or 21.6 mile/hour), the evaporation according to the above formula is about 860 kg/hr, i.e., almost an order of magnitude higher. The intensity (power per area) for 860 kg/hr water from 500 $m^2$ area is about 1.1 $kW/m^2$ which is close to the sun radiation intensity at the Earth's surface. Therefore, the potential to harvest more water evaporation using the sun radiation as the heat source from a wide area is achieved in an embodiment by increasing the air velocity over the water surface (e.g., by using fans or blowers) and/or capture the water vapor mixture in the direction of the wind (e.g., high winds, for example, during monsoon).

Figure 42:
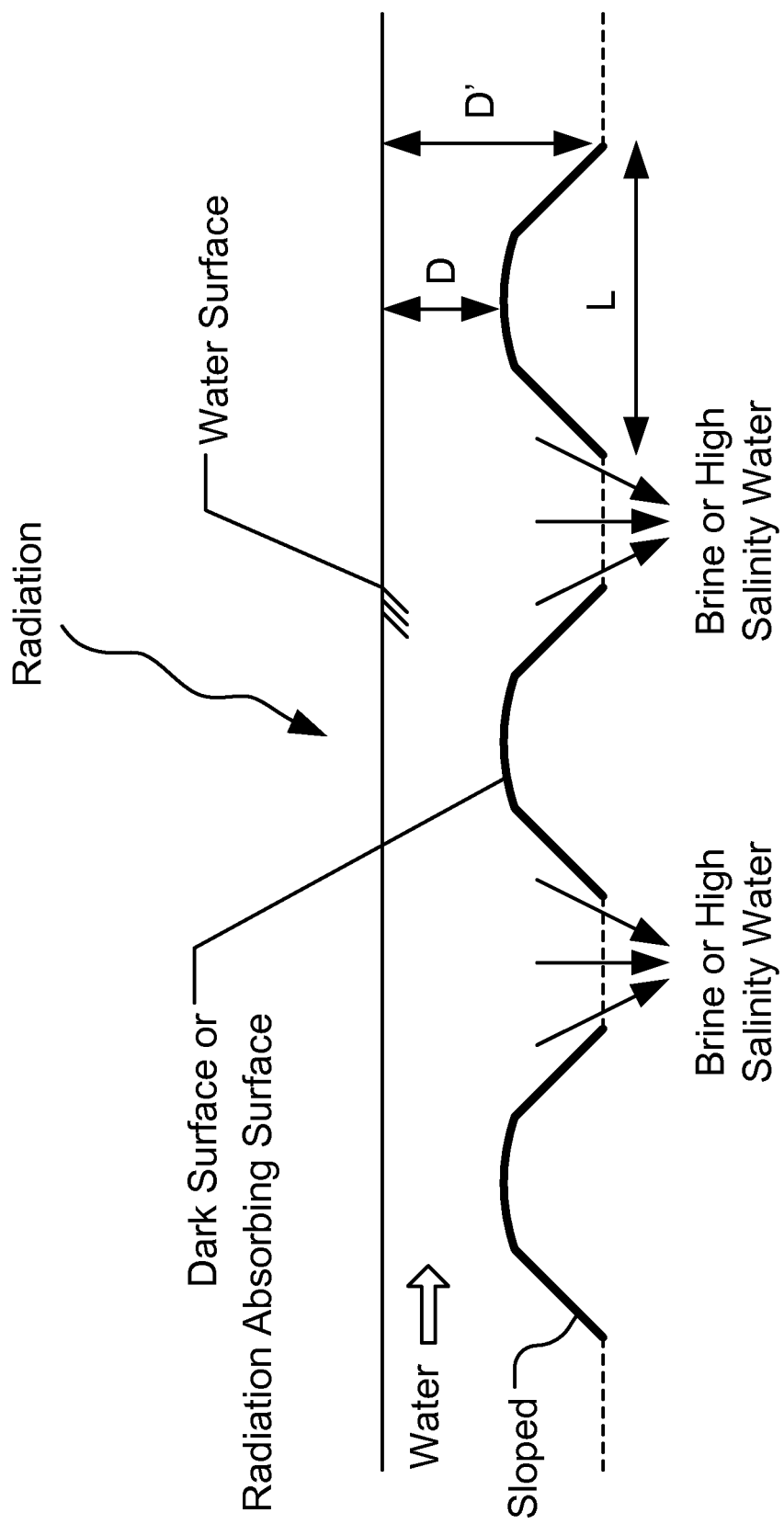
FIG. 42 depicts an embodiment of invention with a platform immersed in water having a light (radiation) absorbing surface or coating with opening(s).
Figure 43:
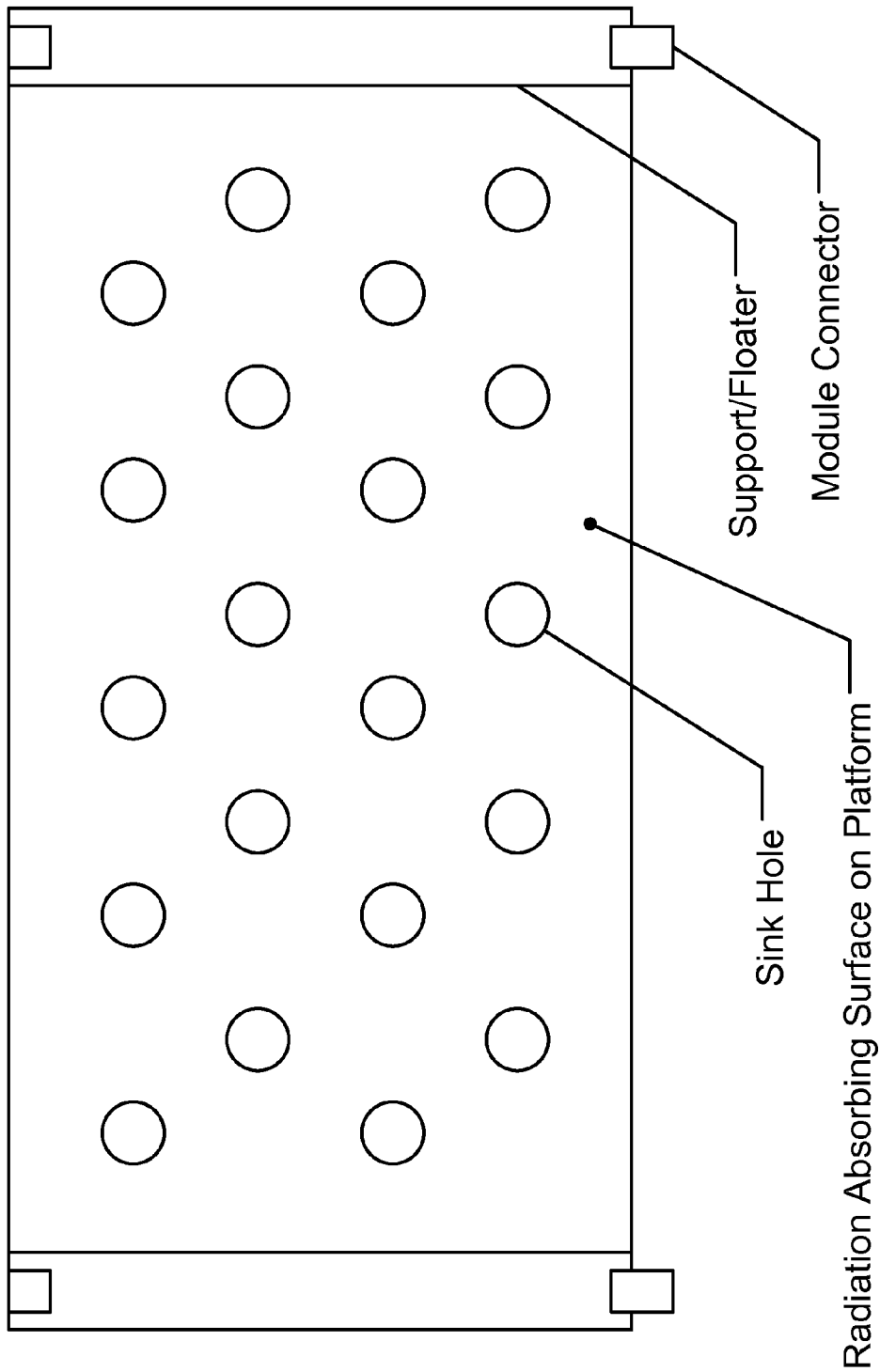
FIG. 43 depicts an embodiment of invention with a modularized platform immersed in water having a light (radiation) absorbing surface or coating with opening(s).

In one embodiment, the evaporation of vapor from the source is enhanced by increasing the source temperature (e.g., water temperature) and/or increasing the vapor temperature above the Dew point to hold more moisture. In one embodiment, the water temperature is increased by radiation absorption from the sun, as for example depicted in FIG. 42. The depth of radiation penetration is within few inches for infrared. Only blue portion of the spectrum penetrates to about 200 meters depth. In one embodiment, a platform immersed in water has a surface for absorbing sun radiation (e.g., dark surface). In one embodiment, the depth of immersion (e.g., as indicated by D in FIG. 42) is about 3-5 inches. In one embodiment, the radiation absorption surface is coated. In one embodiment, the platform has one or more holes and/or sloped surface for heavier and/or colder brine or high salinity water to exit. In one embodiment, the water flows from sides, e.g., via opening in the platform support or other channels. In one embodiment, the holes in the platform are at longer depths (as depicted by D' in FIG. 42), e.g., to support the slope on the platform. In one embodiment, as for example depicted in FIG. 43, the platform construction is modularized to connect multiple platforms together. In one embodiment, the patterns of the holes are alternated. In one embodiment, the holes are formed as elongated openings on the platform. In one embodiment, rails are used next to holes/openings to mark/protect people from falling through. In one embodiment, safety handles are installed next to openings to help people come up through opening, if for example fallen into the opening. In one embodiment, the platform is supported at its edges. In one embodiment, floaters are used to hold the platform on the body of water. In one embodiment, the floaters are adjusted or calibrated to allow the platform be immersed at a desired depth below water surface. In one embodiment, the floater is made of hollow container (e.g., made of aluminum, fiberglass, wood, or plastic). In one embodiment, the modular platforms may be attached by connector or links at their edges.

Figure 44:
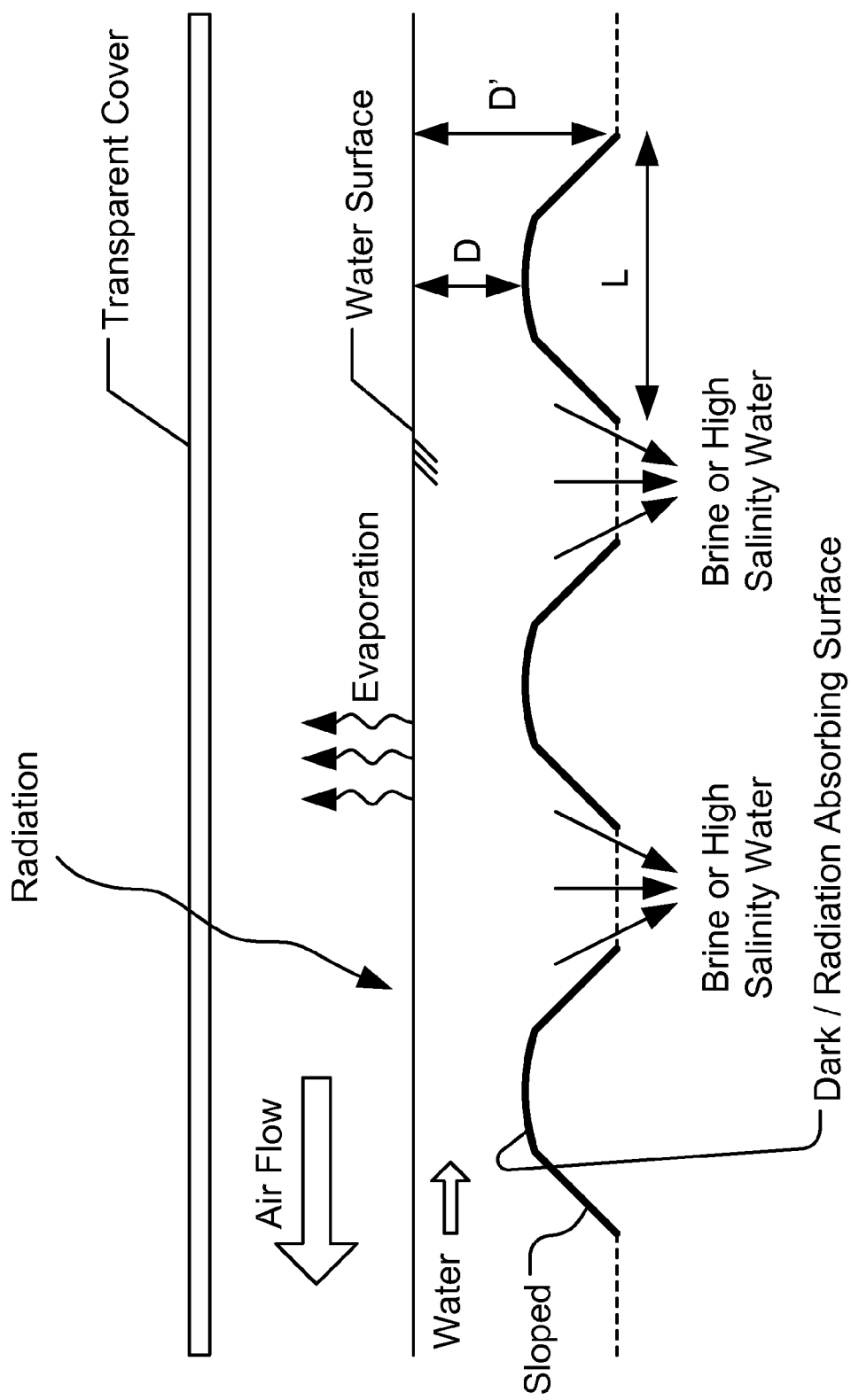
FIG. 44 depicts an embodiment of invention with a platform immersed in water having a light (radiation) absorbing surface or coating with opening(s) and a transparent cover containing the air flow.

In one embodiment, as for example depicted in FIG. 44, the water surface over the platform is fully or partially covered. In one embodiment, the cover or part of the cover is transparent or passes part or most of a portion of the radiation spectrum. In one embodiment, the cover allows the radiation reach the water and/or platform but prevents the evaporated water vapor from escaping to open air. In one embodiment, an air flow is provided (e.g., by use of fan or blower to collect the evaporation from the surface of water below the cover. In one embodiment, the air flow helps reduce the boundary layer over the surface of the water and increase the rate of evaporation. In one embodiment, the cover is made of glass, clear plastic, nylon, talc, and/or polymer. In one embodiment, the radiation is reflected from an array of mirrors onto the platform.

Figure 45:
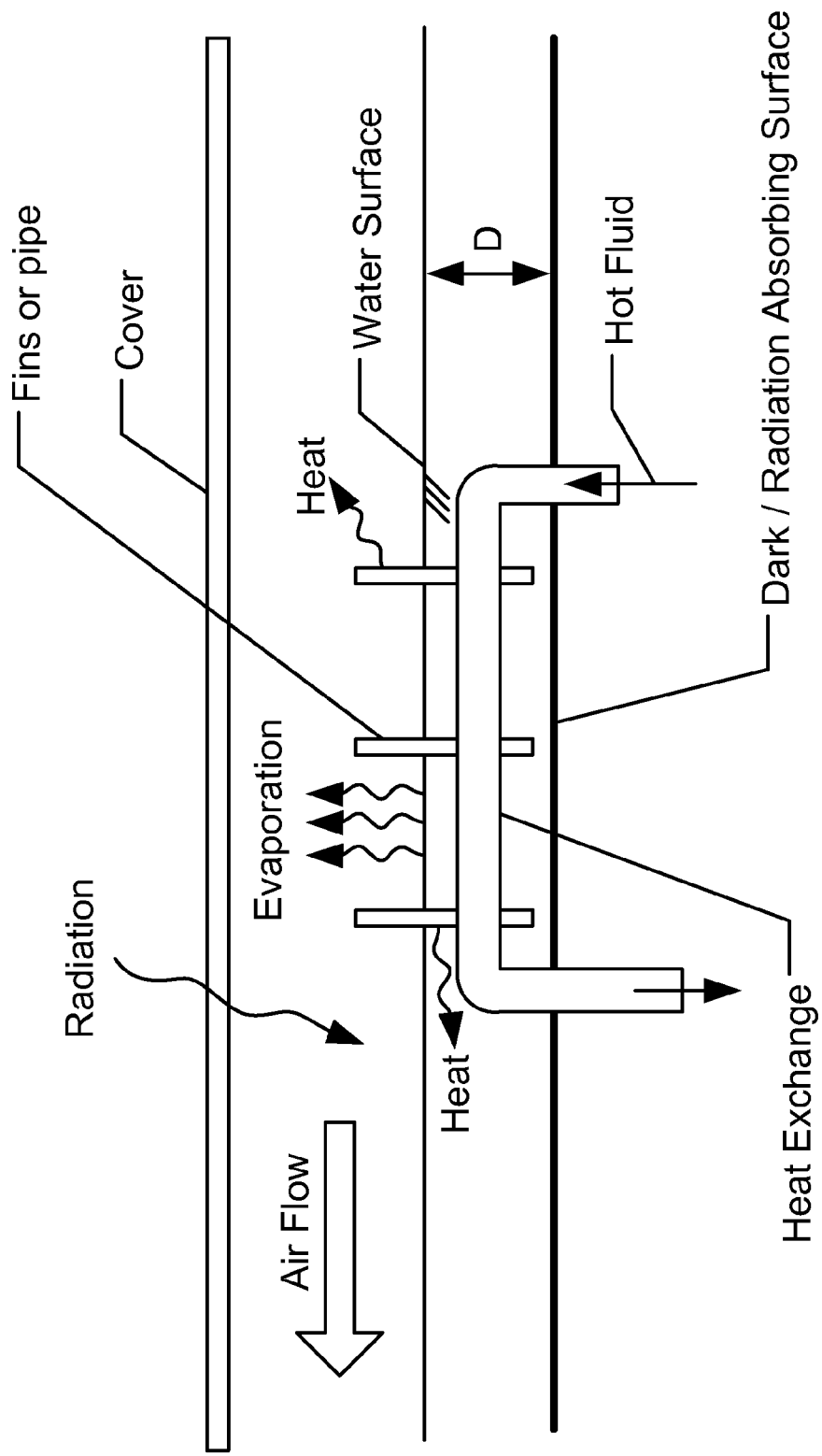
FIG. 45 depicts an embodiment of invention with a platform with heat exchange to increase evaporation and a transparent cover containing the air flow.

In one embodiment, as for example depicted in FIG. 45, water and/or air is heated (e.g., over a platform with for example dark or radiation absorbing surface) by other or additional means such as heat exchange with a hot fluid to increase the temperature of water and hence increase the partial pressure of the vapor and the rate of evaporation. In one embodiment, the heat exchange is providing via pipes/fins to pass or circulate hot fluid (e.g., gas or liquid such as water or vapor-air mixture, Freon, Puron, molten salt, or alkyl halide). In one embodiment, the source of heat is the heat exhaustion portion of a cooling system. In one embodiment, the source of heat is the heat exchange with a pressurized tank. In one embodiment, the heat exchange surface is totally immersed in the water. In one embodiment, the heat exchange surface is exposed to both water and air above to increase the dew point and support higher vapor pressure.

Figure 46:
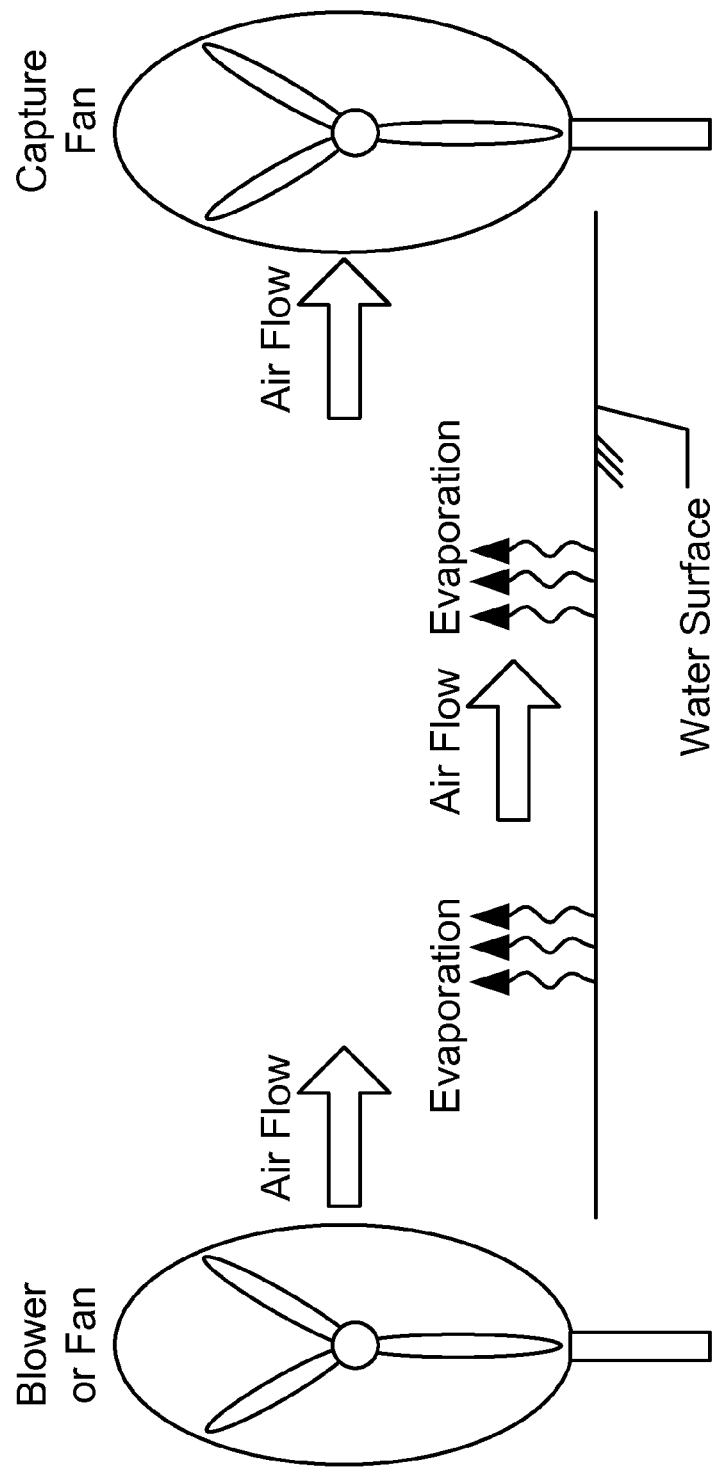
FIG. 46 depicts an embodiment of invention with an automatically controllable/adjustable blower/fan enhancing or creating air flow over the water surface to increase the evaporation and a capture fan to collect the water vapor-air mixture for further processing.

In one embodiment, as for example depicted in FIG. 46, a blower or fan creates or enhances air flow over the water surface to increase the evaporation rate. In one embodiment, a capture fan or opening captures the air-vapor mixture for later water extraction. In one embodiment, the direction and/or speed of wind are measured and the speed and direction of one or more fan is set to enhance the air flow and capture. In one embodiment, when the speed of the wind is above a threshold (e.g., a soft threshold such as about 15 miles per hour), the blowing fans are turned off automatically via a control module (e.g., with rules engine). In one embodiment, the capture fan or opening is automatically adjusted to face the wind (e.g., within a range of angles), for example, by pivoting about an axis of rotation.

Figure 47:
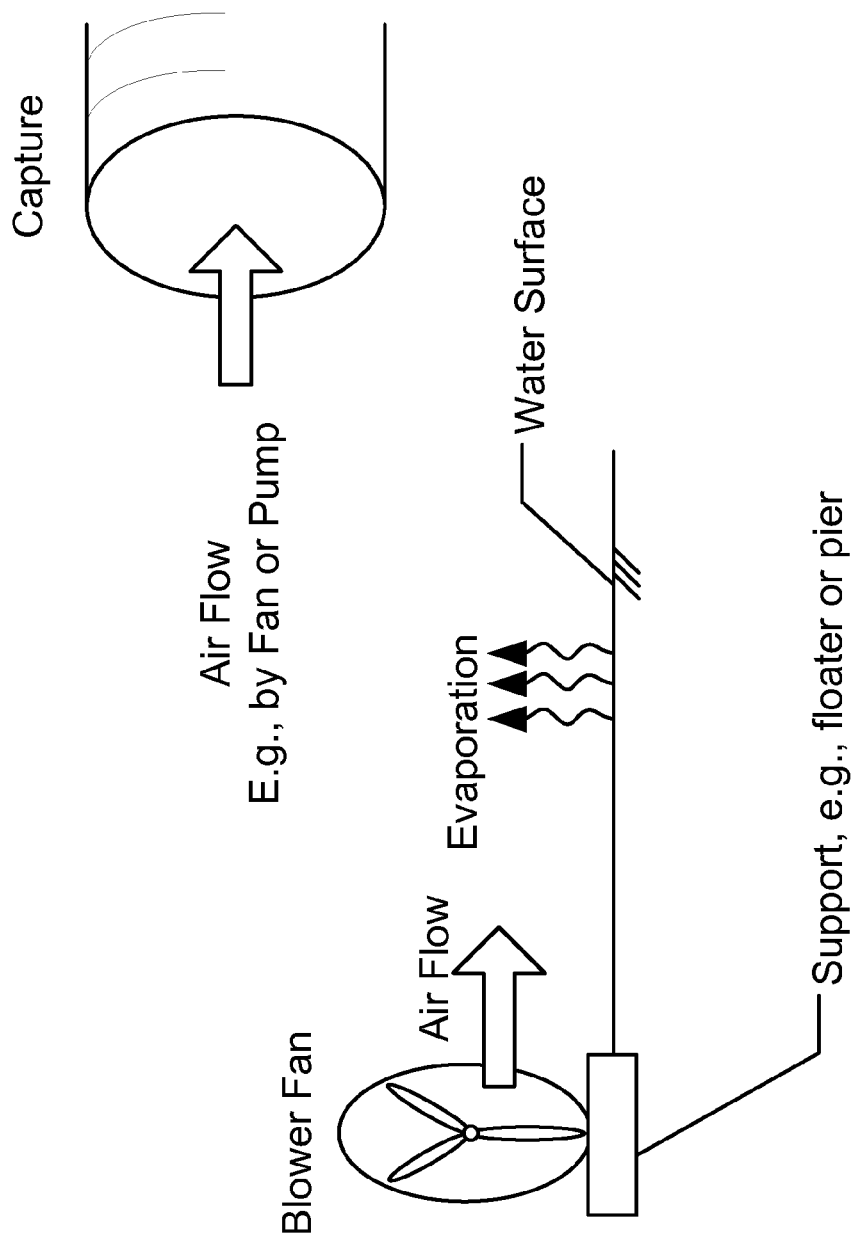
FIG. 47 depicts an embodiment of invention with an automatically controllable/adjustable blower/fan supported on a floater or pier to enhance or create air flow over the water surface to increase the evaporation and a air-vapor capture mechanism.

In one embodiment, as for example depicted in FIG. 47, the fan or blower is installed on an adjustable support or floater or a pier. In one embodiment, the fan/blower operation is controlled and/or monitored by a control module at a central location. In one embodiment, the floater or support is movable, e.g., on rail or via cable/chain/rope. In one embodiment, the direction/speed of the fan/blower is adjusted by control module. In one embodiment, sensors near (e.g., in front and back) the surface of water and blower/fan are used to determine the temperature, humidity, wind speed/direction. In one embodiment, the sensor data is transmitted to the central location and/or control module and used to determine the operation of the fan/blower based on the sensed data, weather forecast data, time of day (and season), the status of the system (e.g., the condition of the storage tanks and the phase in the production cycle), and historical/empirical data. In one embodiment, the capture assembly has an opening to capture the air/vapor mixture. In one embodiment, the capture is enhanced by a fan or pump to maintain the air flow. In one embodiment, the coating on the capture pipe/channel is coated by reflective material so to reduce or prevent the temperature of the mixture from rising during the transport. In one embodiment, the capture channel/pipe includes heat exchange (for cooling the captured air flow), e.g., via circulating a cooler air in a separate pipe inside, within the jacket of the capture pipe, or outside of the capture pipe.

Figure 48:
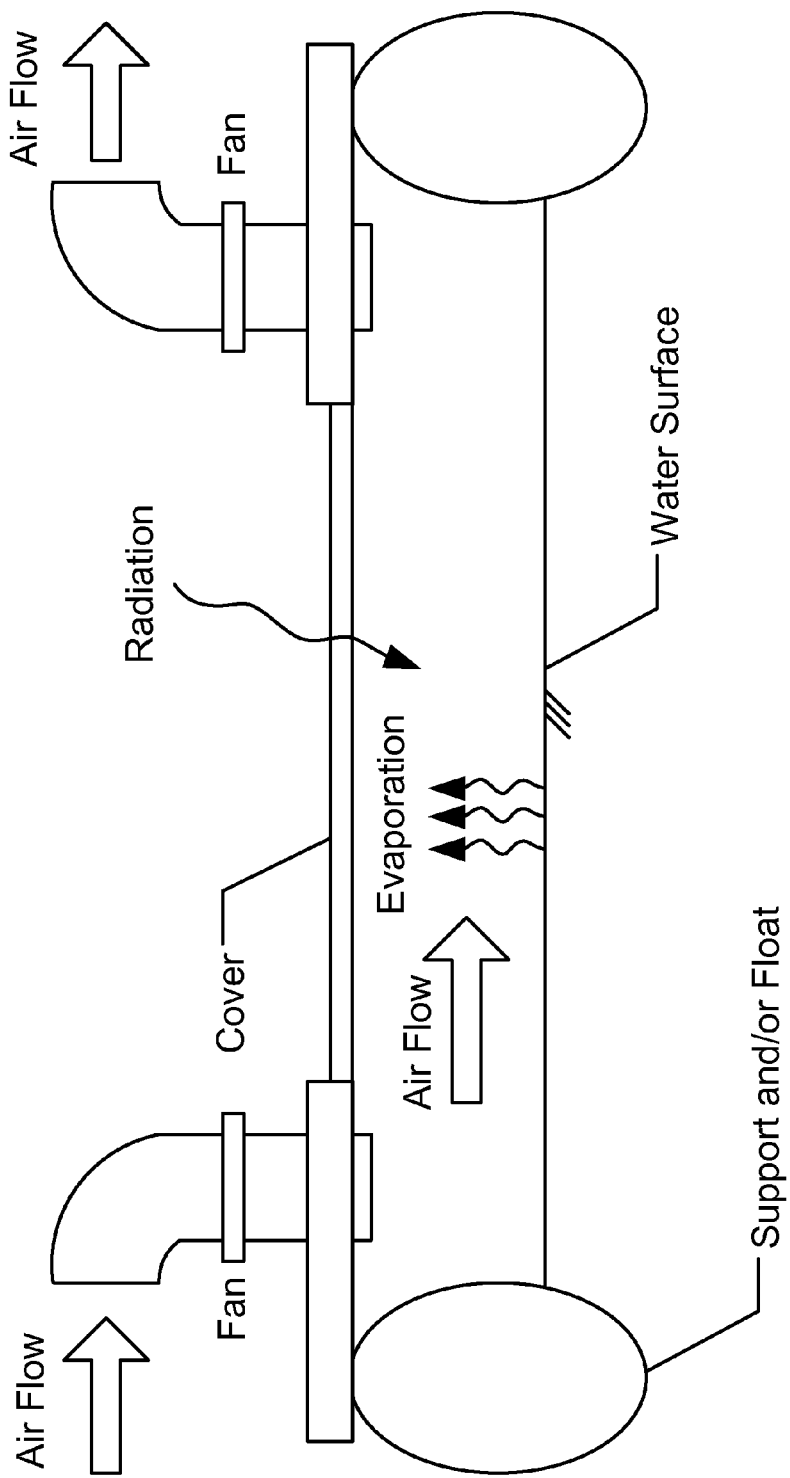
FIG. 48 depicts an embodiment of invention with a platform over water (e.g., floating) having a transparent cover for passing radiation (heat) to water and air flow mechanism (e.g., fan/blower moving air-vapor mixture below the cover).

In one embodiment, as for example depicted in FIG. 48, an air flow over the water surface is confined by a cover, e.g., a transparent cover, to allow radiation reach the water surface for heating and evaporating the water vapor. In one embodiment, the platform creates or supplements the air flow using one or more blower, fans, or pumps, e.g., installed on the platform or along the air flow channel. In one embodiment, the supports are floating over the surface of water and adjusted to maintain a clearance over the surface of water and the cover for the air flow. In one embodiment, the clearance is in range of about 1 to 6 feet. In one embodiment, the covers are rotatable or removable for maintenance (e.g., washing/rinsing), e.g., from below the cover or above. In one embodiment, the platforms are modularized and connected to provide larger surface area or air flow channel.

Figure 49:
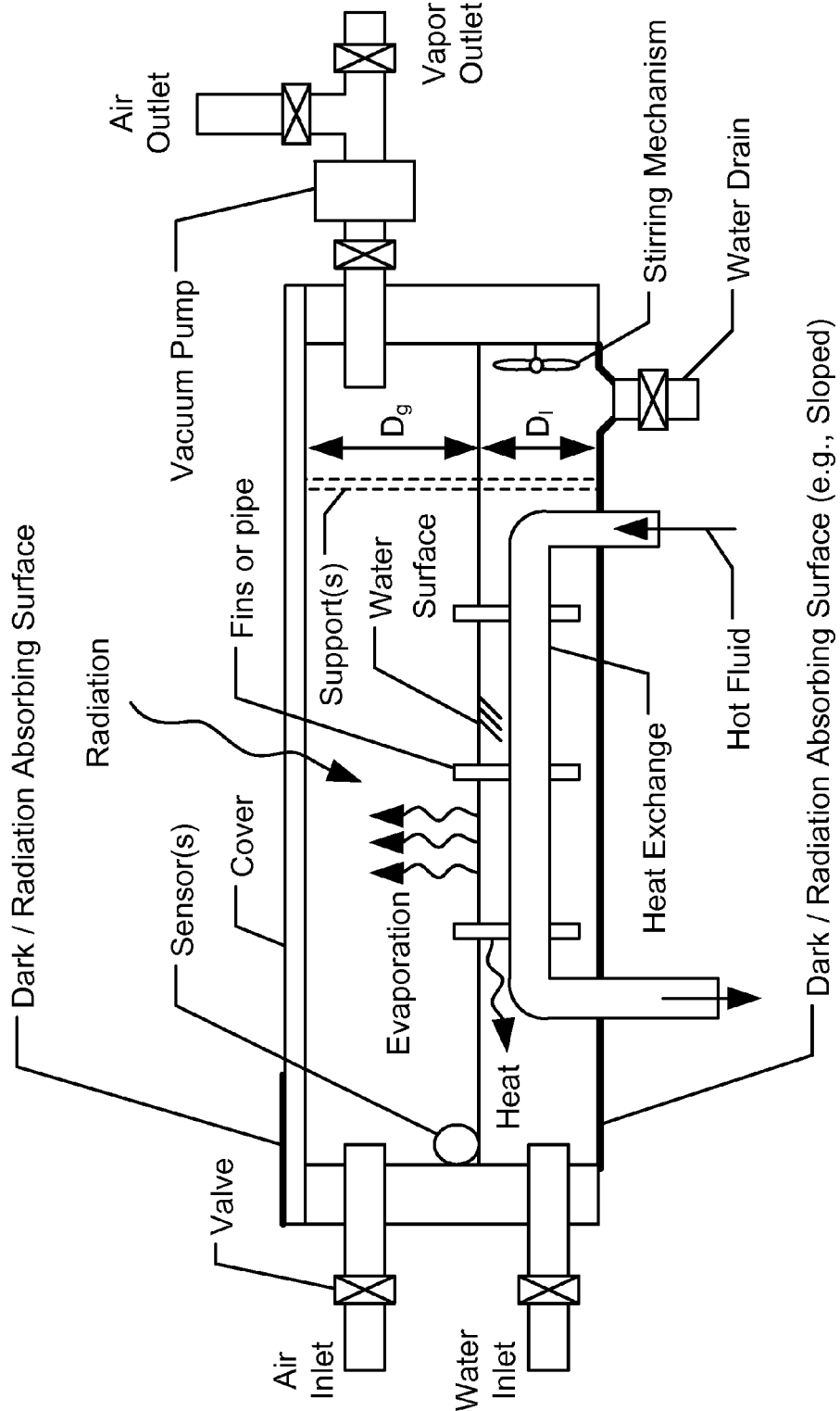
FIG. 49 depicts an embodiment of invention with water inlet and partial vacuum, radiation absorbing surfaces, and heat exchange to enhance the water evaporation rate.

In one embodiment, as for example depicted in FIG. 49, the evaporation from the surface is enhanced by applying low pressure (e.g., using a vacuum pump) over the surface of water in a closed (e.g., by automatic controllable/programmable valves) chamber. In one embodiment, the chamber includes an air inlet to break the partial vacuum (e.g., for maintenance). In one embodiment, the radiation (e.g., from sun) is used to heat the water directly and/or via absorption by dark or radiation absorbing surface (e.g., on the chamber or inside chamber, for example, below water surface or covering parts of the chamber walls or various assemblies). In one embodiment, the surface of the water is agitated by a mixing or stirring mechanism (e.g., fan or a magnetic coupler) to provide heat to the surface of the water, since during the water evaporation, the latent heat of evaporation is carried away by the vapor. In one embodiment, the depth of the water in chamber (e.g., denoted as $D_1$) is in range of few inches to several feet, e.g., depending on the size of the system. In one embodiment, the clearance above the water surface (e.g., denoted as $D_g$) in n range of several inches to several feet, depending on the size of the system and the rate of evaporation. In one embodiment, the pump is reduces the pressure in the chamber below the saturated partial pressure of the water vapor to maintain the outflow of the vapor from the chamber. In one embodiment, an air outlet is provided for initial pumping out the chamber so that the initial air in the chamber (e.g., after a maintenance task) does not flow to the vapor outlet. In one embodiment, the valves for gas and liquid are controlled remotely by a control module. In one embodiment, supports are provided with the chamber (e.g., in the middle of the chamber) to support against the pressure difference on the cover and/or the chamber. In one embodiment, a heat exchange is used to heat the water and/or air within the chamber for faster evaporation rate and higher dew point. In one embodiment the bottom of the chamber is sloped to help with discharging of the water (e.g., after evaporation increase the salinity beyond a threshold) through a drain through a valve. In one embodiment, various sensors are used to monitor the temperature of gas and water, humidity, level of water, and/or salinity.

Figure 50:
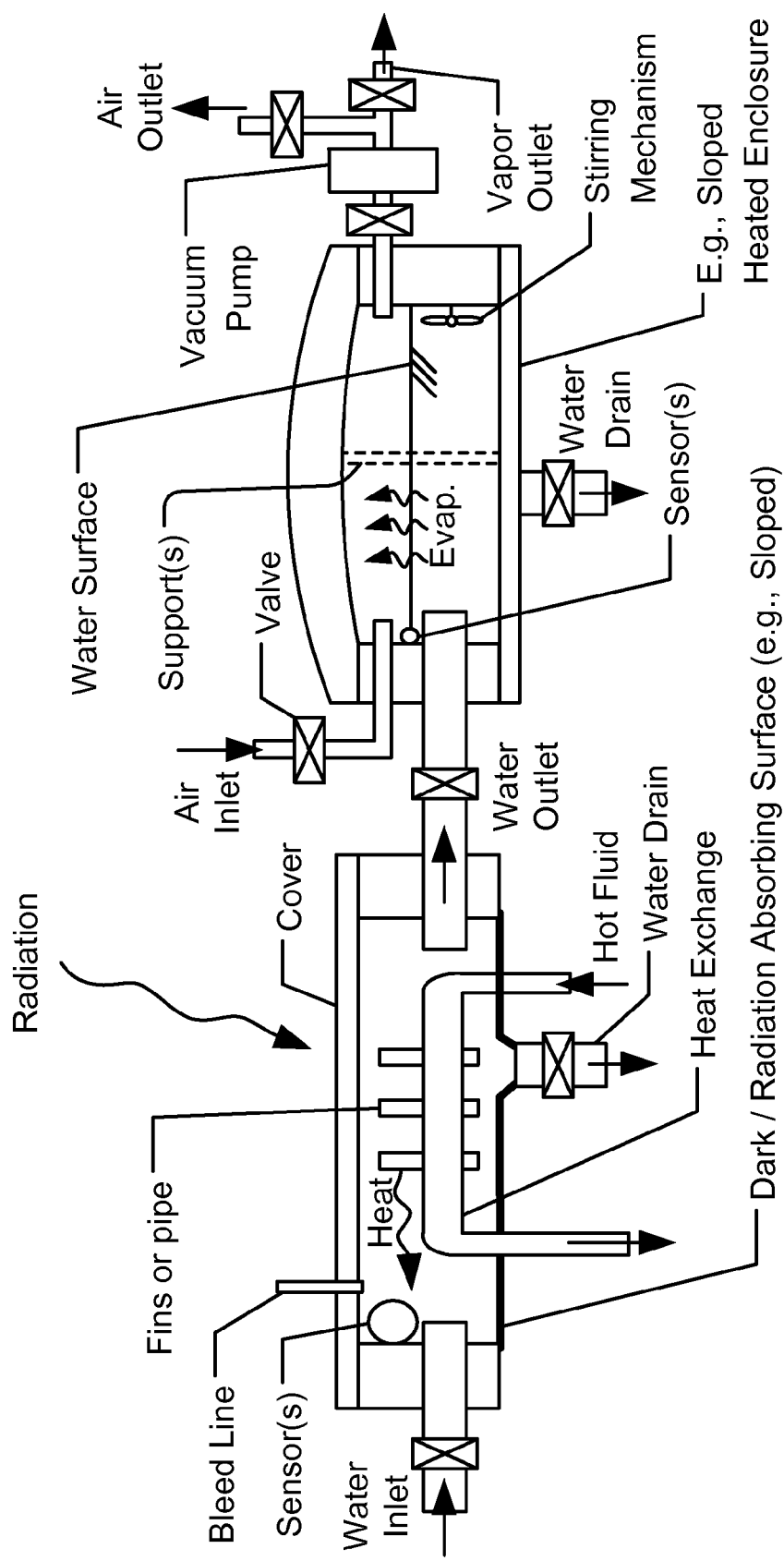
FIG. 50 depicts an embodiment of invention with heating chamber for water and evaporation chamber having partial vacuum.

In one embodiment, as for example depicted in FIG. 50, the preheating of the water is separated from the water evaporation in a partial vacuum. In one embodiment, the heating chamber operates at the same or similar pressure as the environment (e.g., 1 atm). In one embodiment, the heating chamber is filled mostly with water from a water inlet. In one embodiment, a bleed line lets the air or water overflow out. In one embodiment, the heat exchange and/or radiation (e.g., from sun) is used to heat the water in the chamber. In one embodiment, the heated water is moved to an evaporation chamber (e.g., via gravity flow and/or pump). In one embodiment, the construction of the evaporation chamber is strengthened to withstand higher vacuum. In one embodiment, a vacuum pump is used to pump the evaporated vapor through a vapor outlet. In one embodiment, the programmable valves are used to control the operation of the water and gas flow, e.g., letting air in the chamber and discharging the water from the drain. In one embodiment, the evaporation is done with additional heating, e.g., by heat exchange from the enclosure. In one embodiment, one or more evaporation chambers are used per one heating chamber, based on the rate of evaporation and the rate of the water heating. In one embodiment, one or more of evaporation chambers are fed from one or more heating chambers using programmable valves and connecting manifolds.

Figure 51:
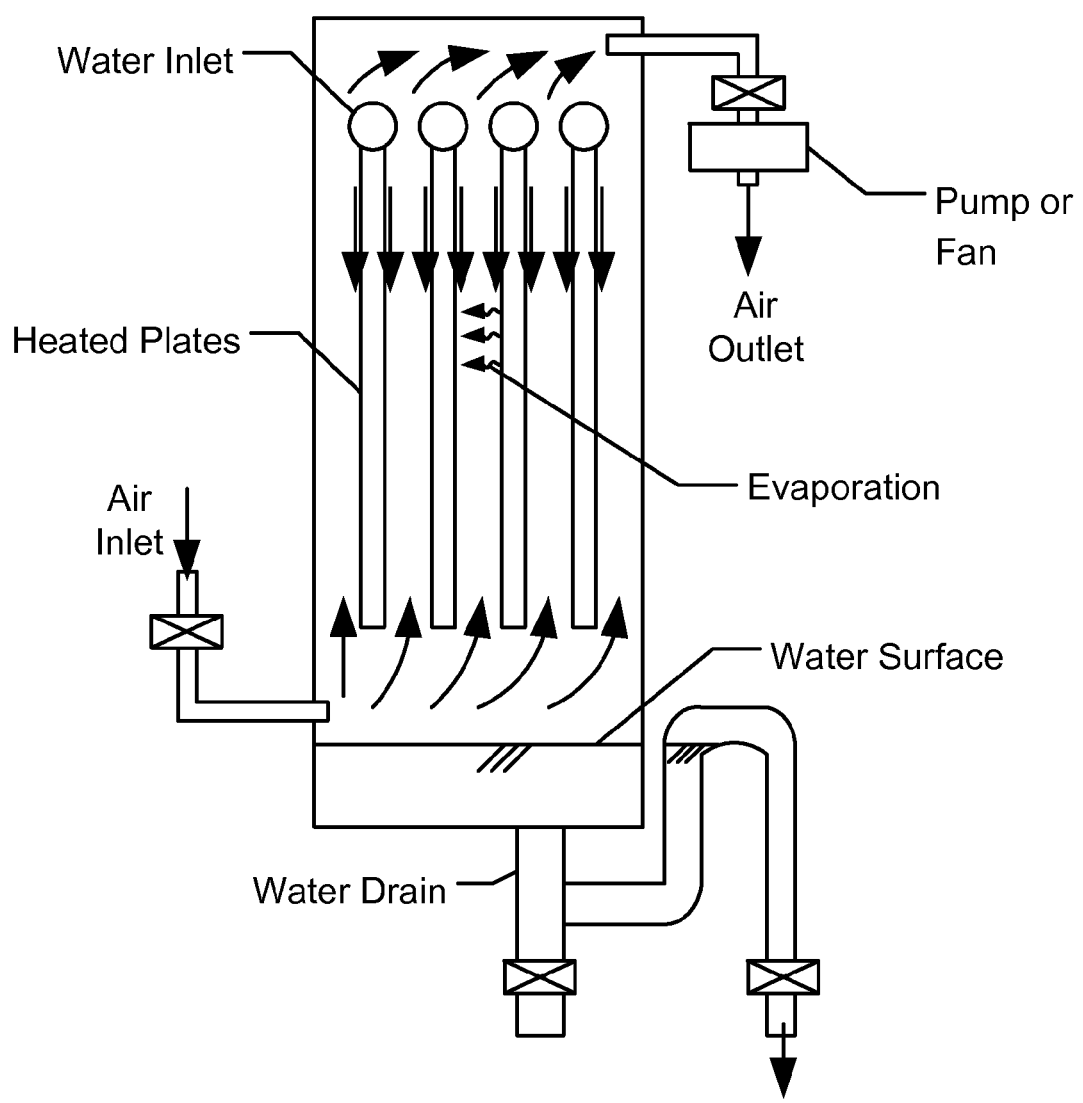
FIG. 51 depicts an embodiment of invention with multiple heating surfaces for water evaporation and water inlet(s) supplying water above the surfaces.

In one embodiment, as for example depicted in FIG. 51, a chamber with one or more evaporation surfaces are sprayed, dripped, flowed by water inlet on top of the surfaces/plates. In one embodiment, the plates are vertically or in slop for water to flow over their surfaces by gravity. In one embodiment, an air flow is used to enhance the evaporation of the water, e.g., from heated plates (e.g., by heat exchange, radiation, electrical, or chemical reactions). In one embodiment, the water collects at the bottom of chamber and drained through a siphon (e.g., to regulate the level of the water. In one embodiment, a drain is provided at the bottom of the chamber for maintenance. In one embodiment, a fan or pump is used to flow the vapor through the outlet. In one embodiment, the modular design allows the scaling of production and reduction of the foot print.

Figure 52:
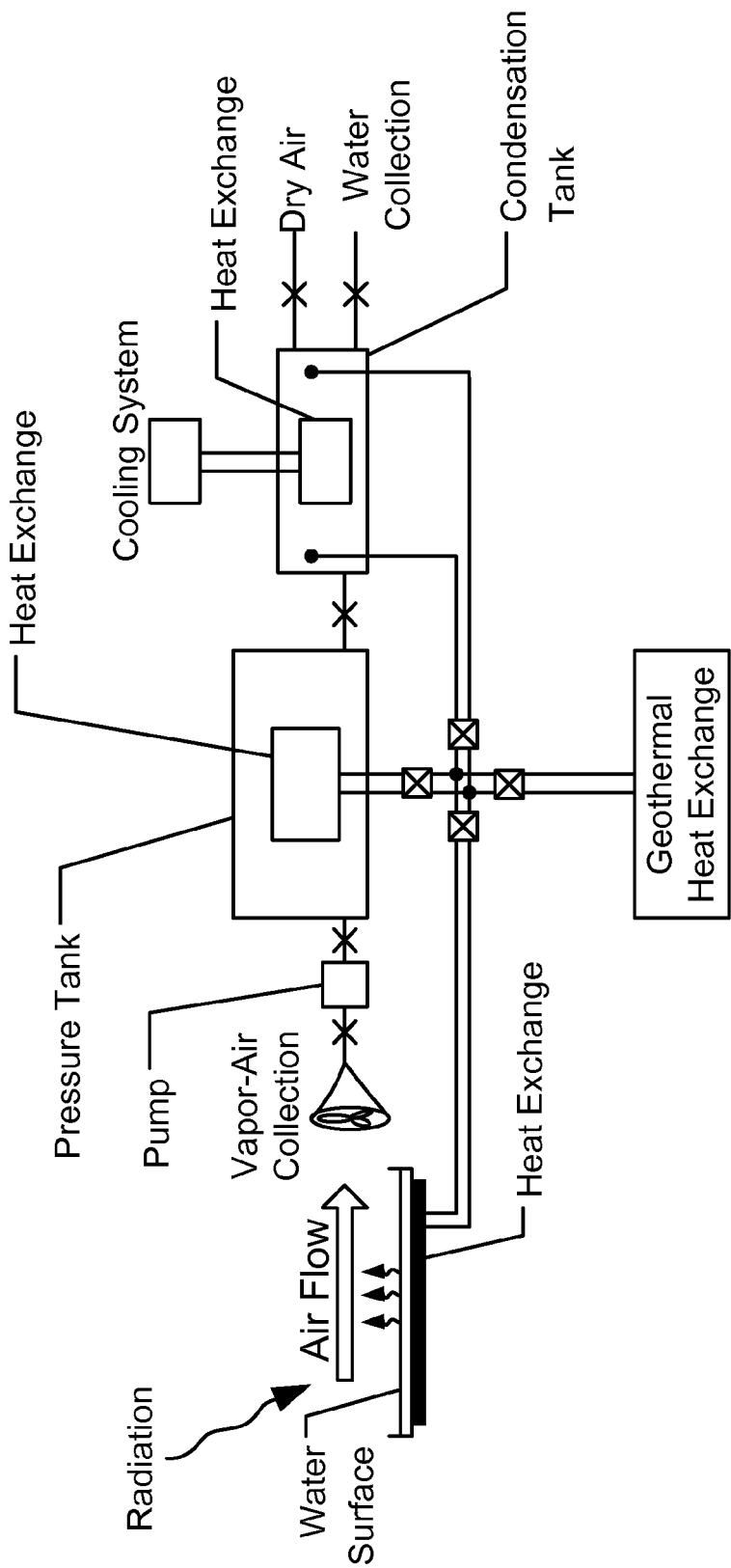
FIG. 52 depicts an embodiment of invention, with captured vapor pressurized and cooled via heat exchange with evaporator, geothermal, and/or cooled air from condensation tank.

In one embodiment, as for example depicted in FIG. 52, water vapor evaporated off of a body of water (e.g., a pool, sea, or tray) is collected by one or more vapor-air collection fans/pumps. In one embodiment, the captured mixture is stored in a tank. In one embodiment, the tank is pressurized (e.g., by pump) to increase the dew point. In one embodiment the heat from the storage tank is exchanged with the evaporation module to help increase the evaporation rate or increase the partial pressure of water vapor at the evaporation module while cooling down the storage tank. In one embodiment, the storage tank is cooled, e.g., via heat exchange by geothermal or other cooling mechanism. In one embodiment, the storage tank is cooled via heat exchange with cooled air from condensation tank (e.g., by circulating the cooled air as the cooling fluid in the heat exchanger and/or by using a separate heat exchanger on the condensation tank). In one embodiment, the heat exchange with the storage tank is controlled automatically and/or remotely by a controlled module by switching the heat exchange paths with valves and pipes/manifolds, based on the status of the modules (e.g., temperatures and efficiencies of heat exchange with each module). In one embodiment, the vapor mixture from storage tank is let into condensation tank (e.g., through a valve), and water condensation is done via a cooling system and a condenser/refrigeration system to bring the temperature of the mixture below the dew point. In one embodiment, the pressure in the condensation tank is regulated via the pressure in the storage tank. In one embodiment, the condensed water liquid is extracted from the condensation tank for further processing and use, and the air (e.g., relatively dry air) is removed for release or distribution to residential or commercial buildings. In one embodiment, the storage tank is not pressurized and it is cooled by geothermal and/or circulation or heat exchange with the cool air from the condensation tank after the condensation cycle. In one embodiment, the extracted heat from the cooling system of the condensation tank is directed to the evaporation module (e.g., via heat exchange) to help with increase water evaporation. In one embodiment, multiple the heat exchange paths share same carrier fluid.

Figure 53:
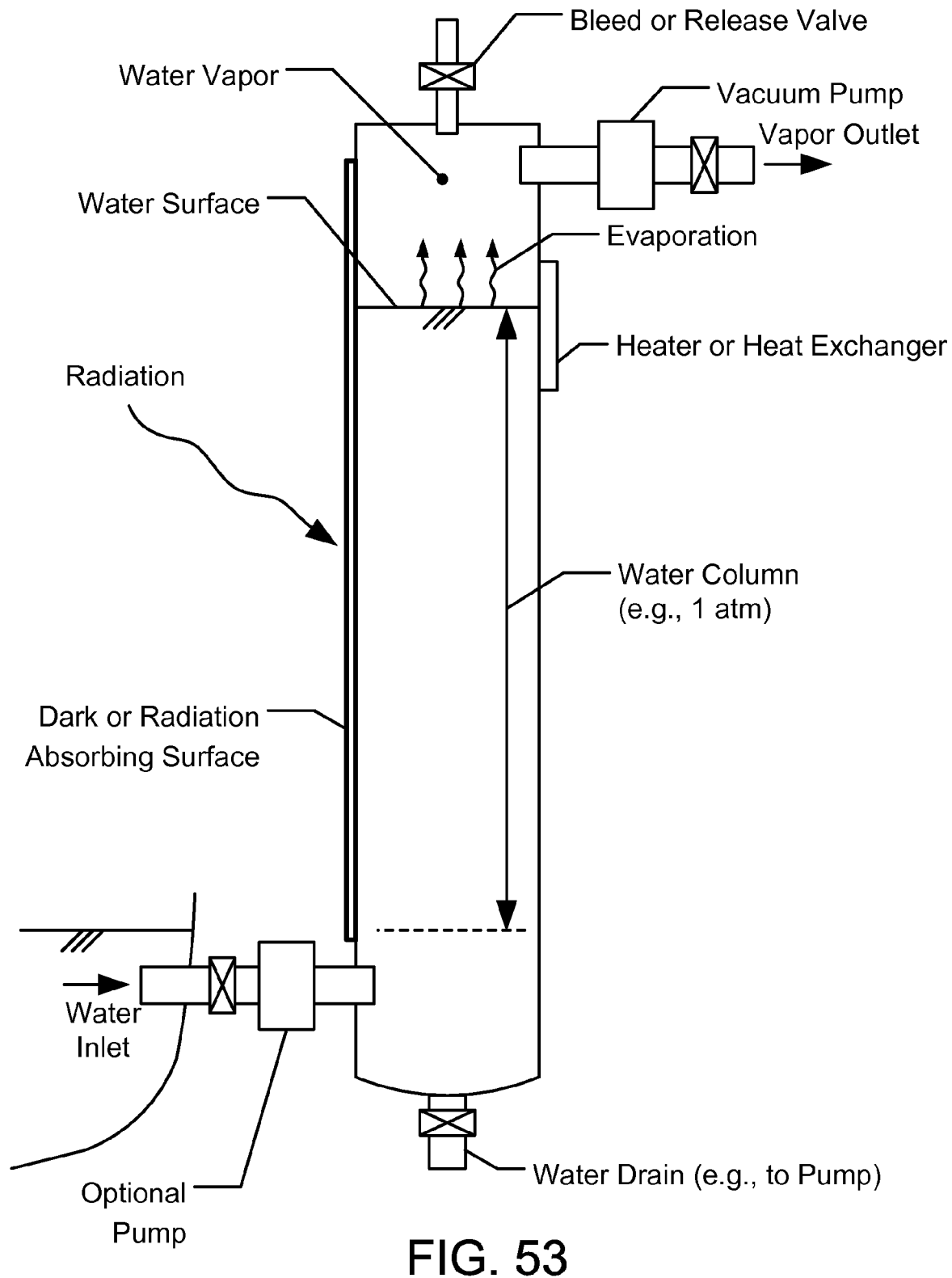
FIG. 53 depicts an embodiment of invention with a water column maintained by partial vacuum for evaporation using heat from radiation and/or heat exchange.
Figure 54:
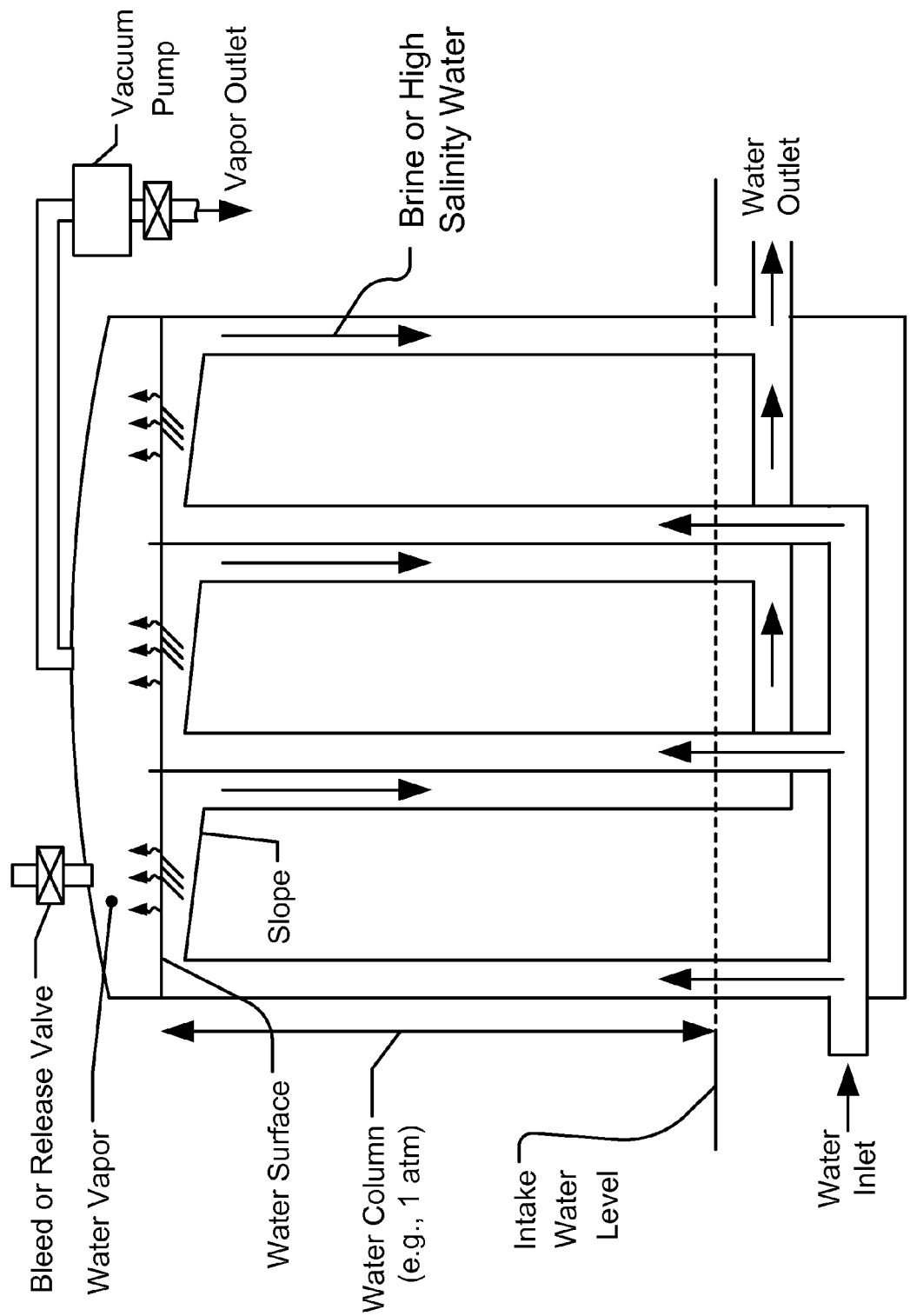
FIG. 54 depicts an embodiment of invention with water column(s) maintained by partial vacuum for evaporation using heat from radiation and/or heat exchange and mixing reduction in water inlet and outlet.

In one embodiment, as for example depicted in FIG. 53, a water column is setup using a vacuum pump to create a partial vacuum over the surface of the water in the column. The height of the water column, e.g., based on 1 atm pressure difference is less than 10 meters. In one embodiment, the water on top of the water column is heated to increase the evaporation rate at the water surface, e.g., via radiation (e.g., on dark or radiation absorbing surface or coating) and/or heat exchange or heater close to the water surface above the water column. In one embodiment, water with high salinity (e.g., due evaporation) flows down to the bottom to be drained and replaced with a new batch or in a continuous mode (e.g., with a pump). In one embodiment, a bleed or release line/valve is provided, e.g., for letting air in the system for maintenance and/or between batch cycles. In one embodiment, as for example depicted in FIG. 54, the paths for incoming water and heavier water, for example, with higher salinity (e.g., due to evaporation) is separated by sloping the evaporation platform toward the water drain. In one embodiment, multiple evaporation trays/pools/platforms are used in a modular construction. In one embodiment, one or more water inlets feed one or more evaporation platforms, and one or more drains are used to collect and discharge the water. In one embodiment, the drains are let into one or more water outlet. In one embodiment, the inlet and outlet water are positioned in a distance and/or in downstream to reduce the drained the amount of water getting back in the system without significant dilution in salinity.

Figure 55:
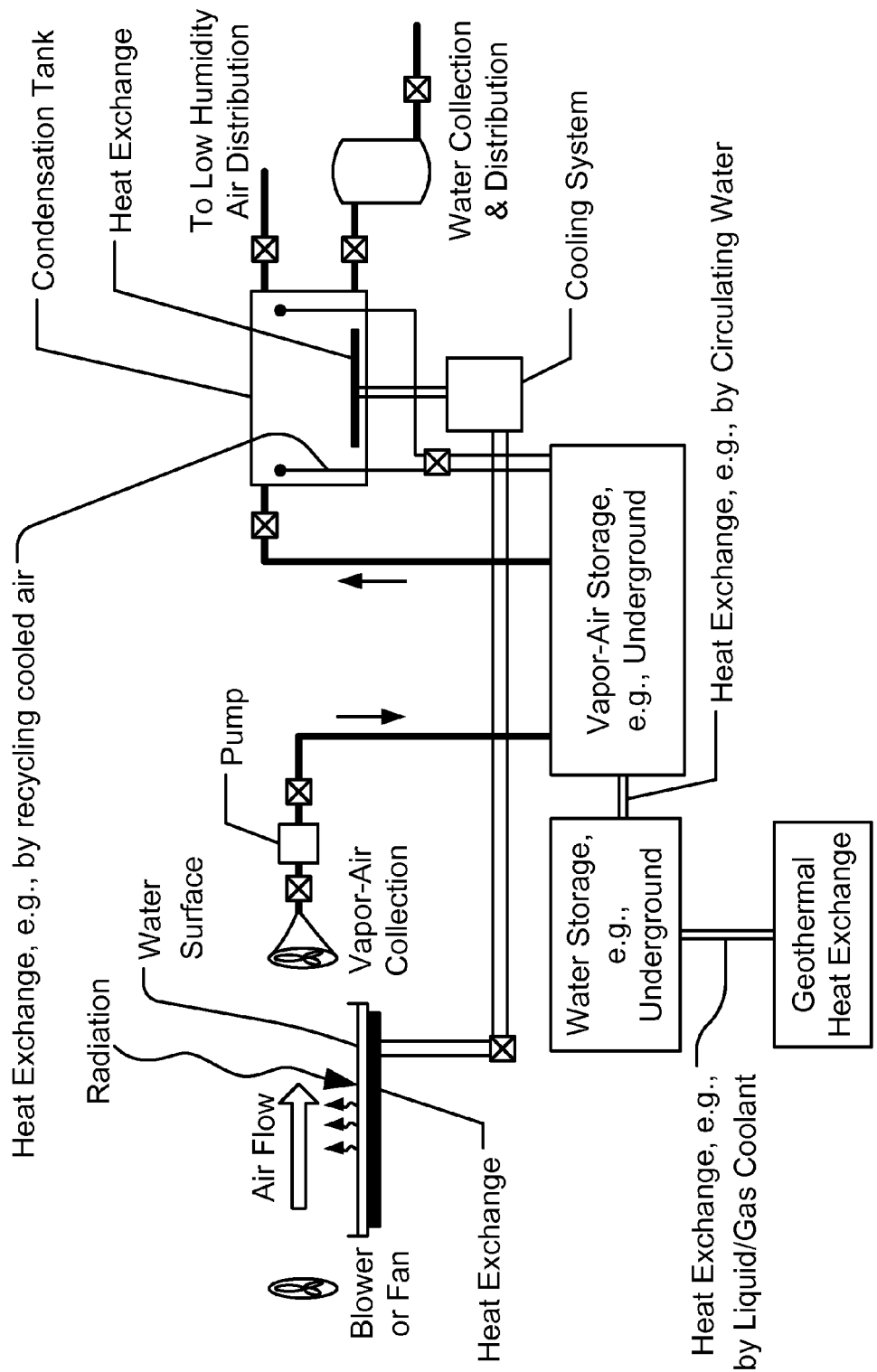
FIG. 55 depicts an embodiment of invention with vapor storage tank (e.g., underground) cooled via geothermal, water storage (e.g., underground), and/or cooled air (from condensation tank staging compartment) and operated by an automatic control and monitoring system, e.g., remotely.

In one embodiment, as for examples depicted in FIG. 55, the evaporation is enhanced by blower or fan to reduce the boundary layer over a body of water (e.g., on sea, pool, tray). In one embodiment, the vapor-air mixture is collected (e.g., via a fan or pump) and let into a storage tank. In one embodiment, the storage tank is placed underground to heat exchange with surrounding environment for cooling down the vapor-air mixture. In one embodiment, a separate water storage (e.g., sourced from sea) is placed, for example, underground, and it is cooled by geothermal heat exchange. In one embodiment, the heat capacity of the water storage is significantly higher than the vapor-air mixture in the storage tank. In one embodiment, the vapor-air mixture in the storage tank is cooled by heat exchange with the water storage, e.g., by circulating water in pipes/fins within vapor/air storage tank or using other (e.g., more efficient) cooling fluid for heat exchange. In one embodiment, the evaporation and vapor collection occurs during the day when the evaporation rate is high. In one embodiment, the cooling cycles with water storage and/or geothermal occur during and after vapor collection. In one embodiment, the cooled vapor mixture is sent to condensation tank, e.g., with a refrigeration or cooling system to condense the vapor to water and extract water into a water collection and distribution system. In one embodiment, the condensation tank has an air outlet that provides low(er) humidity air for distribution to residential and/or business/commercial buildings and/or structures. In one embodiment, the cooled air after the condensation cycle is used for heat exchange with the vapor-air storage tank to cool the mixture for later condensation. In one embodiment, the heat captured by the cooling system is directed to water evaporation module/tray/platform to increase the evaporation rate. In one embodiment, a control module automatically directs the operation of the system by automatically manage the heat exchanges based on temperature, humidity, storage capacity, and time of day/season. In one embodiment, the condensation occurs, e.g., during the night time when the cooling system is more efficient in disposing the extracted heat from the condensation tank. In one embodiment, the condensation occurs, e.g., during day time, when the heat from the cooling system is directed to the evaporation module to increase the vapor evaporation. In one embodiment, the system's heat exchange is staggered between parallel units. In one embodiment, the cooling of the air-vapor mixture at the storage tank occurs in stages (via various heat exchangers) and/or at cooling compartments/tanks. For example, as the air mixture cools at one stage of cooling, it is moved (using pump, fan, or blower) to the next compartment/tank. In one embodiment, the chain of cooling stages are scheduled to reduce the bottleneck in the operation. In one embodiment, the content of a tank is partially replaced during a stage of cooling, for example, when the receiving tank or enclosure has less capacity or processes less volume of mixture batch at a time. In one embodiment, the operation is optimized and automated by matching the water/mixture/air flow throughput of the production at various stages of the process, e.g., by matching the number of active modules at each stage of processing with the throughput and using programmable valves, manifolds, sensors/detectors, and rules.

Figure 56:
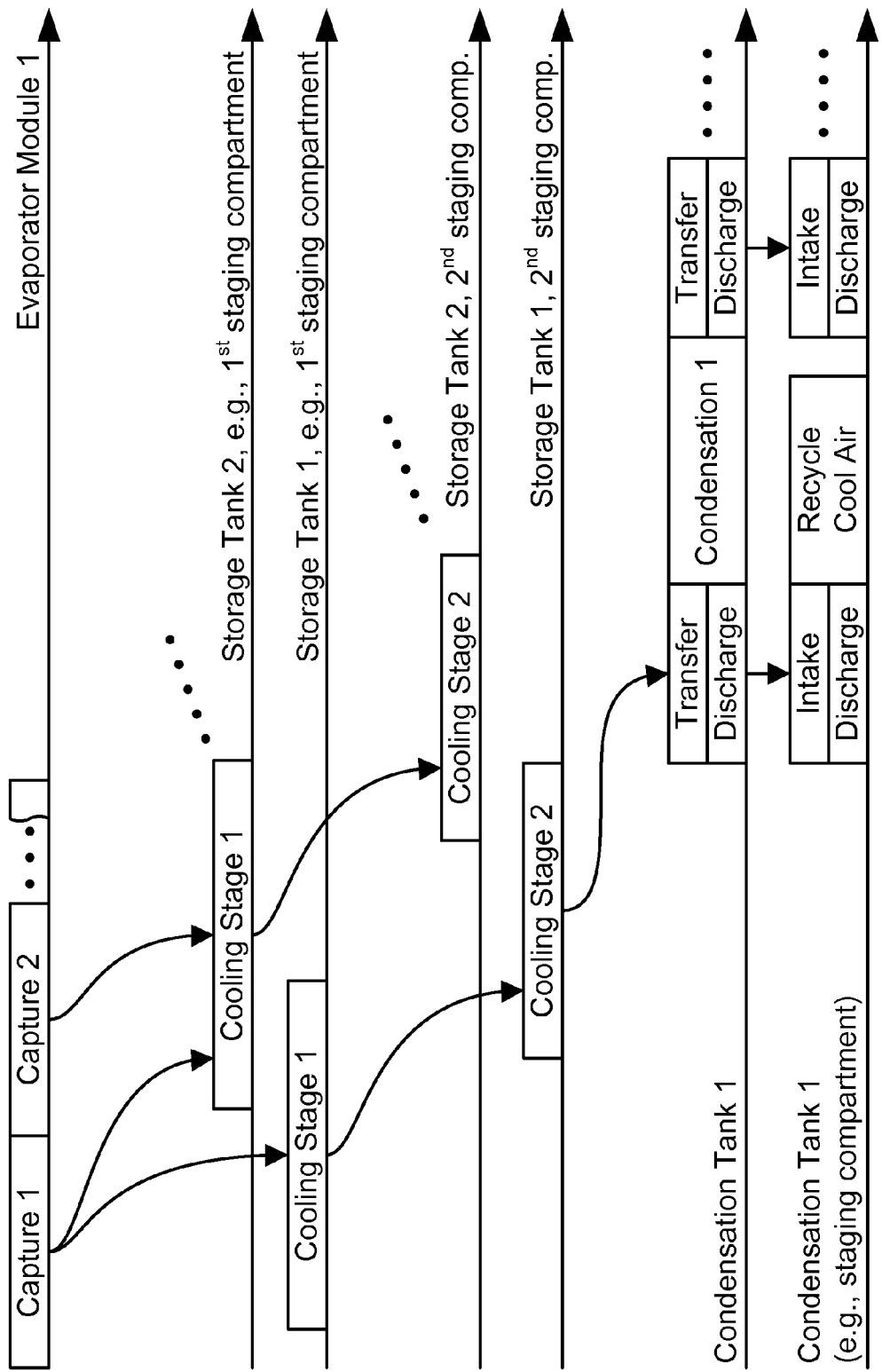
FIG. 56 depicts an example of the phases of operation for various modules of system in an embodiment of invention, e.g., for capture, storage, cooling, condensation, and distribution.

In one embodiment, as for example depicted in FIG. 56, the operation of various modules are scheduled with dependency on other tasks. In one embodiment, the output of one or more evaporator modules is directed to one or more storage tanks. For example, during Capture 1 phase, the captured vapor mixture is directed to Storage Tank 1 (e.g., to the $1^{st}$ staging tank/compartment). In one embodiment, the existing content of this staging compartment is moved to a second staging compartment to further cooling. In one embodiment, the compartments are arranged in series so to reduce or prevent mixing of the incoming hotter air with already cooled air, as the cooling with heat exchangers require time to reduce the temperature of the air-vapor mixture. In one embodiment, the cooling in one stage is done by, for example, heat exchange with cool water (e.g., from an underground water storage) and/or geothermally. In one embodiment, the cooling in one stage is done, for example, by heat exchange with cooled (dry) air from the condensation tank (e.g., by circulating the cooled air or via another fluid). In one embodiment, the recycled air from a staging compartment is used to lower the temperature of the air-vapor mixture within the condensation tank (e.g., as a pre-condensation cooling) and/or to lower the temperature in a staging compartment of a storage tank/compartment. In one embodiment, the inside of the compartments are arranged in sub-compartments to allow the air flow to exchange heat with the heat exchangers with reduced mixing between the incoming and outgoing gas. In one embodiment, the intake of the dry air in the staging compartment following the condensation phase occurs at the same time as discharging of the existing air from the staging tank/compartment (e.g., for distribution lower humidity air to buildings). In one embodiment, while a condensation tank is used for cooling/condensing water, an staging compartment is used extract heat from air-vapor in a condensation tank or a storage tank, e.g., by recycling the cooled air.

Figure 57:
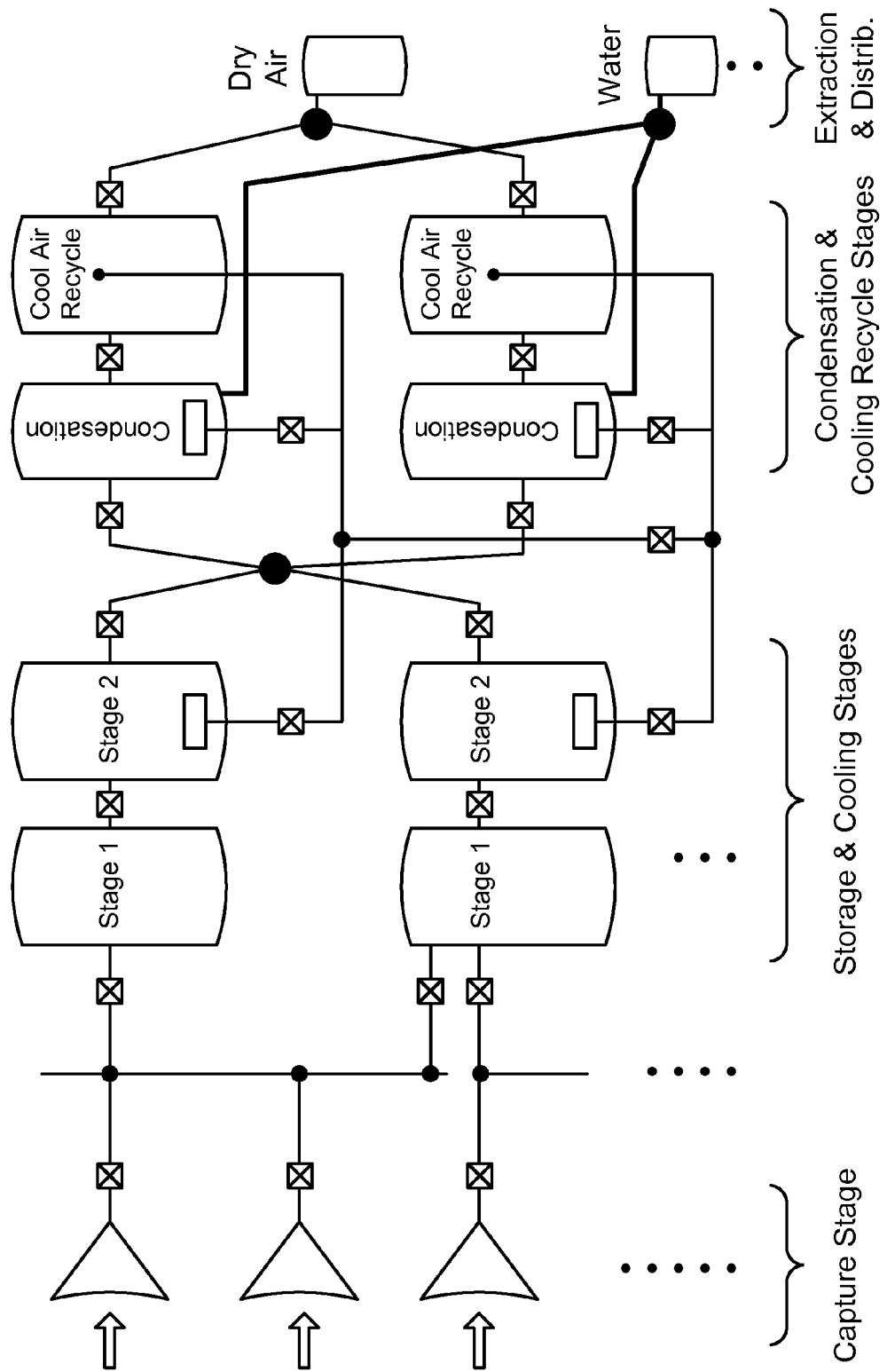
FIG. 57 depicts an example of various modules and their arrangement for optimizing cost and throughput within the system for example in continuous operation, e.g., for capture, storage, cooling, condensation, and distribution.

In one embodiment, as for example depicted in FIG. 57, the resources at multiple stage and phases in the production are matched automatically by directing the liquid/gas flow to available resource from one to next stage in the process. For example, the air-vapor captured from one or more capture modules may be directed to one or more storage tank concurrently, sequentially, and/or in staggered timing. In one embodiment, the tanks/compartments at different stages have one to one ratio and are arranged in sequential order in the process. For example, in one embodiment, each storage compartment feeds into a corresponding subsequent storage stage (for further cooling). However, in one embodiment, multiple storage modules share, for example, their $2^{nd}$ stage compartment. In one embodiment, sharing the compartment/tanks helps with maintaining a ready, high capacity resource for the next stages. For example, multiple condensation tanks may feed from a storage compartment concurrently, sequentially, or in staggered fashion. In one embodiment, multiple cool air recycling tanks/compartments are concurrently used to cool one or more condensation and/or storage tanks based on the temperature, capacity, phase and status of the units, e.g., automatically and/or remotely, via one or more controllers, e.g., by manipulating (e.g., via actuators) programmable valves and regulators.

Some Embodiments and Examples for Features:

In some locations, the humidity of the air on sea is still high to large heights, e.g. up to 5 or 10 meters, or even more, in some seasons or time periods. Those locations can accommodate large fans with big diameters. Areas with large coast lines would be useful for large scale operations. In some locations, the humidity of the air coming inland is still high for many meters inland, which can accommodate large fans located inland, which are cheaper to operate and maintain. In some locations, the oil is on water, which is not good for our operation. So, we filter or remove them from surface first, e.g. with spoon shaped devices on boats or floaters, as well as filters for oil. In one example, we use fan on or in or half-in or partially-in the water to splash and produce more vapor or humidity locally, to get sucked in by fans, near the fans. In one example, we use spray or nozzle with motor or pump, for water mist for more humidity for operation near the fans.

Some examples are 5 to 50 meters distance to the shore, for operation, but it can be lower or higher numbers, as well, for distance to the shore. Some examples for the arms are 5 to 50 meters, but it can be lower or higher numbers, as well. The cranes and towers are for example between 2 to 20 meters in length, but they can be lower or higher numbers, as well. Some examples for materials for pipes and assembly or arms, and cranes/towers are concrete, metal, plastic, fiberglass, clothing, glass, and wood.

Some Embodiments and Examples for Features:

Here are list of features for various embodiments:

A method of extracting water from the humidity collected from sea or river, said method comprising: a collector tip sucking up humidity from surface of said sea or river, using a fan; a processor device receiving weather data from weather authority and local data from a local unit; said processor device analyzing said weather data and said local data; a rules engine receiving rules from a rules database; said processor device communicating with said rules engine; said processor device applying said rules to said weather data and said local data; said processor device sending rules and data analysis to a controller; wherein said collector tip is connected to a first end of a flexible accordion-shaped tube; wherein said flexible accordion-shaped tube has a circular cross-section; wherein said flexible accordion-shaped tube is made of plastic or elastic material; wherein a second end said flexible accordion-shaped tube is connected to a tower; wherein said tower is located at a shore near edge of said sea or river; wherein a crane is connected to said tower; wherein said crane holds said flexible accordion-shaped tube, using multiple sets of connected bar pieces; wherein each of said multiple sets of connected bar pieces comprises two or more bar pieces; wherein each of said bar pieces is connected to another of said bar pieces, by a hinge or connector or elbow; wherein said fan is installed inside said flexible accordion-shaped tube; a first motor rotating said fan; wherein a second set of motors are connected to said multiple sets of connected bar pieces, using a set of main bars; wherein said second set of motors are located on said tower; wherein each of said set of main bars comprises holes, which are located periodically throughout each of said set of main bars' length; wherein there are N0 motors in said second set of motors, and there are N0 sets of connected bar pieces in said multiple sets of connected bar pieces, and there are N0 main bars in said set of main bars; wherein N0 is an integer number, equal or larger than 3; each of said N0 motors rotating a gear; said gear engaging said holes which are located periodically throughout each of said set of main bars' length, using said gear's pins; each of said N0 motors pushing or pulling each of said set of main bars; each of said set of main bars pushing or pulling each of said multiple sets of connected bar pieces; a first of said multiple sets of connected bar pieces moving said collector tip horizontally; said first of said multiple sets of connected bar pieces rotating said collector tip; said first of said multiple sets of connected bar pieces orienting said collector tip; said local unit receiving wind direction and wind speed information from a wind vane and an anemometer, respectively; wherein said wind vane and said anemometer are located on said crane; said processor device receiving said wind direction and wind speed information from said local unit; said processor device analyzing said wind direction and wind speed information; said processor device sending wind analysis to said controller; said controller communicating with said tower, said crane, said second set of motors, and said first motor; said controller adjusting direction and orientation of said collector tip to be same as said wind direction, using said multiple sets of connected bar pieces; said first of said multiple sets of connected bar pieces lifting said collector tip from one side in a vertical position; said controller adjusting operation of said tower, said crane, said second set of motors, and said first motor, based on said rules engine, according to said rules database; if relative humidity measured by said local unit is below Hr0, then said controller turning off said fan, said crane, said second set of motors, and said first motor; if air temperature measured by said local unit is below T0, then said controller turning off said fan, said crane, said second set of motors, and said first motor; if air temperature measured by said local unit is below T1, and relative humidity measured by said local unit is below Hr1, then said controller turning off said fan; if said wind speed is more than V0, then said controller turning off said fan, said crane, said second set of motors, and said first motor; said processor device receiving energy usage and consumption data from said local unit; if more than N percent of energy for operation comes from non-green or renewable kinds, then said controller turning off said fan; if more than N1 percent of the energy for operation comes from battery, then said controller turning off said fan; if less than G gallons per minute of water is extracted by said local unit, then said controller turning off said fan; if less than G1 gallons of water is extracted by said local unit, per Z energy used, then said controller turning off said fan; and if less than G2 gallons of water is extracted by said local unit, per Z1 non-renewable energy used, then said controller turning off said fan.

G1 is between 0.5 to 10 gallons, and G2 is between 0.5 to 10 gallons.

A floater station comprises two floaters on each side of said floater station, with a flat plate situated between and held by said two floaters; wherein said two floaters float on water, with relative density of said two floaters being lower than that of water; wherein said flat plate situated a distance DS below surface of water, submerged in water; wherein said flat plate has a dark non-reflective rough surface, for light absorption; placing said floater station under said collector tip; and collecting water in a cold chamber, from humidity collected from said floater station, through said collector tip.

Wherein said distance DS is 5 cm.

Wherein said distance DS is between 1-100 cm.

Wherein said flat plate has black color.

Said flat plate has bumpy surface with bumps about 1 cm.

Flat plate has bumpy surface with bumps between 1 mm to 10 cm.

wherein said two floaters are made of wood.

wherein said two floaters are made of hollow plastic.

wherein said two floaters are made of hollow metal.

wherein said floater station is rectangular-shaped.

wherein said floater station has a motor to move around.

wherein said floater station has two motors, placed perpendicular to each other, to move around in 2 different directions or axes.

wherein said floater station has an antenna for communication to said controller or said processor device.

wherein said multiple sets of connected bar pieces are made of metal.

wherein said multiple sets of connected bar pieces are made of plastic.

wherein said set of main bars are made of plastic.

wherein said set of main bars are made of metal.

wherein N0 is 3.

wherein N0 is between 3 to 10.

wherein said cold chamber has a drain on bottom to get water out of said cold chamber.

A floater station comprises two floaters on each side of said floater station, with a plate situated between and held by said two floaters; wherein said two floaters float on water, with relative density of said two floaters being lower than that of water; wherein said plate situated a distance DS below surface of water, submerged in water; a second floating fan, powered by a separate motor, located near said collector tip, pushing water toward said collector tip; wherein said second floating fan is half-submerged in water in vertical position, so that bottom blade of said second floating fan is in water; wherein said plate has a 2-dimensional array of holes, with sloped surface toward center of said 2-dimensional array of holes, for removal of remaining salt and debris from surface of said plate; placing said floater station under said collector tip; and collecting water in a cold chamber, from humidity collected from said floater station, through said collector tip.

wherein said second floating fan is located on a boat or floating device.

wherein said boat or floating device is made of wood.

wherein said boat or floating device is made of hollow plastic or elastic material.

General Variations and Teachings:

A user enters commands or information into the computer through input device(s). Input devices include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit through the system bus via interface port(s). Interface port(s) include, for example, a serial port, a parallel port, a game port, and a universal serial bus (USB). Output device(s) use some of the same type of ports as input device(s). Thus, for example, a USB port may be used to provide input to computer, and to output information from computer to an output device. There are some output devices like monitors, speakers, and printers, among other output devices, which require special adapters. The output adapter includes, by way of illustration and not limitation, video and sound cards that provide a means of connection between the output device and the system bus. It should be noted that other devices and/or systems of devices provide both input and output capabilities such as remote computer(s).

Computer can operate in a networked environment using logical connections to one or more remote computers, such as remote computer(s). The remote computer(s) can be a personal computer, a server, a router, a network PC, a workstation, a microprocessor based appliance, a peer device, a smart phone, a tablet, or other network node, and typically includes many of the elements described relative to computer. Remote computer(s) is logically connected to computer through a network interface and then connected via communication connection(s). Network interface encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) refers to the hardware/software employed to connect the network interface to the system bus. The hardware/software necessary for connection to the network interface includes, for exemplary purposes only, internal and external technologies such as, modems including regular telephone grade modems, cable modems and DSL modems, ISDN adapters, and wired and wireless Ethernet cards, hubs, and routers.

The system, e.g., includes one or more client(s), which can include an application or a system that accesses a service on the server(s). The client(s) can be hardware and/or software (e.g., threads, processes, computing devices). The client(s) can house cookie(s), metadata and/or associated contextual information by employing the specification, for example.

The system also includes one or more server(s). The server(s) can also be hardware or hardware in combination with software (e.g., threads, processes, computing devices). One possible communication between a client and a server can be in the form of a data packet adapted to be transmitted between two or more computer processes where the data packet contains, for example, an audio sample. The data packet can include a cookie and/or associated contextual information, for example. The system includes a communication framework (e.g., a global communication network such as the Internet) that can be employed to facilitate communications between the client(s) and the server(s).

Communications can be facilitated via a wired (including optical fiber) and/or wireless technology. The client(s) are operatively connected to one or more client data store(s) that can be employed to store information local to the client(s) (e.g., cookie(s) and/or associated contextual information). Similarly, the server(s) are operatively connected to one or more server data store(s) that can be employed to store information local to the servers.

This may also be practiced in distributed computing environments where certain tasks are performed by remote processing devices that are linked through a communications network. In a distributed computing environment, program modules can be located in both local and remote memory storage devices.

The systems and processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Any variations of the above teaching are also intended to be covered by this patent application.

The invention claimed is:

1. A method of extracting water from the humidity collected from sea or river, said method comprising:

a collector tip sucking up humidity from surface of said sea or river, using a fan;
a processor device receiving weather data from weather authority and local data from a local unit;
said processor device analyzing said weather data and said local data;
a rules engine receiving rules from a rules database;
said processor device communicating with said rules engine;
said processor device applying said rules to said weather data and said local data;
said processor device sending rules and data analysis to a controller;
wherein said collector tip is connected to a first end of a flexible accordion-shaped tube;
wherein said flexible accordion-shaped tube has a circular cross-section;
wherein said flexible accordion-shaped tube is made of plastic or elastic material;
wherein a second end of said flexible accordion-shaped tube is connected to a tower;
wherein said tower is located at a shore near edge of said sea or river;
wherein a crane is connected to said tower;
wherein said crane holds said flexible accordion-shaped tube, using multiple sets of connected bar pieces;
wherein each of said multiple sets of connected bar pieces comprises two or more bar pieces;
wherein each of said bar pieces is connected to another of said bar pieces, by a hinge or connector or elbow;
wherein said fan is installed inside said flexible accordion-shaped tube;
a first motor rotating said fan;
wherein a second set of motors are connected to said multiple sets of connected bar pieces, using a set of main bars;
wherein said second set of motors are located on said tower;
wherein each of said set of main bars comprises holes, which are located periodically throughout each of said set of main bars' length;
wherein there are $N_0$ motors in said second set of motors, and there are $N_0$ sets of connected bar pieces in said multiple sets of connected bar pieces, and there are $N_0$ main bars in said set of main bars;
wherein $N_0$ is an integer number, equal or larger than 3;
each of said $N_0$ motors rotating a gear;
said gear engaging said holes which are located periodically throughout each of said set of main bars' length, using said gear's pins;
each of said $N_0$ motors pushing or pulling each of said set of main bars;
each of said set of main bars pushing or pulling each of said multiple sets of connected bar pieces;
a first of said multiple sets of connected bar pieces moving said collector tip horizontally;
said first of said multiple sets of connected bar pieces rotating said collector tip;
said first of said multiple sets of connected bar pieces orienting said collector tip;
said local unit receiving wind direction and wind speed information from a wind vane and an anemometer, respectively;
wherein said wind vane and said anemometer are located on said crane;
said processor device receiving said wind direction and wind speed information from said local unit;
said processor device analyzing said wind direction and wind speed information;
said processor device sending wind analysis to said controller;
said controller communicating with said tower, said crane, said second set of motors, and said first motor;
said controller adjusting direction and orientation of said collector tip to be same as said wind direction, using said multiple sets of connected bar pieces;
said first of said multiple sets of connected bar pieces lifting said collector tip from one side in a vertical position;
said controller adjusting operation of said tower, said crane, said second set of motors, and said first motor, based on said rules engine, according to said rules database;
if relative humidity measured by said local unit is below $H_{r0}$, then said controller turning off said fan, said crane, said second set of motors, and said first motor;
if air temperature measured by said local unit is below T0, then said controller turning off said fan, said crane, said second set of motors, and said first motor;
if air temperature measured by said local unit is below T1, and relative humidity measured by said local unit is below $H_{r1}$, then said controller turning off said fan;
if said wind speed is more than V0, then said controller turning off said fan, said crane, said second set of motors, and said first motor;
said processor device receiving energy usage and consumption data from said local unit;
if more than N percent of energy for operation comes from non-green or renewable kinds, then said controller turning off said fan;
if more than N1 percent of the energy for operation comes from battery, then said controller turning off said fan;
if less than G gallons per minute of water is extracted by said local unit, then said controller turning off said fan;
if less than G1 gallons of water is extracted by said local unit, per Z energy used, then said controller turning off said fan; and
if less than G2 gallons of water is extracted by said local unit, per Z1 non-renewable energy used, then said controller turning off said fan.

2. The method of extracting water from the humidity collected from sea or river, as recited in claim 1, wherein $H_{r0}$ is 50 percent.

3. The method of extracting water from the humidity collected from sea or river, as recited in claim 1, wherein $H_{r0}$ is between 40 to 70 percent.

4. The method of extracting water from the humidity collected from sea or river, as recited in claim 1, wherein T0 is 20 C.

5. The method of extracting water from the humidity collected from sea or river, as recited in claim 1, wherein T0 is between 15 to 30 C.

6. The method of extracting water from the humidity collected from sea or river, as recited in claim 1, wherein T1 is 25 C.

7. The method of extracting water from the humidity collected from sea or river, as recited in claim 1, wherein T1 is 20 to 35 C.

8. The method of extracting water from the humidity collected from sea or river, as recited in claim 1, wherein $H_{r1}$ is 40 percent.

9. The method of extracting water from the humidity collected from sea or river, as recited in claim 1, wherein $H_{r1}$ is 30 to 60 percent.

10. The method of extracting water from the humidity collected from sea or river, as recited in claim 1, wherein V0 is 80 miles/hr.

11. The method of extracting water from the humidity collected from sea or river, as recited in claim 1, wherein V0 is between 50 to 100 miles/hr.

12. The method of extracting water from the humidity collected from sea or river, as recited in claim 1, wherein N=90 percent.

13. The method of extracting water from the humidity collected from sea or river, as recited in claim 1, wherein N is between 50 to 95 percent.

14. The method of extracting water from the humidity collected from sea or river, as recited in claim 1, wherein N1=80 percent.

15. The method of extracting water from the humidity collected from sea or river, as recited in claim 1, wherein N1 is between 40 to 85 percent.

16. The method of extracting water from the humidity collected from sea or river, as recited in claim 1, wherein G=10 gallons.

17. The method of extracting water from the humidity collected from sea or river, as recited in claim 1, wherein G is between 5 to 100 gallons.

18. The method of extracting water from the humidity collected from sea or river, as recited in claim 1, wherein G1 is between 0.5 to 10 gallons, and G2 is between 0.5 to 10 gallons.

19. The method of extracting water from the humidity collected from sea or river, as recited in claim 1, wherein Z is between 0.001 J to 1000 kJ.

20. The method of extracting water from the humidity collected from sea or river, as recited in claim 1, wherein Z1 is between 0.00001 J to 500 kJ.

* * * * *